US012621490B2

(12) United States Patent
Deng et al.

(10) Patent No.: US 12,621,490 B2
(45) Date of Patent: May 5, 2026

(54) METHOD, DEVICE, AND MEDIUM FOR VIDEO PROCESSING

(71) Applicants:Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/622,811

(22) Filed: Mar. 29, 2024

(65) Prior Publication Data

US 2024/0259598 A1     Aug. 1, 2024

Related U.S. Application Data

(63) Continuation of application No. PCT/CN2022/122248, filed on Sep. 28, 2022.

(30) Foreign Application Priority Data

Sep. 29, 2021    (WO) ................ PCT/CN2021/121974

(51) Int. Cl.
*H04N 19/61*          (2014.01)
*H04N 19/107*        (2014.01)
(Continued)

(52) U.S. Cl.
CPC ........... *H04N 19/61* (2014.11); *H04N 19/107* (2014.11); *H04N 19/12* (2014.11); *H04N 19/159* (2014.11);
(Continued)

(58) Field of Classification Search
CPC ...... H04N 19/61; H04N 19/107; H04N 19/12; H04N 19/159; H04N 19/176;
(Continued)

(56) References Cited

U.S. PATENT DOCUMENTS

2019/0215521 A1    7/2019    Chuang et al.
2019/0320199 A1    10/2019    Chen et al.
(Continued)

FOREIGN PATENT DOCUMENTS

CN         112333450 A       2/2021
CN         113473141 A      10/2021
(Continued)

OTHER PUBLICATIONS

International Search Report in PCT/CN2022/122248, mailed Dec. 29, 2022, 3 pages.
(Continued)

*Primary Examiner* — Richard T Torrente
(74) *Attorney, Agent, or Firm* — Astute IP Law Group

(57)         ABSTRACT

Embodiments of the present disclosure provide a solution for video processing. A method for video processing is proposed. The method comprises: determining, during a conversion between a video unit of a video and a bitstream of the target block, information related to a combined inter-intra prediction (CIIP) enhancement mode, the video unit being applied with the CIIP enhancement mode; and performing the conversion based on the information related to the CIIP enhancement mode.

16 Claims, 28 Drawing Sheets

(51) Int. Cl.

| | |
|---|---|
| *H04N 19/12* | (2014.01) |
| *H04N 19/159* | (2014.01) |
| *H04N 19/176* | (2014.01) |
| *H04N 19/463* | (2014.01) |

(52) U.S. Cl.
CPC ......... *H04N 19/176* (2014.11); *H04N 19/463* (2014.11)

(58) Field of Classification Search
CPC .... H04N 19/463; H04N 19/105; H04N 19/13; H04N 19/136; H04N 19/119
See application file for complete search history.

(56) References Cited

U.S. PATENT DOCUMENTS

| | | | |
|---|---|---|---|
| 2020/0389671 A1* | 12/2020 | Zhao | ..................... H04N 19/12 |
| 2020/0413047 A1 | 12/2020 | Li et al. | |
| 2021/0203926 A1 | 7/2021 | Yamori et al. | |
| 2021/0314586 A1 | 10/2021 | Li et al. | |
| 2022/0377318 A1 | 11/2022 | Robert et al. | |
| 2022/0394255 A1* | 12/2022 | Kang | ..................... H04N 19/61 |
| 2022/0394300 A1 | 12/2022 | Koo et al. | |
| 2023/0073917 A1 | 3/2023 | Chen et al. | |
| 2023/0078392 A1 | 3/2023 | Li et al. | |
| 2023/0079960 A1 | 3/2023 | Chen et al. | |
| 2024/0073431 A1 | 2/2024 | Rosewarne et al. | |
| 2024/0205391 A1 | 6/2024 | Kidani et al. | |
| 2025/0233994 A1 | 7/2025 | Nam et al. | |

FOREIGN PATENT DOCUMENTS

| | | |
|---|---|---|
| JP | 2021027429 A | 2/2021 |
| WO | 2020/073904 A1 | 4/2020 |
| WO | 2020/204419 A1 | 10/2020 |
| WO | 2021/068954 A1 | 4/2021 |
| WO | 2021/188801 A1 | 9/2021 |

OTHER PUBLICATIONS

International Search Report in PCT/CN2022/124426, mailed Jan. 16, 2023, 3 pages.

Non-Final Office Action for U.S. Appl. No. 18/633,299, mailed on May 19, 2025, 15 pages.

Iwamura et al., "CE6-related: Implicit transform selection for Multi-hypothesis inter-intra mode", NHK, Joint Video Experts Team (JVET) of ITU-T SG 16 WP 3 and 1S0/IEC JTC 1/SC 29/WG 11 13th Meeting: Marrakech, MA, Jan. 9-18, 2019, Document: JVET-M0482-v3, 3 pages.

Lainema, "CE6-related: 2-mode MTS with shape adaptive transform selection", Nokia, Joint Video Experts Team (JVET) of ITU-T SG 16 WP 3 and ISO/IEC JTC 1/SC 29/WG 11 13th Meeting: Marrakech, MA, Jan. 9-18, 2019, Document: JVET-M0304-v2, 6 pages.

Non-Final Office Action for U.S. Appl. No. 18/649,724, mailed on Aug. 8, 2025, 15 pages.

* cited by examiner

1100

1200

1300

1400

1500

4×4 block

6×6 surrounding region samples & gradients padding 810 prediction samples in the extended area 820 prediction samples within the CU

1600

List-1 reference picture

MVD1

Current picture

List-0 reference picture

MVD0

2000

2110

2800

2810

DETERMINE INFORMATION RELATED TO A CIIP ENHANCEMENT MODE

2820

PERFORM THE CONVERSION BASED ON THE INFORMATION RELATED TO THE CIIP ENHANCEMENT MODE

3000

3010
DETERMINE FIRST CODING INFORMATION OF A FIRST INTER CODING MODE

3020
DETERMINE SECOND CODING INFORMATION OF A SECOND INTER CODING MODE

3030
PERFORM THE CONVERSION BASED ON THE FIRST AND SECOND CODING INFORMATION

3100

3110

DETERMINE WHETHER TO APPLY A REGULAR PREDICTION MODE OR A TM PREDICTION MODE TO THE VIDEO UNIT DYNAMICALLY

3120

PERFORM THE CONVERSION BASED ON THE DETERMINING

3200

3210

DETERMINE WHETHER TO APPLY A TRANSFORM MODE TO THE VIDEO UNIT

3220

PERFORM THE CONVERSION BASED ON THE DETERMINING

3300

3310

DETERMINE INFORMATION RELATED TO A TRANSFORM MODE

3320

PERFORM THE CONVERSION BASED ON THE INFORMATION
RELATED TO THE TRANSFORM MODE

3400

METHOD, DEVICE, AND MEDIUM FOR VIDEO PROCESSING

CROSS REFERENCE TO RELATED APPLICATIONS

This application is a continuation of International Application No. PCT/CN2022/122248, filed on Sep. 28, 2022, which claims the benefit of International Application No. PCT/CN2021/121974 filed on Sep. 29, 2021. The entire contents of these applications are hereby incorporated by reference in their entireties.

FIELD

Embodiments of the present disclosure relates generally to video coding techniques, and more particularly, to signaling of information related to a combined inter-intra prediction (CIIP) enhancement mode.

BACKGROUND

In nowadays, digital video capabilities are being applied in various aspects of people's' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally low, which is undesirable.

SUMMARY

Embodiments of the present disclosure provide a solution for video processing.

In a first aspect, a method for video processing is proposed. The method comprises: determining, during a conversion between a video unit of a video and a bitstream of the target block, information related to a combined inter-intra prediction (CIIP) enhancement mode, the video unit being applied with the CIIP enhancement mode; and performing the conversion based on the information related to the CIIP enhancement mode. Compared with the conventional solution, the proposed method can advantageously improve the coding efficiency and performance.

In a second aspect, another method for video processing is proposed. The method comprises: applying, during a conversion between a video unit of a video and a bitstream of the target block, a reordering procedure and a refinement procedure to a number of merge candidates for the video unit, the video unit being applied with an inter coding mode; and performing the conversion based on the reordered and refined merge candidates. Compared with the conventional solution, the proposed method can advantageously improve the coding efficiency and performance.

In a third aspect, another method for video processing is proposed. The method comprises: determining, during a conversion between a video unit of a video and a bitstream of the target block, first coding information of a first inter coding mode; determining second coding information of a second inter coding mode, the video unit being applied with the first inter coding mode and the second inter coding mode, the first coding information being associated with the second coding information; and performing the conversion based on the first and second coding information. Compared with the conventional solution, the proposed method can advantageously improve the coding efficiency and performance.

In a fourth aspect, another method for video processing is proposed. The method comprises: determining, during a conversion between a video unit of a video and a bitstream of the target block, whether to apply a regular prediction mode or a template matching (TM) prediction mode to the video unit dynamically; and performing the conversion based on the determining. Compared with the conventional solution, the proposed method can advantageously improve the coding efficiency and performance.

In a fifth aspect, another method for video processing is proposed. The method comprises: determining, during a conversion between a video unit of a video and a bitstream of the target block, whether to apply a transform mode to the video unit, the video unit being applied with an inter coding mode or an intra coding mode; and performing the conversion based on the determining. Compared with the conventional solution, the proposed method can advantageously improve the coding efficiency and performance.

In a sixth aspect, another method for video processing is proposed. The method comprises: determining, during a conversion between a video unit of a video and a bitstream of the target block, information related to a transform mode, the video unit being applied with the transform mode; and performing the conversion based on the information related to the transform mode. Compared with the conventional solution, the proposed method can advantageously improve the coding efficiency and performance.

In a seventh aspect, an apparatus for processing video data is proposed. The apparatus for processing video data comprises a processor and a non-transitory memory with instructions thereon. The instructions, upon execution by the processor, cause the processor to perform a method in accordance with any of the first, second, third, fourth, fifth or sixth aspect.

In an eighth aspect, a non-transitory computer-readable storage medium is proposed. The non-transitory computer-readable storage medium stores instructions that cause a processor to perform a method in accordance with any of the first, second, third, fourth, fifth or sixth aspect.

In a ninth aspect, a non-transitory computer-readable recording medium is proposed. The non-transitory computer-readable recording medium stores a bitstream of a video which is generated by a method performed by a video processing apparatus. The method comprises: determining information related to a combined inter-intra prediction (CIIP) enhancement mode of a video unit of the video, the video unit being applied with the CIIP enhancement mode; and generating a bitstream of the video unit based on the information related to the CIIP enhancement mode.

In a tenth aspect, another method for storing bitstream of a video is proposed. The method comprises: determining information related to a combined inter-intra prediction (CIIP) enhancement mode of a video unit of the video, the video unit being applied with the CIIP enhancement mode; generating a bitstream of the video unit based on the information related to the CIIP enhancement mode; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by a video processing apparatus. The method comprises: applying a reordering procedure and a refinement procedure to a number of merge candidates for a video unit of the video, the video unit being applied with an inter coding mode; and generating a bitstream of the video unit based on the reordered and refined merge candidates.

In a twelfth aspect, another method for storing bitstream of a video is proposed. The method comprises: applying a reordering procedure and a refinement procedure to a number of merge candidates for a video unit of the video, the video unit being applied with an inter coding mode; generating a bitstream of the video unit based on the reordered and refined merge candidates; and storing the bitstream in a non-transitory computer-readable recording medium.

In a thirteenth aspect, another non-transitory computer-readable recording medium is proposed. The non-transitory computer-readable recording medium storing a bitstream of a video which is generated by a method performed by a video processing apparatus. The method comprises: determining first coding information of a first inter coding mode for a video unit of the video; determining second coding information of a second inter coding mode, the video unit being applied with the first inter coding mode and the second inter coding mode, the first coding information being associated with the second coding information; and generating a bitstream of the video unit based on the first and second coding information.

In a fourteenth aspect, another method for storing bit-stream of a video is proposed. The method comprises: determining first coding information of a first inter coding mode for a video unit of the video; determining second coding information of a second inter coding mode, the video unit being applied with the first inter coding mode and the second inter coding mode, the first coding information being associated with the second coding information; generating a bitstream of the video unit based on the first and second coding information; and storing the bitstream in a non-transitory computer-readable recording medium.

In a fifteenth aspect, another non-transitory computer-readable recording medium is proposed. The non-transitory computer-readable recording medium storing a bitstream of a video which is generated by a method performed by a video processing apparatus. The method comprises: determining whether to apply a regular prediction mode or a template matching (TM) prediction mode to a video unit of the video dynamically; and generating a bitstream of the video unit based on the determining.

In a sixteenth aspect, another method for storing bitstream of a video is proposed. The method comprises: determining whether to apply a regular prediction mode or a template matching (TM) prediction mode to a video unit of the video dynamically; generating a bitstream of the video unit based on the determining; and storing the bitstream in a non-transitory computer-readable recording medium.

In a seventeenth aspect, another non-transitory computer-readable recording medium is proposed. The non-transitory computer-readable recording medium storing a bitstream of a video which is generated by a method performed by a video processing apparatus. The method comprises: determining whether to apply a transform mode to a video unit of the video, the video unit being applied with an inter coding mode or an intra coding mode; and generating a bitstream of the video unit based on the determining.

In an eighteenth aspect, another method for storing bit-stream of a video is proposed. The method comprises: determining whether to apply a transform mode to a video unit of the video, the video unit being applied with an inter coding mode or an intra coding mode; generating a bitstream of the video unit based on the determining; and storing the bitstream in a non-transitory computer-readable recording medium.

In a nineteenth aspect, another non-transitory computer-readable recording medium is proposed. The non-transitory computer-readable recording medium storing a bitstream of a video which is generated by a method performed by a video processing apparatus. The method comprises: determining information related to a transform mode for a video unit of the video, the video unit being applied with the transform mode; and generating a bitstream of the video unit based on the information related to the transform mode.

In a twentieth aspect, another method for storing bit-stream of a video is proposed. The method comprises: determining information related to a transform mode for a video unit of the video, the video unit being applied with the transform mode; generating a bitstream of the video unit based on the information related to the transform mode; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

5

6

Figure 16:
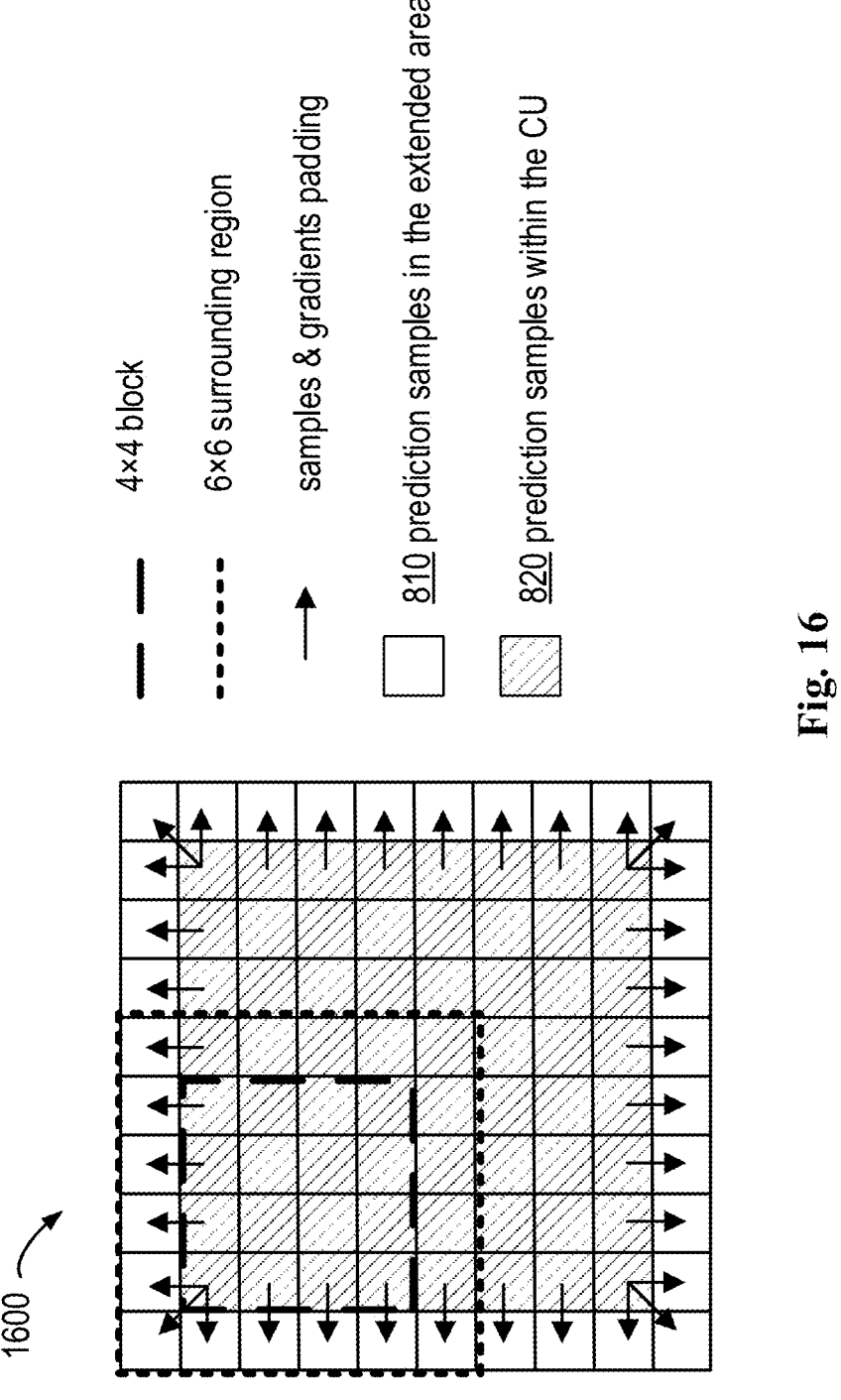
Figure 17:
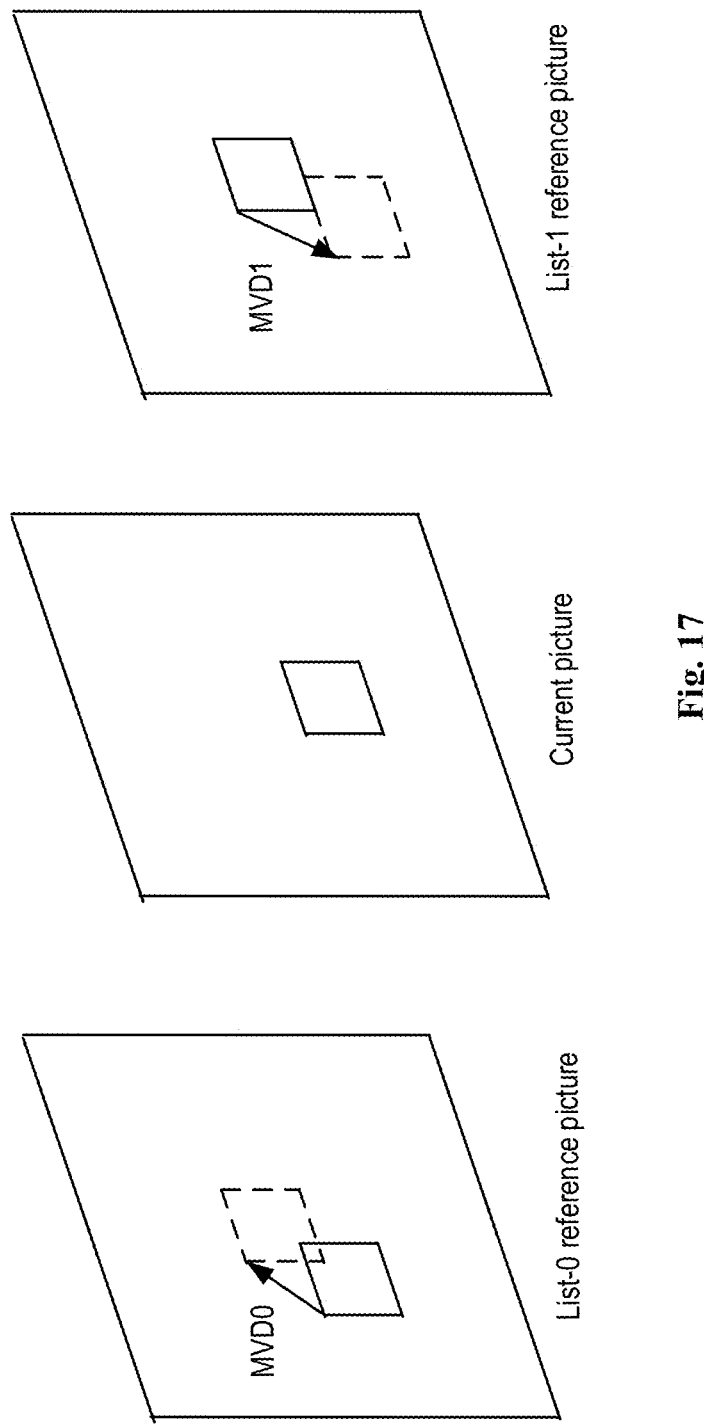
Figure 18:
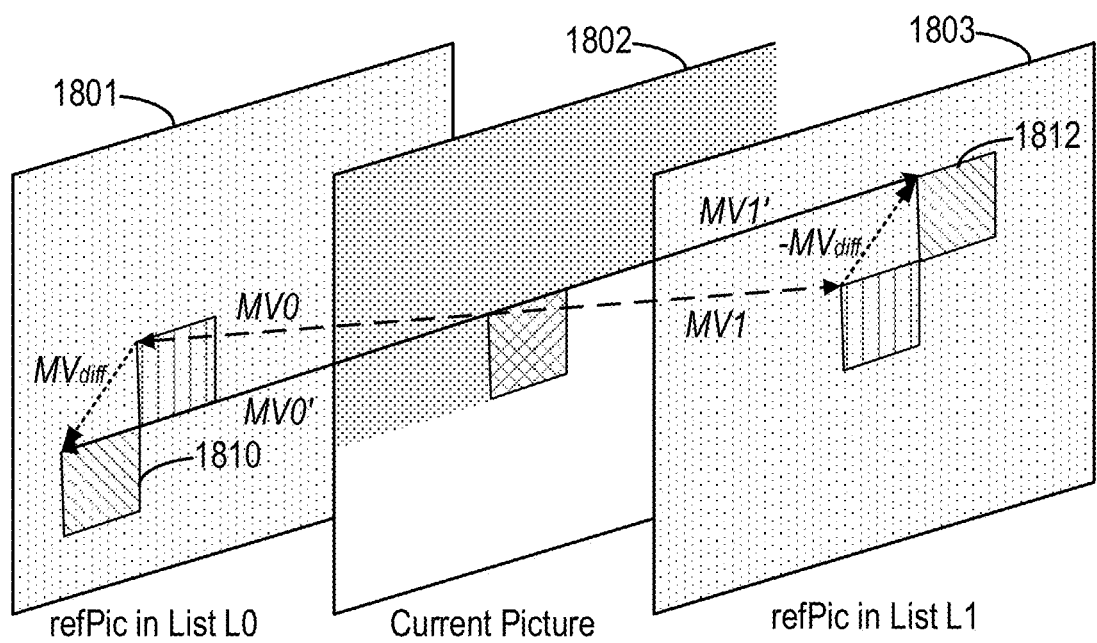
Figure 19:
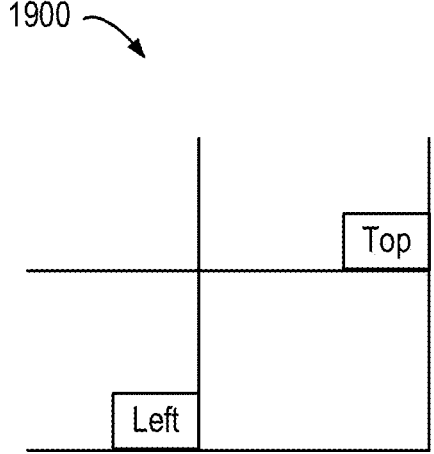
Figure 20:
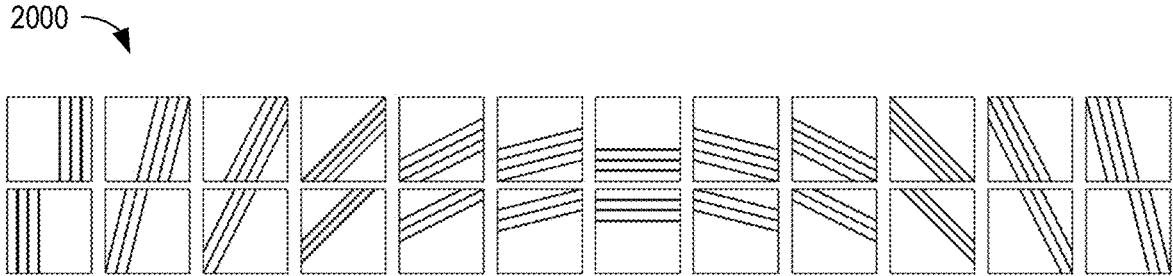
Figure 21:
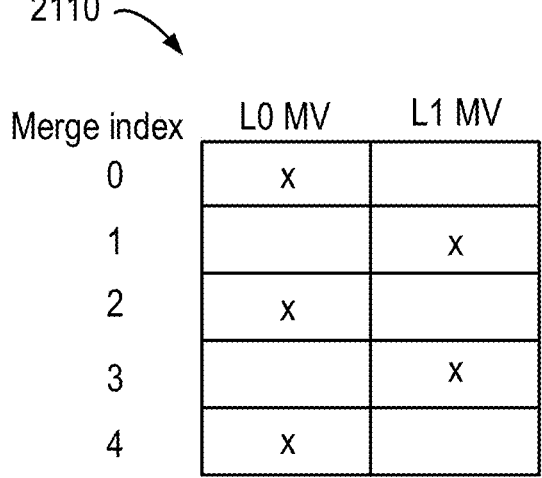
Figure 22:
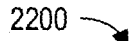
Figure 22:
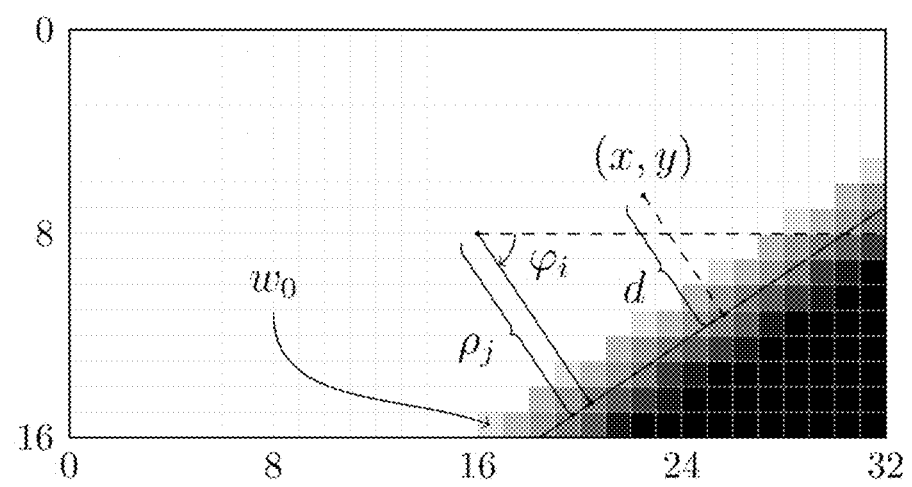
Figure 23:
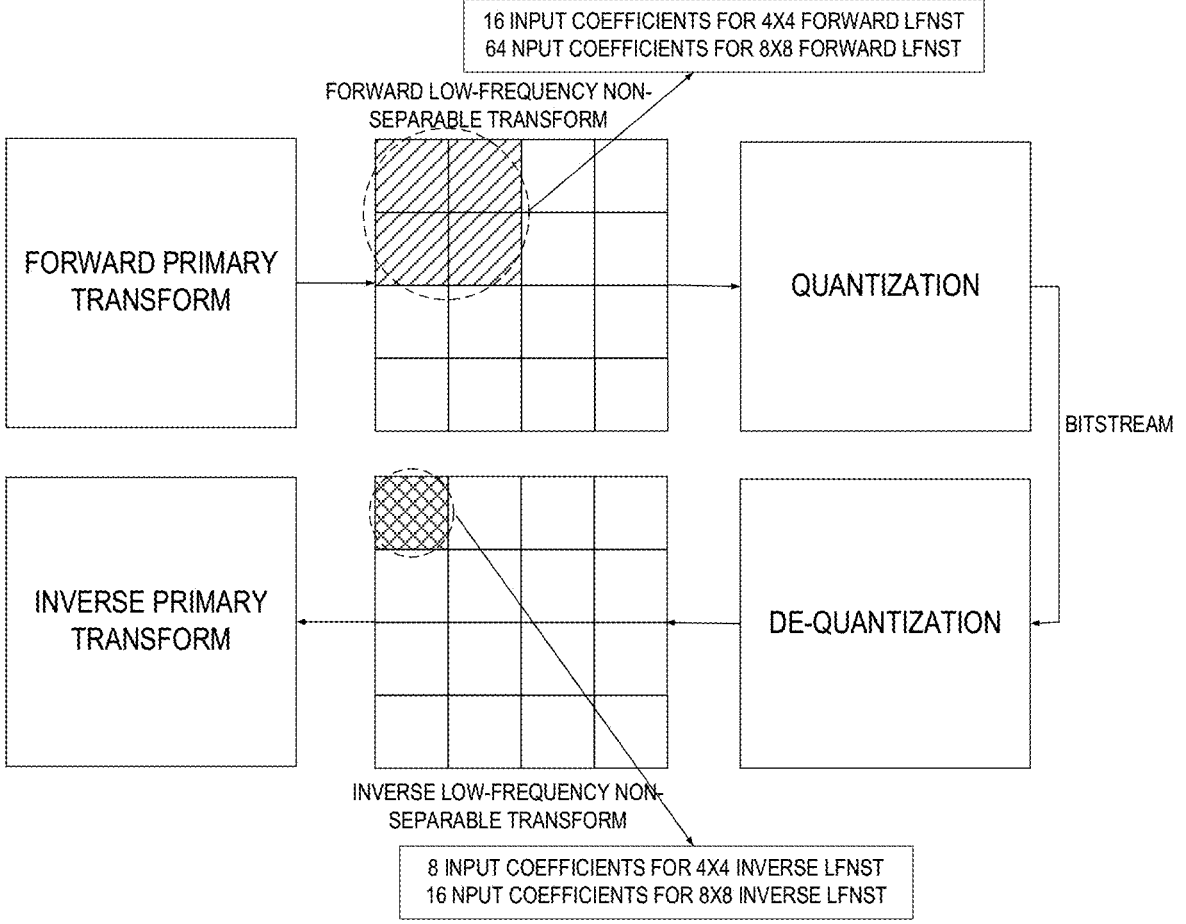
Figure 24:
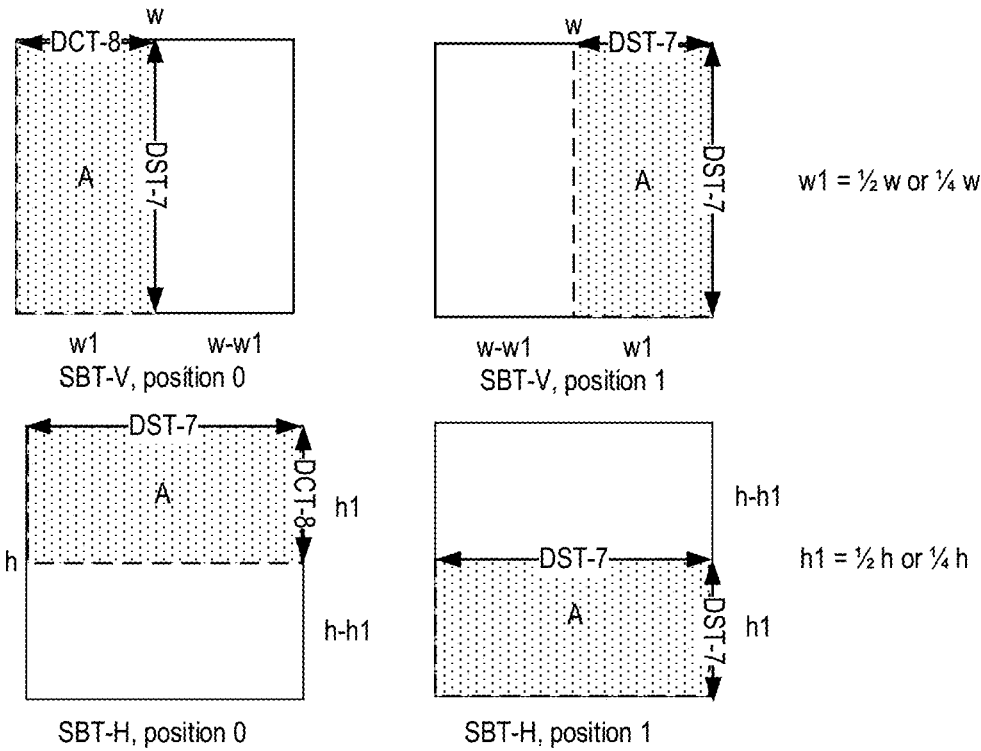
Figure 25:
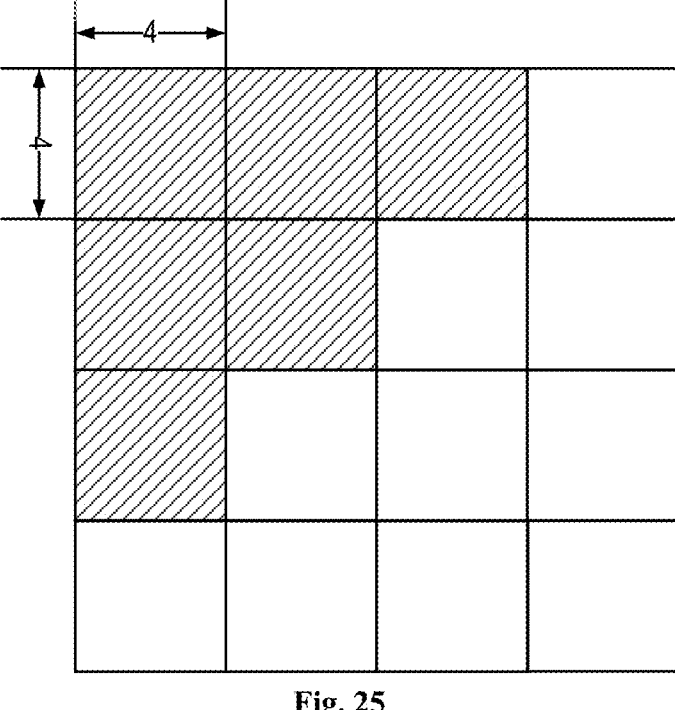
Figure 26:
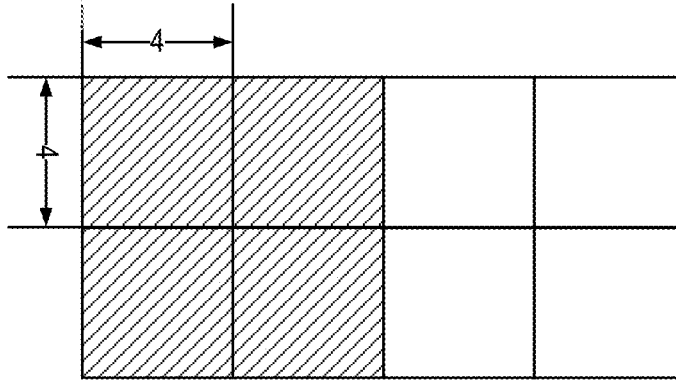
Figure 27:
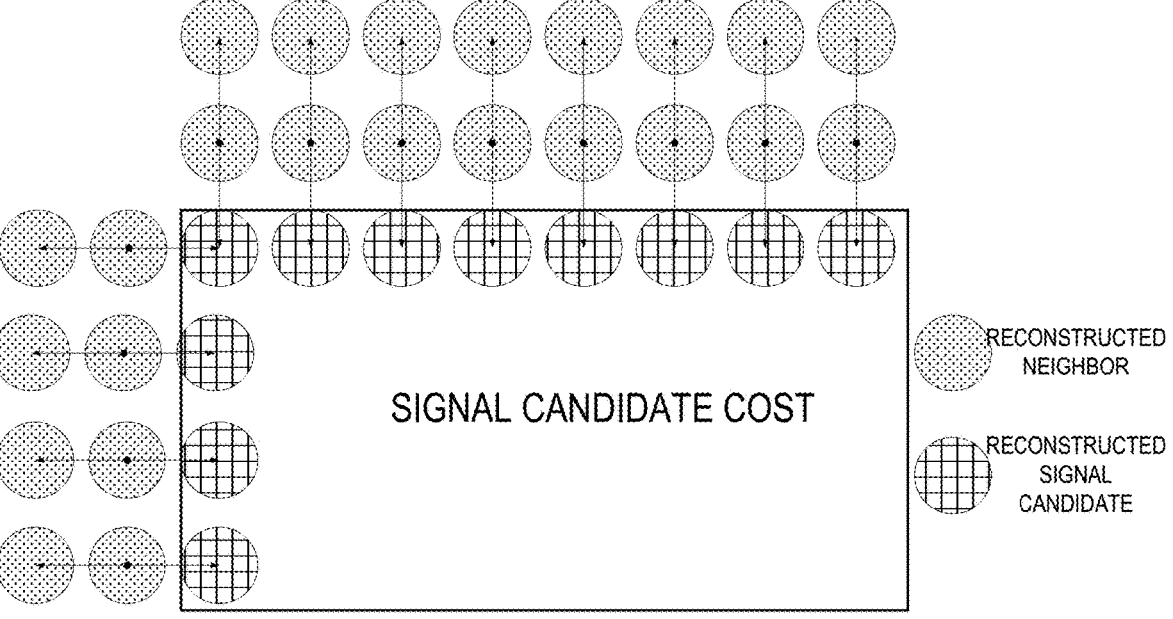
Figure 28:
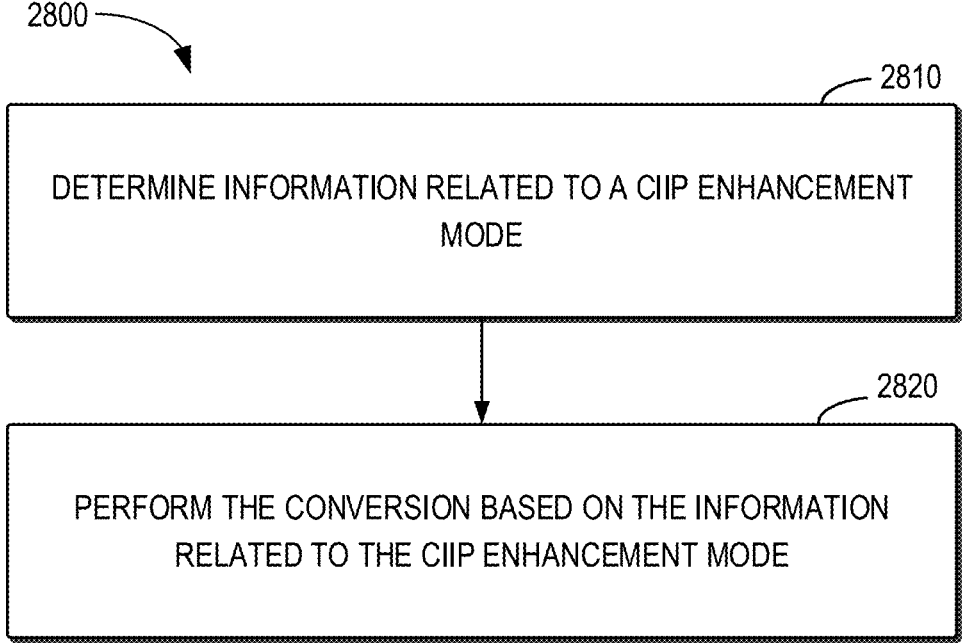
Figure 29:
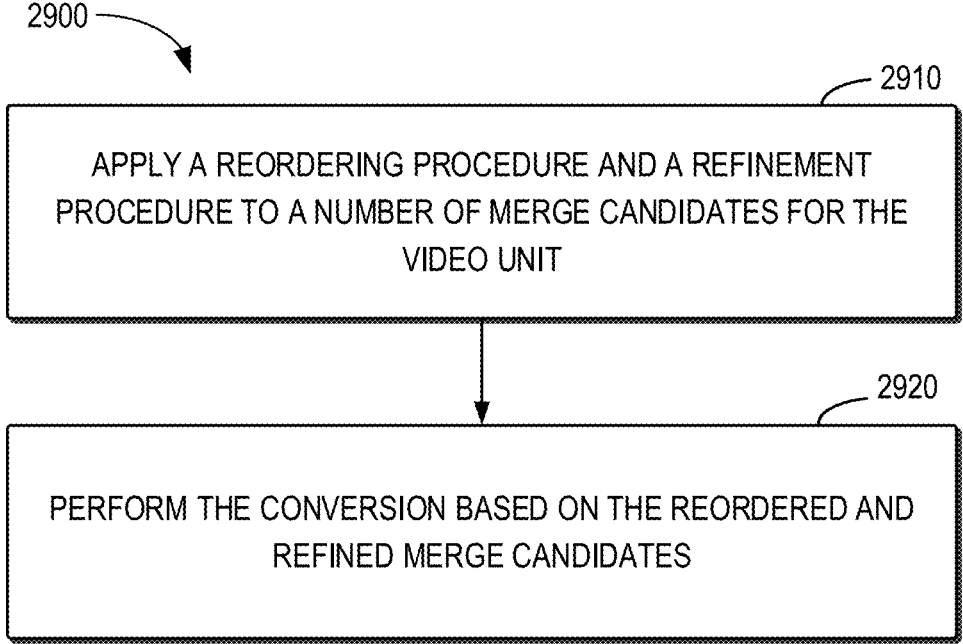
Figure 30:
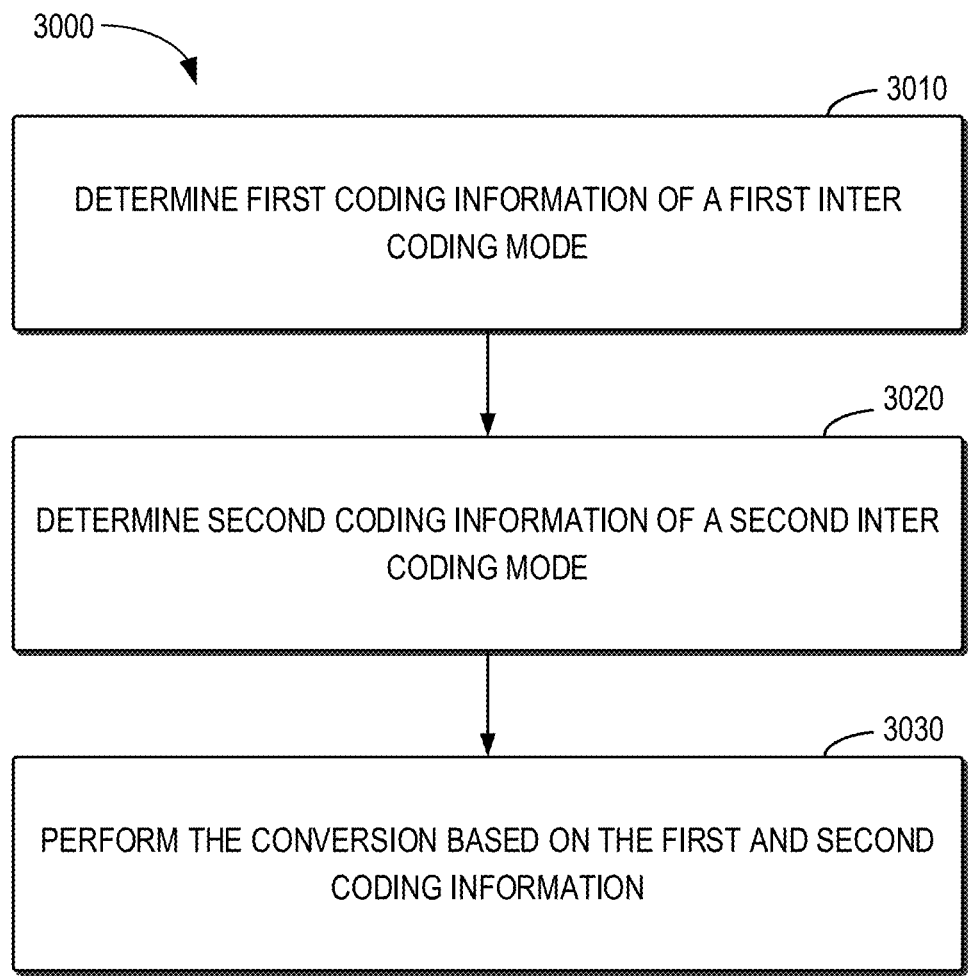
Figure 31:
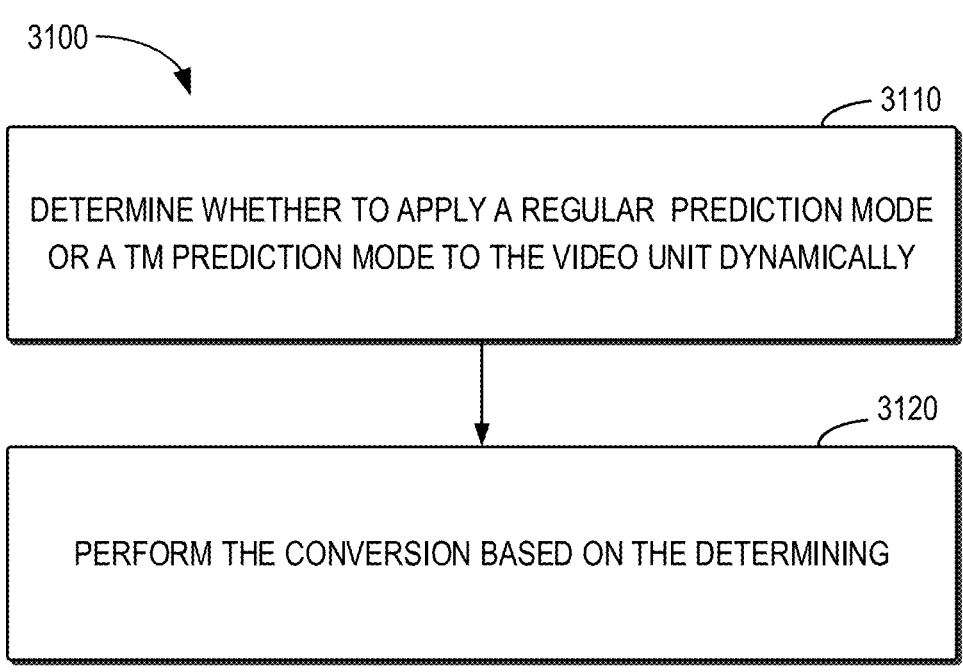
Figure 32:
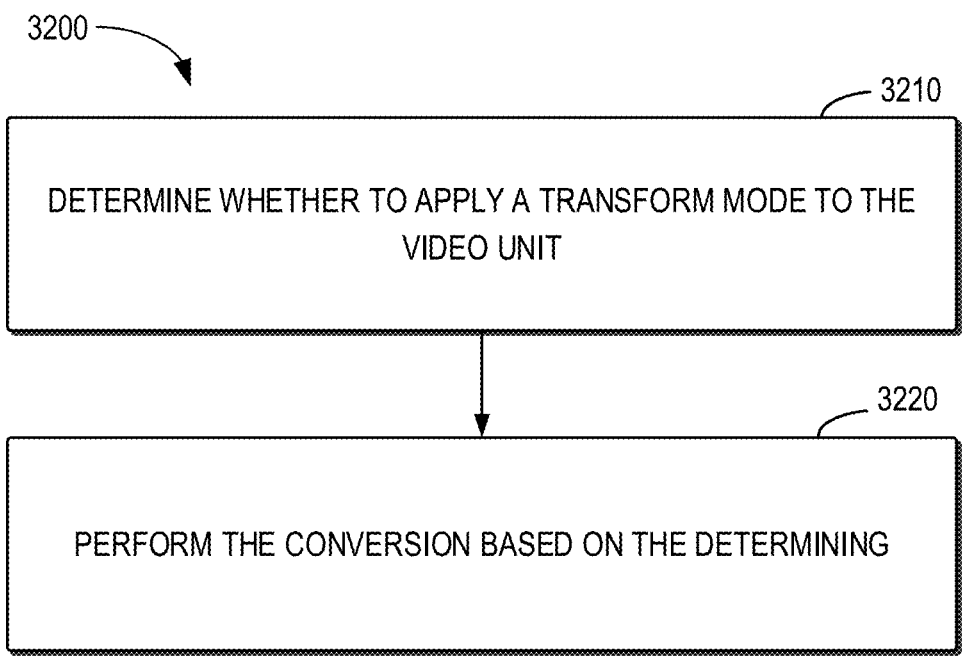
Figure 33:
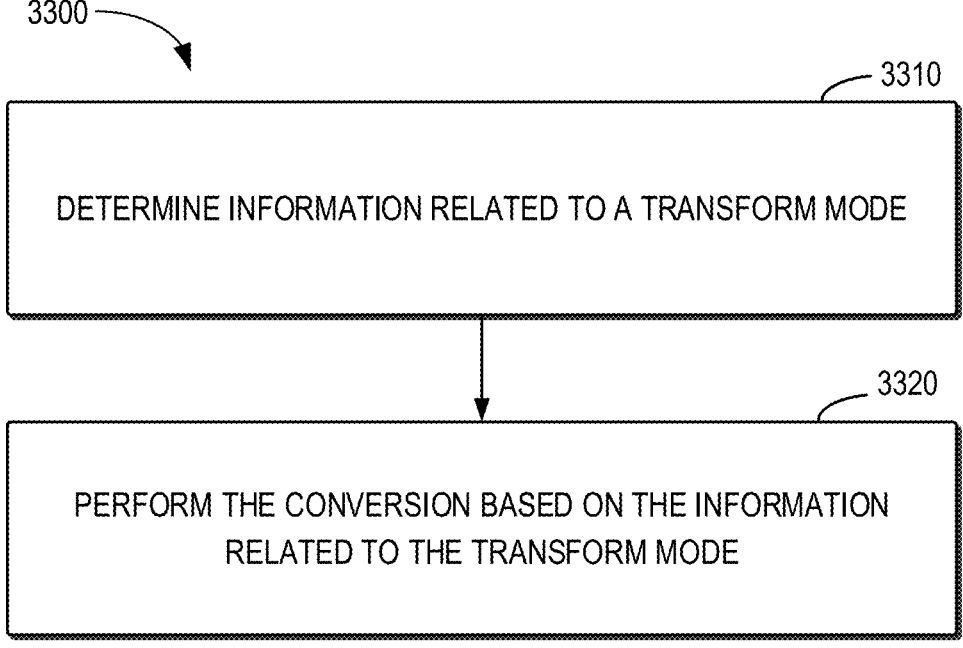
Figure 34:
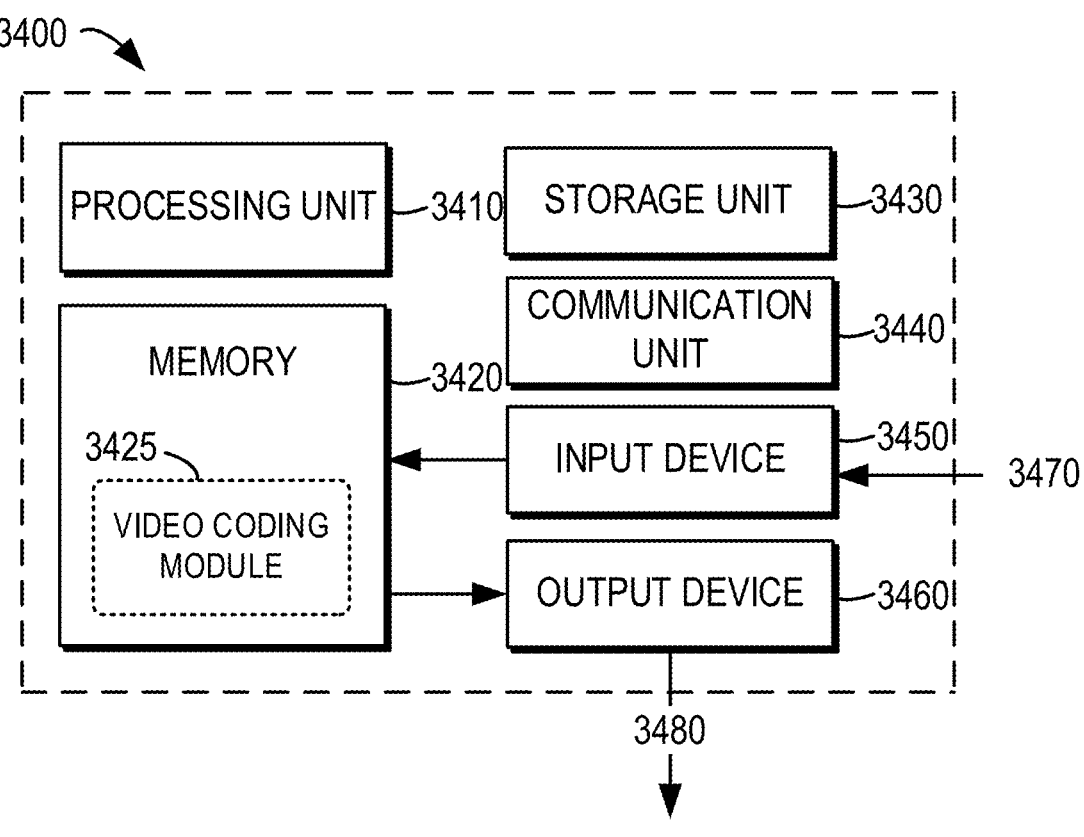

FIG. 16 illustrates extended CU region used in BDOF;

FIG. 17 illustrates an illustration for symmetrical MVD mode;

FIG. 18 illustrates decoding side motion vector refinement;

FIG. 19 illustrates top and left neighboring blocks used in CIIP weight derivation;

FIG. 20 illustrates examples of the GPM splits grouped by identical angles;

FIG. 21 illustrates uni-prediction MV selection for geometric partitioning mode;

FIG. 22 illustrates exemplified generation of a bending weight w0 using geometric partitioning mode;

FIG. 23 shows a schematic diagram of Low Frequency Non-Separable Transform (LFNST) process;

FIG. 24 shows a schematic diagram of SBT position, type and transform type;

FIG. 25 shows the ROI for LFNST16;

FIG. 26 shows the ROI for LFNST8;

FIG. 27 shows a schematic diagram of discontinuity measure;

FIG. 28 illustrates a flow chart of a method according to embodiments of the present disclosure;

FIG. 29 illustrates a flow chart of a method according to embodiments of the present disclosure;

FIG. 30 illustrates a flow chart of a method according to embodiments of the present disclosure;

FIG. 31 illustrates a flow chart of a method according to embodiments of the present disclosure;

FIG. 32 illustrates a flow chart of a method according to embodiments of the present disclosure;

FIG. 33 illustrates a flow chart of a method according to embodiments of the present disclosure; and FIG. 34 illustrates a block diagram of a computing device in which various embodiments of the present disclosure can be implemented.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
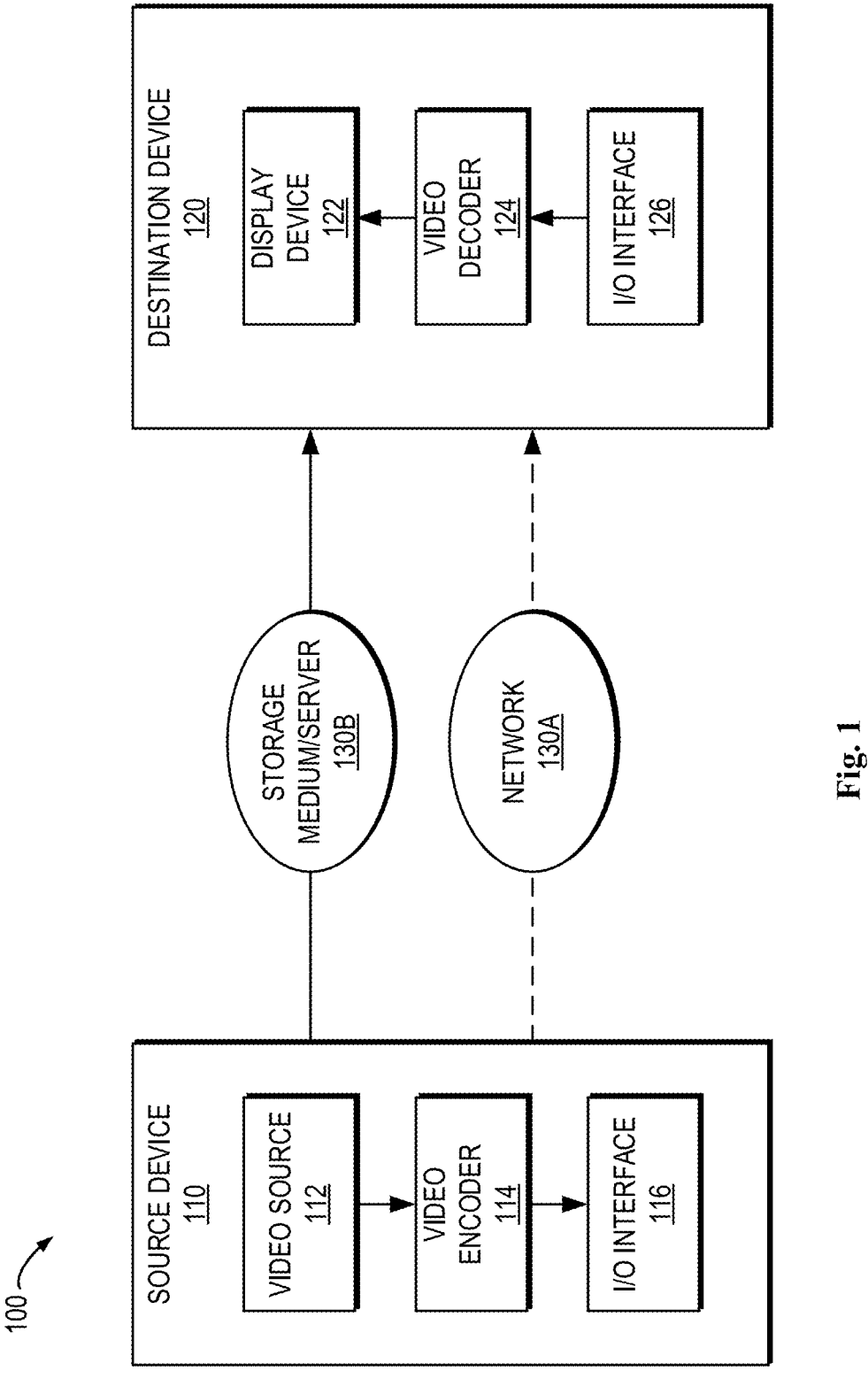
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
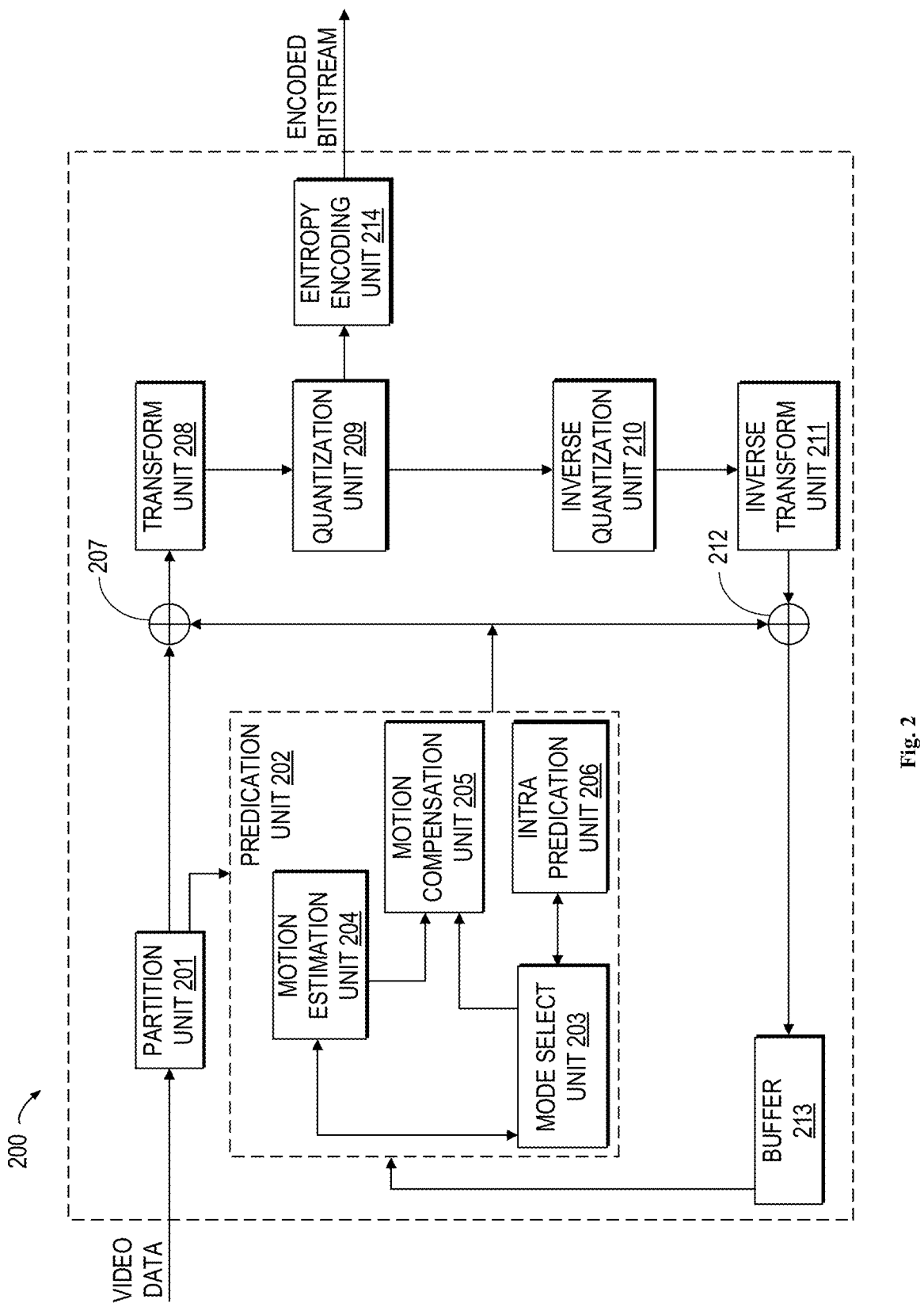
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
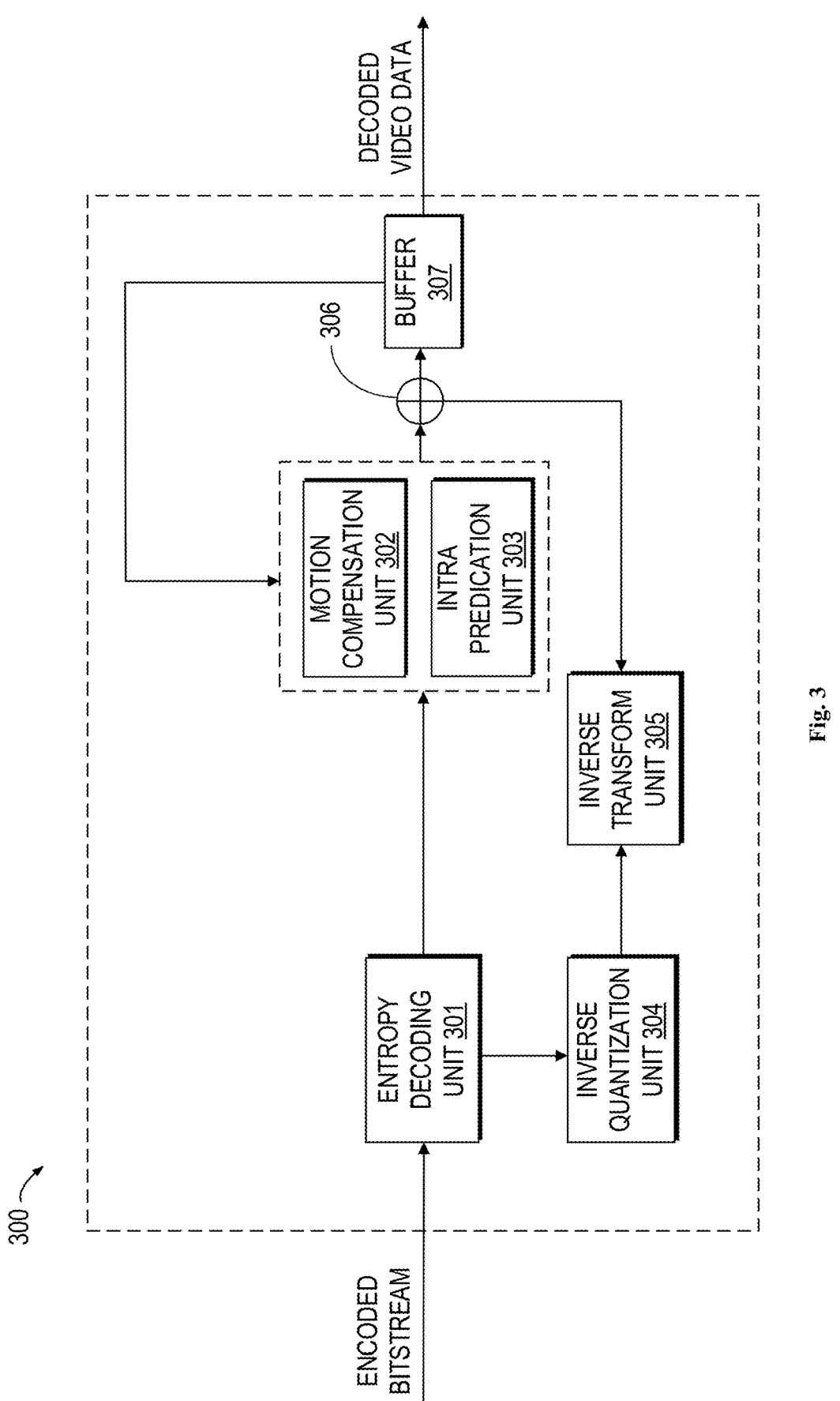
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

The present disclosure is related to video coding technologies. Specifically, it is about combined inter/intra prediction and transform in image/video coding. It may be applied to the existing video coding standard like HEVC, VVC, and etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

Figure 4:
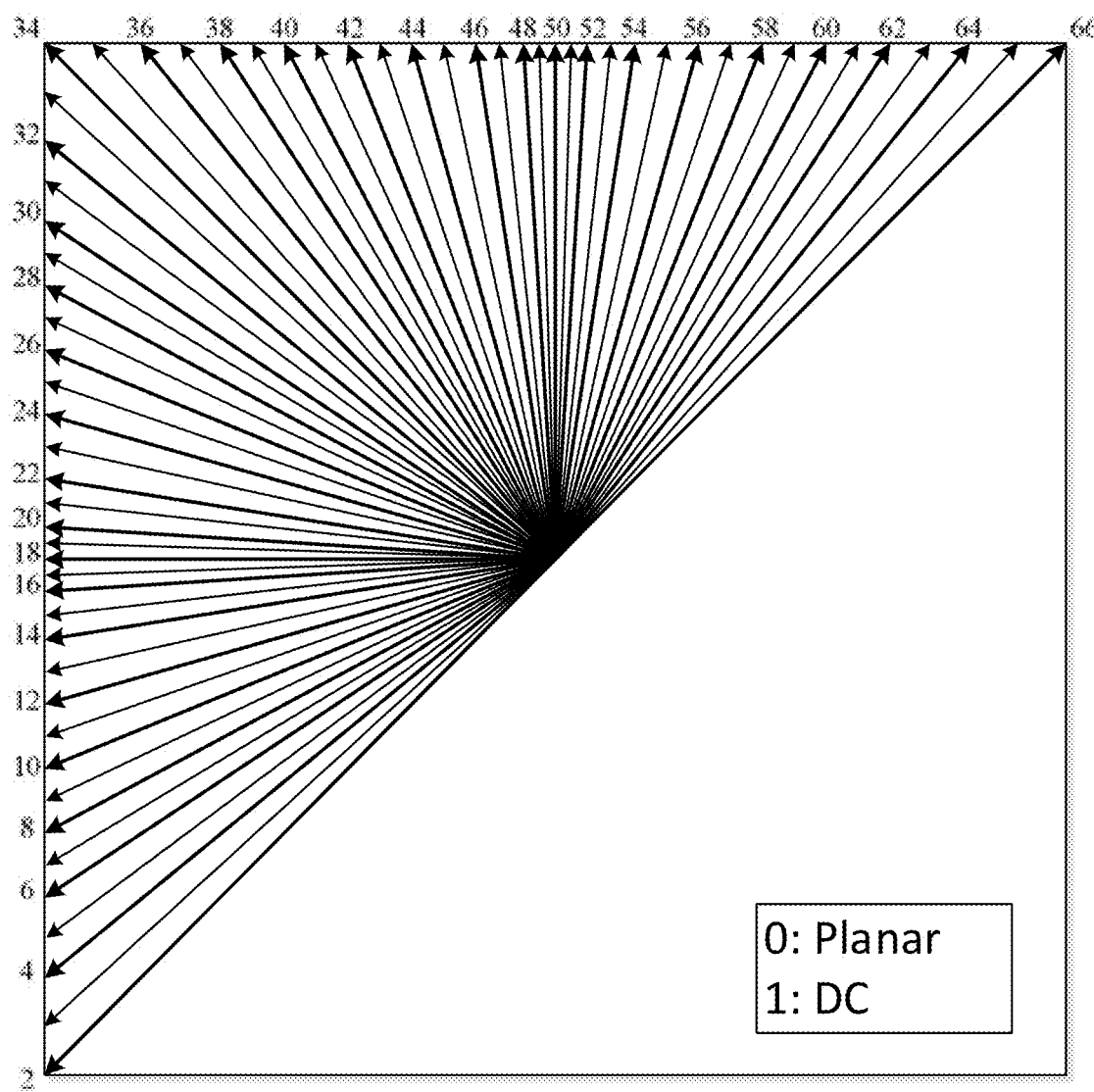
FIG. 4 is a schematic diagram of intra prediction modes.

2.1. Coding Tools 2.1.1. Intra Prediction 2.1.1.1. Intra Mode Coding with 67 Intra Prediction Modes To capture the arbitrary edge directions presented in natural video, the number of directional intra modes in VVC is extended from 33, as used in HEVC, to 65. The new directional modes not in HEVC are depicted as red dotted arrows in FIG. 4, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.1.1.2. Intra Mode Coding

To keep the complexity of the most probable mode (MPM) list generation low, an intra mode coding method with 6 MPMs is used by considering two available neighboring intra modes.

The following three aspects are considered to construct the MPM list:

Default intra modes.

Neighbouring intra modes.

Derived intra modes.

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:

MPM list→{Planar, DC, V, H, V−4, V+4}.

If one of modes Left and Above is angular mode, and the other is non-angular:

Set a mode Max as the larger mode in Left and Above;

MPM list→{Planar, Max, DC, Max−1, Max+1, Max−2}.

If Left and Above are both angular and they are different:

Set a mode Max as the larger mode in Left and Above.

if the difference of mode Left and Above is in the range of 2 to 62, inclusive

MPM list→{Planar, Left, Above, DC, Max−1, Max+1}.

Otherwise

MPM list→{Planar, Left, Above, DC, Max−2, Max+2}.

If Left and Above are both angular and they are the same:

MPM list→{Planar, Left, Left−1, Left+1, DC, Left−2}.

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

2.1.1.3. Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 5:
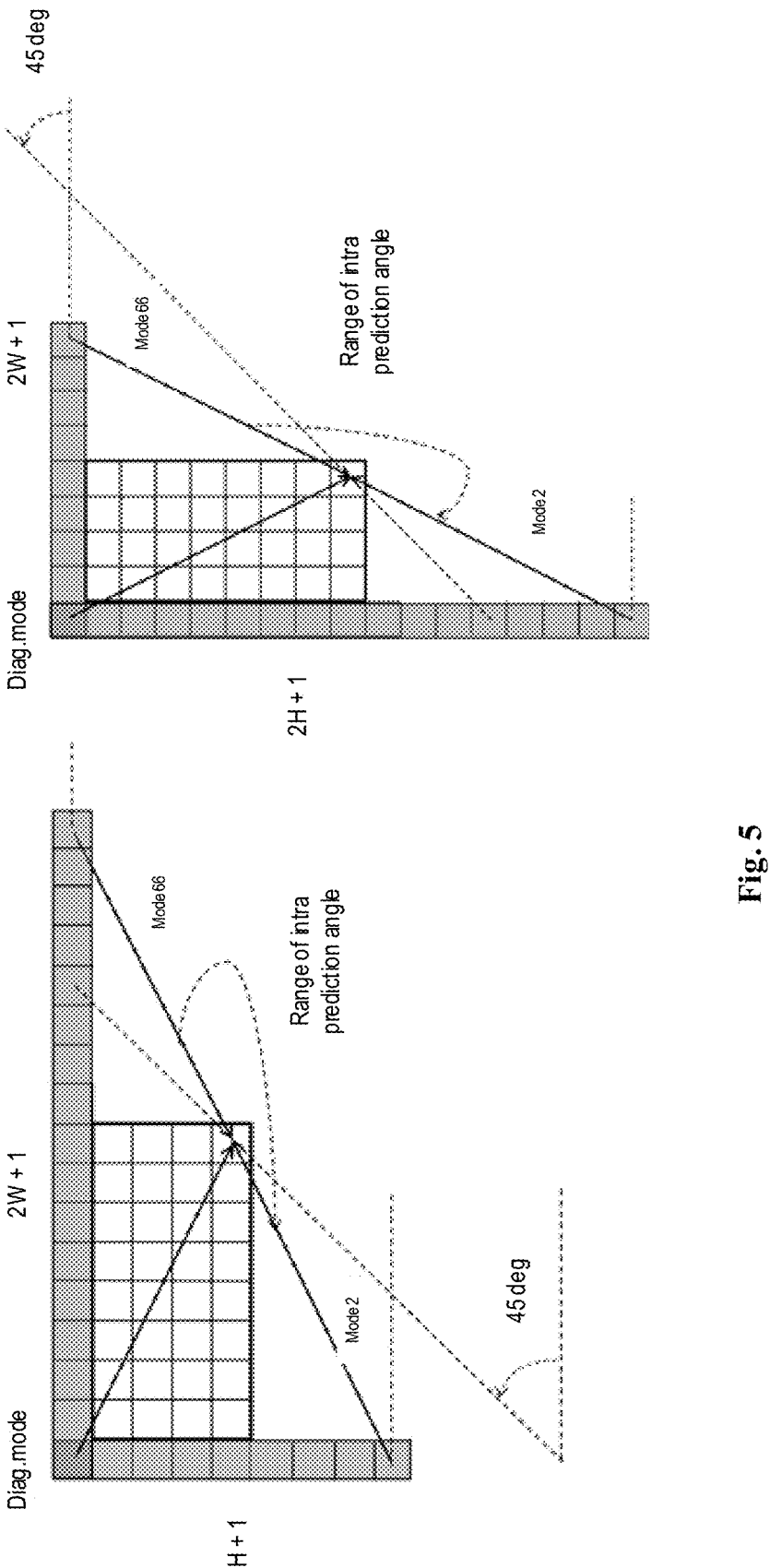
FIG. 5 illustrates a block diagram of reference samples for wide-angular intra prediction.

To support these prediction directions, the top reference with length 2W+1, and the left reference with length 2H+1, are defined as shown in FIG. 5.

The number of replaced modes in wide-angular direction mode depends on the aspect ratio of a block. The replaced intra prediction modes are illustrated in Table 1.

TABLE 1

| Intra prediction modes replaced by wide-angular modes | |
| --- | --- |
| Aspect ratio | Replaced intra prediction modes |
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| W/H = 2 | Modes 2, 3, 4, 5, 6, 7, |
| W/H = 1 | None |
| W/H = ½ | Modes 61, 62, 63, 64, 65, 66 |
| W/H = ¼ | Mode 57, 58, 59, 60, 61, 62, 63, 64, 65, 66 |
| W/H = ⅛ | Modes 55, 56 |
| W/H = 1/16 | Modes 53, 54, 55, 56 |

Figure 6:
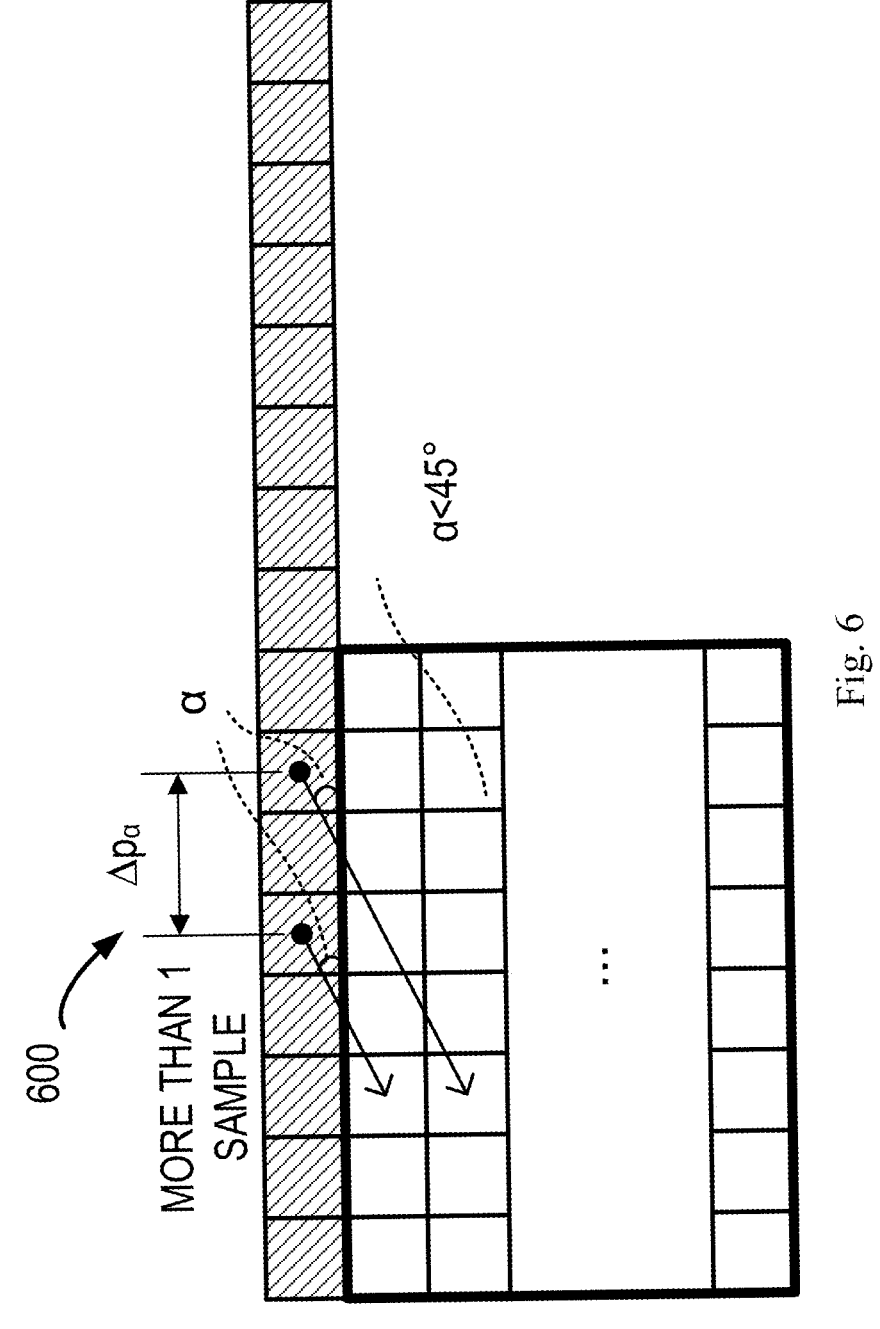
FIG. 6 illustrates a schematic diagram of problem of discontinuity in case of directions beyond 45°.

FIG. 6 illustrates a block diagram of discontinuity in case of directions beyond 45 degree. As shown in the diagram 600 of FIG. 6, two vertically adjacent predicted samples may use two non-adjacent reference samples in the case of wide-angle intra prediction Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore chroma DM derivation table for 4:2:2: chroma format is updated by replacing some values of the entries of the mapping table to convert prediction angle more precisely for chroma blocks.

2.1.1.4. Mode Dependent Intra Smoothing (MDIS)

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following: 2, HOR_IDX, DIA_IDX, VER_IDX, 66.

Depending on the intra prediction mode, the following reference samples processing is performed:

The directional intra-prediction mode is classified into one of the following groups:
vertical or horizontal modes (HOR_IDX, VER_IDX),
diagonal modes that represent angles which are multiple of 45 degree (2, DIA_IDX, VDIA_IDX),
remaining directional modes:
If the directional intra-prediction mode is classified as belonging to group A, then then no filters are applied to reference samples to generate predicted samples;
Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;

Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

2.1.1.5. Position Dependent Intra Prediction Combination

In VVC, the results of intra prediction of DC, planar and several angular modes are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x',y') is predicted using an intra prediction mode (DC, planar, angular) and a linear combination of reference samples according to the Equation 3-8 as follows:

$$pred(x', y') = (wL \times R_{-1,y'} + wT \times R_{x',-1} - \qquad (2\text{-}1)$$

$$wTL \times R_{-1,-1} + (64 - wL - wT + wTL) \times pred(x', y') + 32) >> 6$$

where $R_{x,-1}$, $R_{-1,y}$ represent the reference samples located at the top and left boundaries of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical and clipping operation is avoided. For angular modes, pdpc scale factor is adjusted such that range check is not needed and condition on angle to enable pdpc is removed (scale>=0 is used). In addition, PDPC weight is based on 32 in all angular mode cases. The PDPC weights are dependent on prediction modes and are shown in Table 2. PDPC is applied to the block with both width and height greater than or equal to 4.

Figure 7:
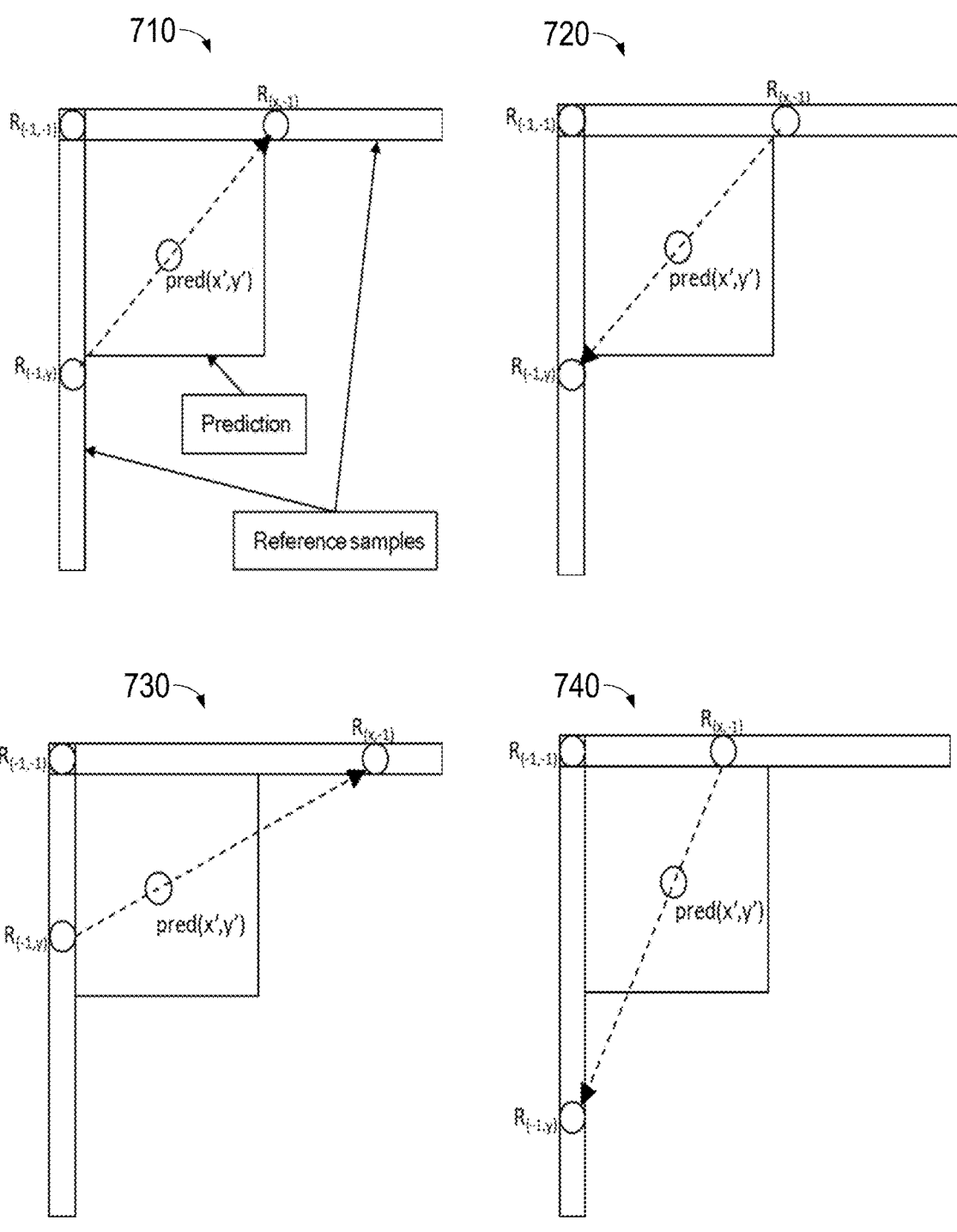
FIG. 7 illustrates a schematic diagram of definition of samples used by PDPC applied to diagonal and adjacent angular intra modes.

FIG. 7 illustrates the definition of reference samples ($R_{x,-1}$, $R_{-1,y}$ and $R_{-1,-1}$) for PDPC applied over various prediction modes. FIG. 7 shows a diagonal top-right mode 710, a diagonal bottom-left mode 720, an adjacent diagonal top-right mode 730 and an adjacent diagonal bottom-left mode 740. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other annular mode, the reference samples $R_{x,-1}$ and $R_{-1,y}$ could be located in fractional sample position. In this case, the sample value of the nearest integer sample location is used.

TABLE 2

| Example of PDPC weights according to prediction modes | | | |
|---|---|---|---|
| Prediction modes | wT | wL | wTL |
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.1.1.6. Multiple Reference Line (MRL) Intra Prediction

Figure 8:
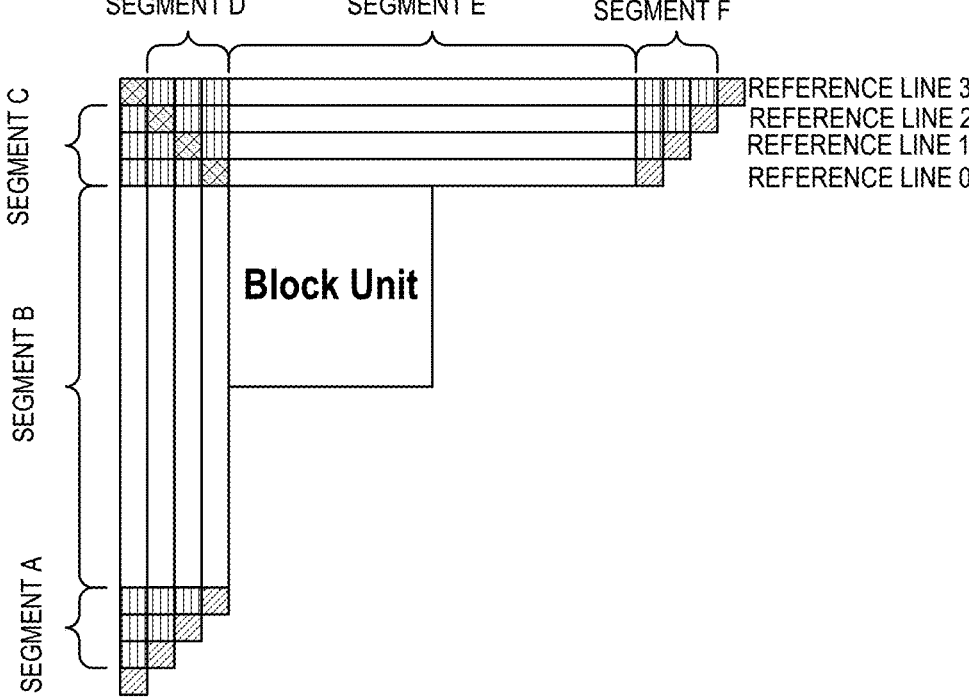
FIG. 8 illustrates a schematic diagram of example of four reference lines neighboring to a prediction block.

Multiple reference line (MRL) intra prediction uses more reference lines for intra prediction. In FIG. 8, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its downsampling filters. The definition of MLR to use the same 3 lines is aligned as CCLM to reduce the storage requirements for decoders.

2.1.1.7. Intra Sub-Partitions (ISP)

Figure 9:
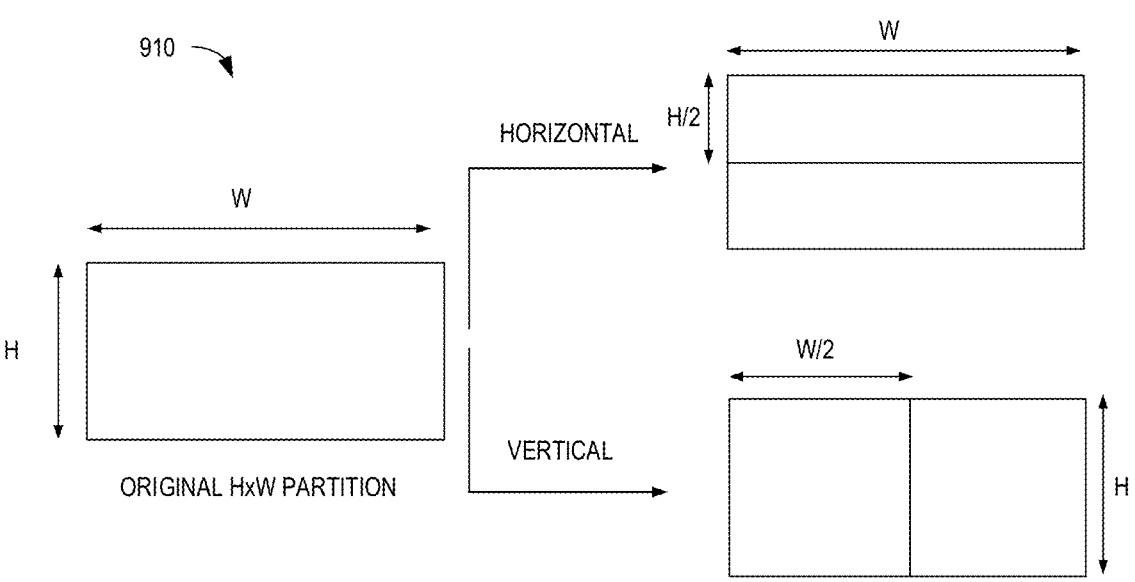
FIG. 9 illustrates a schematic diagram of sub-partition depending on the block size.
Figure 9:
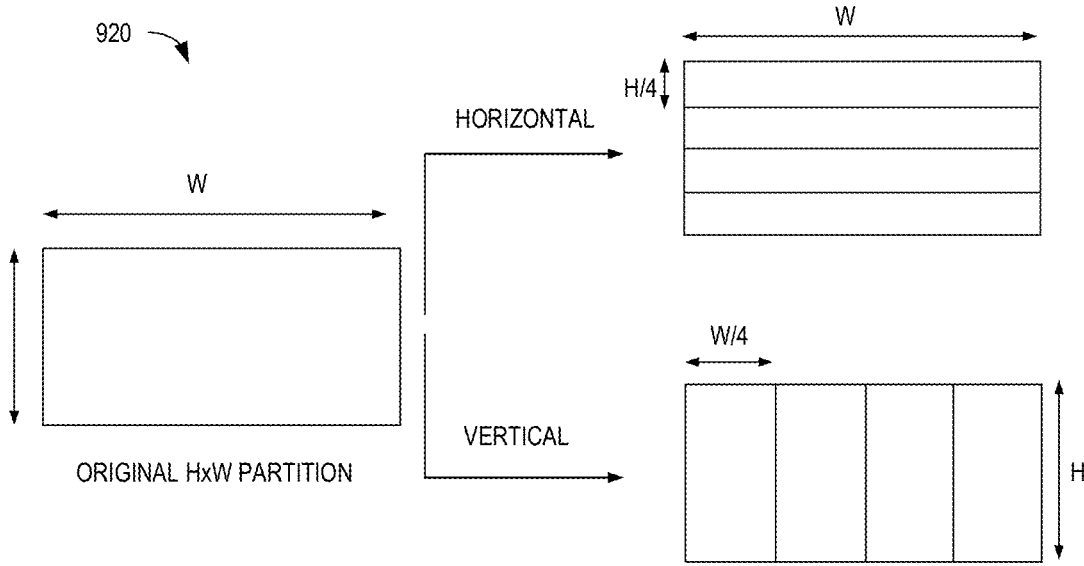

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding 2×64 chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. FIG. 9 shows examples of the two possibilities. All sub-partitions fulfill the condition of having at least 16 samples. FIG. 9 shows an example 910 of sub-partitions for 4×8 and 8×4 CUs and an example 920 of sub-partitions for CUs other than 4×8, 8×4 and 4×4.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 3

| Entropy coding coefficient group size | |
|---|---|
| Block Size | Coefficient group Size |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines.

All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 3. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

PDPC: when a CU uses the ISP coding mode, the PDPC filters will not be applied to the resulting sub-partitions.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w=2 or w>32, $t_H$=DCT-II

If h=2 or h>32, $t_V$=DCT-II

Otherwise, the transform is selected as in Table 4.

TABLE 4

Transform selection depends on intra mode

| Intra mode | $t_H$ | $t_V$ |
|---|---|---|
| Planar | DST-VII | DST-VII |
| Ang. 31, 32, 34, 36, 37 | | |
| DC | DCT-II | DCT-II |
| Ang. 33, 35 | | |
| Ang. 2, 4, 6 . . . 28, 30 | DST-VII | DCT-II |
| Ang. 39, 41, 43 . . . 63, 65 | | |
| Ang. 3, 5, 7 . . . 27, 29 | DCT-II | DST-VII |
| Ang. 38, 40, 42 . . . 64, 66 | | |

In ISP mode, all 67 intra modes are allowed. PDPC is also applied if corresponding width and height is at least 4 samples long. In addition, the condition for intra interpolation filter selection doesn't exist anymore, and Cubic (DCT-IF) filter is always applied for fractional position interpolation in ISP mode.

2.1.1.8. Matrix Weighted Intra Prediction (MIP)

Figure 10:
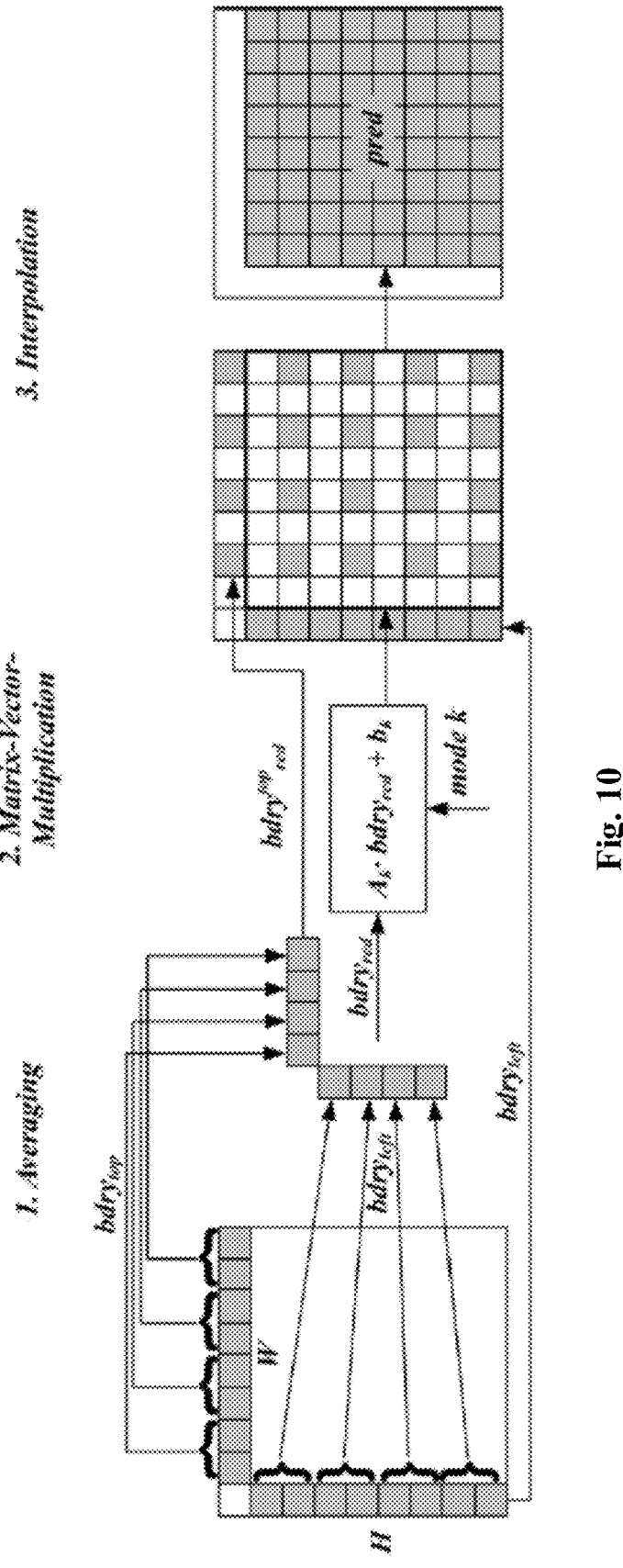
FIG. 10 illustrates matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 10.

2.1.1.9 Averaging Neighboring Samples

Among the boundary samples, four samples or eight samples are selected by averaging based on block size and shape. Specifically, the input boundaries $bdry^{top}$ and $bdry^{left}$ are reduced to smaller boundaries $$bdry_{red}^{top}$$

and $$bdry_{red}^{left}$$

by averaging neighboring boundary samples according to predefined rule depends on block size. Then, the two reduced boundaries $$bdry_{red}^{top}$$

and $$bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} \left[ bdry_{red}^{top}, bdry_{red}^{left} \right] & \text{for } W = H = 4 \text{ and mode} < 18 \\ \left[ bdry_{red}^{left}, bdry_{red}^{top} \right] & \text{for } W = H = 4 \text{ and mode} \geq 18 \\ \left[ bdry_{red}^{top}, bdry_{red}^{left} \right] & \text{for max}(W, H) = 8 \text{ and mode} < 10 \\ \left[ bdry_{red}^{left}, bdry_{red}^{top} \right] & \text{for max}(W, H) = 8 \text{ and mode} \geq 10 \\ \left[ bdry_{red}^{top}, bdry_{red}^{left} \right] & \text{for max}(W, H) > 8 \text{ and mode} < 6 \\ \left[ bdry_{red}^{left}, bdry_{red}^{top} \right] & \text{for max}(W, H) > 8 \text{ and mode} \geq 6. \end{cases} \quad (2\text{-}2)$$

2.1.1.10 Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the downsampled block of width $W_{red}$ and height $H_{red}$ is generated. Here, $W_{red}$ and $H_{red}$ are defined as:

$$W_{red} = \begin{cases} 4 & \text{for max}(W, H) \leq 8 \\ \min(W, 8) & \text{for max}(W, H) > 8 \end{cases} \quad (2\text{-}3)$$

$$H_{red} = \begin{cases} 4 & \text{for max}(W, H) \leq 8 \\ \min(H, 8) & \text{for max}(W, H) > 8 \end{cases} \quad (2\text{-}4)$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$ One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases} \quad (2\text{-}5)$$

Here, each coefficient of the matrix A is represented with 8 bit precision. The set $S_0$ consists of 16 matrices $$A_0^i,$$

$i \in \{0, \ldots, 15\}$ each of which has 16 rows and 4 columns and 16 offset vectors $$b_0^i,$$

$i \in \{0, \ldots, 16\}$ each of size 16. Matrices and offset vectors of that set are used for blocks of size 4×4. The set $S_1$ consists of 8 matrices $$A_1^i,$$

$i \in \{0, \ldots, 7\}$, each of which has 16 rows and 8 columns and 8 offset vectors $$b_1^i,$$

$i \in \{0, \ldots, 7\}$ each of size 16. The set $S_2$ consists of 6 matrices $$A_2^i,$$

$i \in \{0, \ldots, 5\}$, each of which has 64 rows and 8 columns and of 6 offset vectors $$b_2^i,$$

$i \in \{0, \ldots, 5\}$ of size 64.

2.1.1.11 Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

2.1.1.12 Signaling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signaled. For an MIP mode, a transposed flag (isTransposed), which determines whether the mode is transposed, and MIP mode Id (modeId), which determines which matrix is to be used for the given MIP mode is derived as follows isTransposed=predModeIntra&1 modeId=predModentra>>1    (2-6).

MIP coding mode is harmonized with other coding tools by considering following aspects:

LFNST is enabled for MIP on large blocks. Here, the LFNST transforms of planar mode are used;

The reference sample derivation for MIP is performed exactly as for the conventional intra prediction modes;

For the upsampling step used in the MIP-prediction, original reference samples are used instead of down-sampled ones;

Clipping is performed before upsampling and not after upsampling;

MIP is allowed up to 64×64 regardless of the maximum transform size;

The number of MIP modes is 32 for sizeId=0, 16 for sizeId=1 and 12 for sizeId=2.

2.1.2. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction;

Merge mode with MVD (MMVD);

Symmetric MVD (SMVD) signalling;

Affine motion compensated prediction;

Subblock-based temporal motion vector prediction (SbTMVP);

Adaptive motion vector resolution (AMVR);

Motion field storage: $\frac{1}{16}^{th}$ luma sample MV storage and 8×8 motion field compression;

Bi-prediction with CU-level weight (BCW);

Bi-directional optical flow (BDOF);

Decoder side motion vector refinement (DMVR);

Geometric partitioning mode (GPM);

Combined inter and intra prediction (CIIP).

The following text provides the details on those inter prediction methods specified in VVC.

2.1.2.1. Extended Merge Prediction

In VVC, the merge candidate list is constructed by including the following five types of candidates in order:

1) Spatial MVP from spatial neighbour CUs;

2) Temporal MVP from collocated CUs;

3) History-based MVP from an FIFO table;

4) Pairwise average MVP;

5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1.2.1.1. Spatial Candidates Derivation

Figure 11:
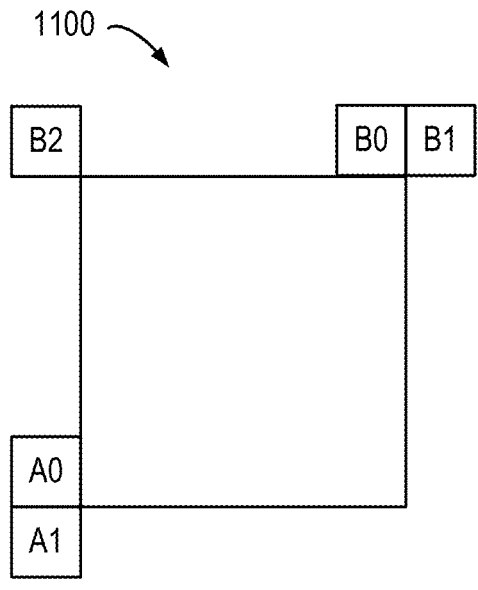
FIG. 11 illustrates positions of spatial merge candidate.
Figure 12:
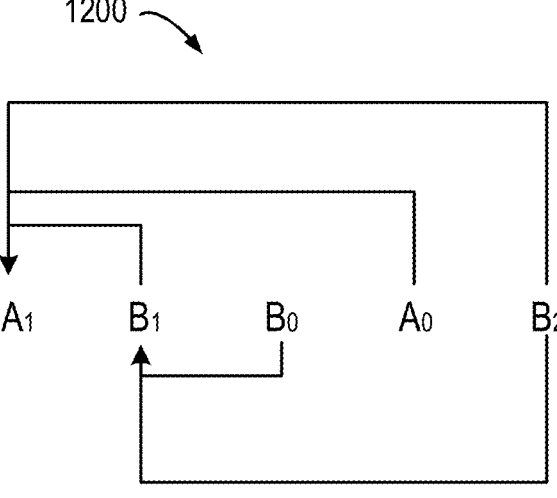
FIG. 12 illustrates candidate pairs considered for redundancy check of spatial merge candidates.

The derivation of spatial merge candidates in VVC is same to that in HEVC except the positions of first two merge candidates are swapped. FIG. 11 is a schematic diagram 1100 illustrating positions of a spatial merge candidate. A maximum of four merge candidates are selected among candidates located in the positions depicted in FIG. 11. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 12 is a schematic diagram 1200 illustrating candidate pairs considered for redundancy check of spatial merge candidates. Instead only the pairs linked with an arrow in FIG. 12 are considered and a candidate is only added to the list if the corresponding candidate used for redundancy check has not the same motion information.

2.1.2.1.2. Temporal Candidates Derivation

Figure 13:
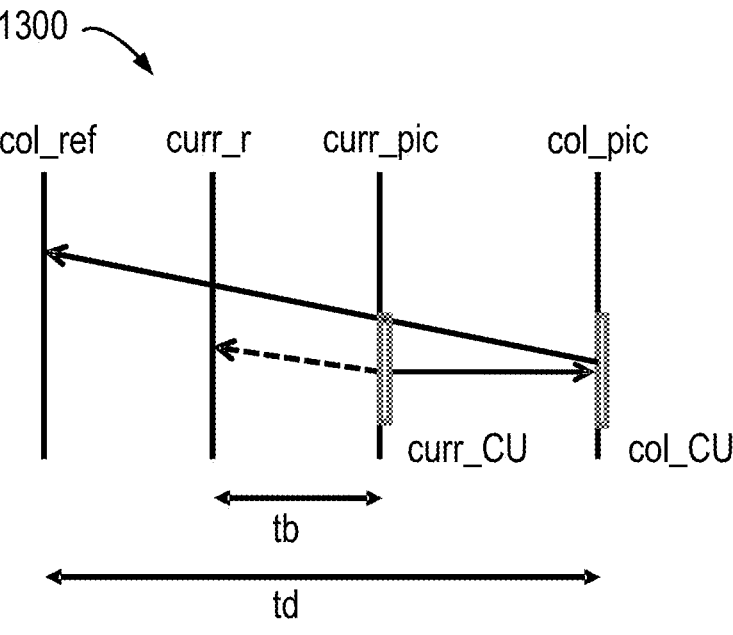
FIG. 13 illustrates an illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 1300 of FIG. 13, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 14:
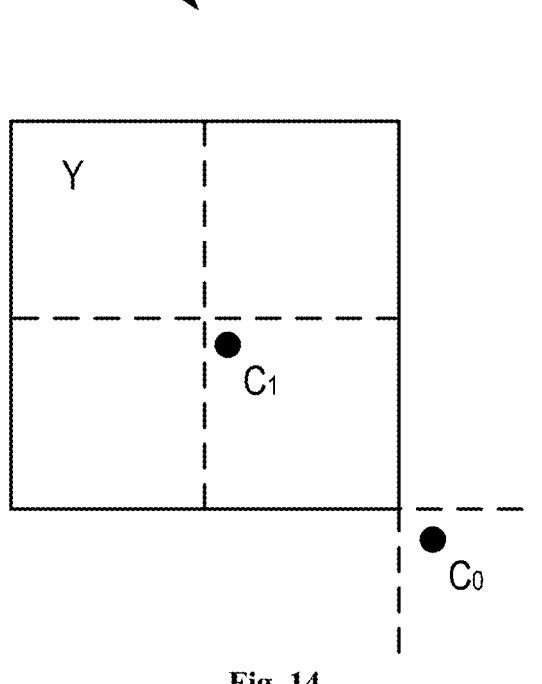
FIG. 14 illustrates candidate positions for temporal merge candidate, C0 and C1.

FIG. 14 is a schematic diagram 1400 illustrating candidate positions for temporal merge candidate, $C_0$ and $C_1$. The position for the temporal candidate is selected between candidates C0 and C1, as depicted in FIG. 14. If CU at position C0 is not available, is intra coded, or is outside of the current row of CTUs, position C1 is used. Otherwise, position C0 is used in the derivation of the temporal merge candidate.

2.1.2.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate. The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4) ? M: (8–N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

2.1.2.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.1.2.2. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.1.2.3. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 15:
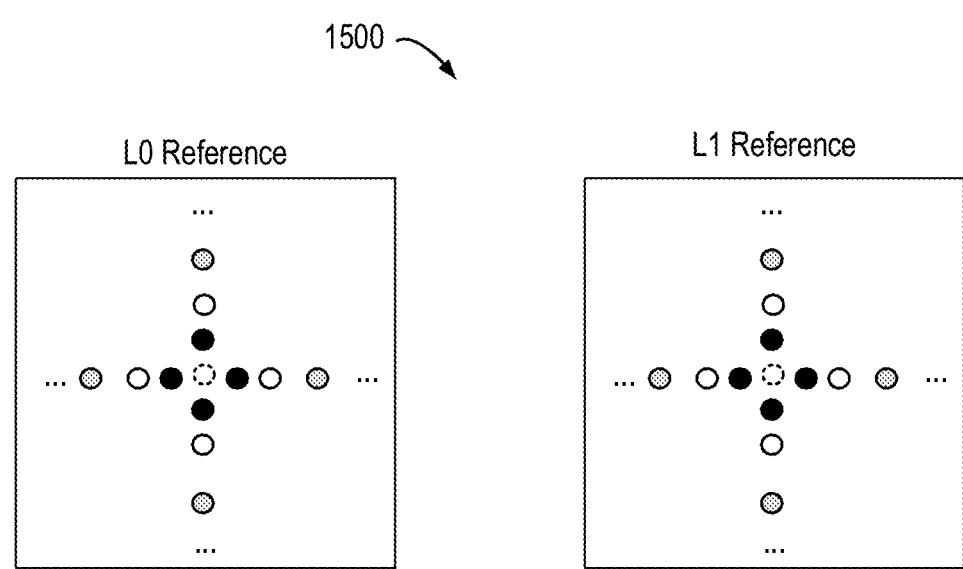
FIG. 15 illustrates a schematic diagram of MMVD search point.

Distance index specifies motion magnitude information and indicate the pre-defined offset from the starting point. FIG. 15 is a schematic diagram 1500 illustrating a merge mode with motion vector differences (MMVD) search point. As shown in FIG. 15, an offset is added to either horizontal component or vertical component of starting MV. The relation of distance index and pre-defined offset is specified in Table 5.

TABLE 5

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 6. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 6 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 6 specifies the sign of MV offset added to the list0 MV component of starting MV and the sign for the list1 MV has opposite value.

TABLE 6

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

2.1.2.4. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) >> 3 \quad (2-7)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used. Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.1.2.5. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.

Both reference pictures are short-term reference pictures.

The CU is not coded using affine mode or the ATMVP merge mode.

CU has more than 64 luma samples.

Both CU height and CU width are larger than or equal to 8 luma samples.

BCW weight index indicates equal weight.

WP is not enabled for the current CU.

CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, i.e., $$\frac{\partial I^{(k)}}{\partial x}(i, j) = \left(\left(I^{(k)}(i+1, j) >> \text{shift} 1\right) - \left(I^{(k)}(i-1, j) >> \text{shift} 1\right)\right) \quad (2\text{-}8)$$

$$\frac{\partial I^{(k)}}{\partial y}(i, j) = \left(\left(I^{(k)}(i, j+1) >> \text{shift} 1\right) - \left(I^{(k)}(i, j-1) >> \text{shift} 1\right)\right)$$

where $I^{(k)}(i,j)$ are the sample value at coordinate $(i, j)$ of the prediction signal in list k, k=0,1, and shift1 is calculated based on the luma bit depth, bitDepth, as shift1=max(6, bitDepth–6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}\,(\psi_x(i, j)), \quad S_3 = \sum_{(i,j)\in\Omega} \theta(i, j)\cdot \text{Sign}\,(\psi_x(i, j)) \quad (2\text{-}9)$$

$$S_2 = \sum_{(i,j)\in\Omega} \psi_x(i, j)\cdot \text{Sign}\,(\psi_y(i, j))$$

$$S_5 = \sum_{(i,j)\in\Omega} \text{Abs}\,(\psi_y(i, j)), \quad S_6 = \sum_{(i,j)\in\Omega} \theta(i, j)\cdot \text{Sign}\,(\psi_y(i, j))$$

where $$\psi_x(i, j) = \left(\frac{\partial I^{(1)}}{\partial x}(i, j) + \frac{\partial I^{(0)}}{\partial x}(i, j)\right) >> n_a \quad (2\text{-}10)$$

$$\psi_y(i, j) = \left(\frac{\partial I^{(1)}}{\partial y}(i, j) + \frac{\partial I^{(0)}}{\partial y}(i, j)\right) >> n_a$$

$$\theta(i, j) = \left(I^{(1)}(i, j) >> n_b\right) - \left(I^{(0)}(i, j) >> n_b\right)$$

where $\Omega$ is a 6×6 window around the 4×4 subblock, and the values of $n_a$ and $n_b$ are set equal to min (1, bitDepth–11) and min(4, bitDepth–8), respectively.

The motion refinement $(v_x, v_y)$ is then derived using the cross- and auto-correlation terms using the following:

$$v_x = S_1 > 0? \ \text{clip} 3(-th'_{BIO}, th'_{BIO}, -((S_3 \cdot 2^{n_b-n_a}) >> \lfloor \log_2 S_1 \rfloor)): 0 \quad (2\text{-}11)$$

$$v_y = S_5 > 0? \ \text{clip} 3(-th'_{BIO}, th'_{BIO}, -((S_6 \cdot 2^{n_b-n_a} -$$

$$((v_x S_{2,m}) << n_{S_2} + v_x S_{2,s})/2) >> \lfloor \log_2 S_5 \rfloor)): 0$$

where $S_{2,m}=S_2>>n_{S_2}$, $$S_{2,s} = S_2 \ \& \ (2^{n_{S_2}} - 1),$$

$th'_{BIO}=2^{max(5,BD-7)}$. $\lfloor \cdot \rfloor$ is the floor function, and $n_{S_2}$=12.

Based on the motion refinement and the gradients, the following adjustment is calculated for each sample in the 4×4 subblock:

$$b(x, y) = \quad (2\text{-}12)$$

$$rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right).$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) >> \text{shift}. \quad (2\text{-}13)$$

These values are selected such that the multipliers in the BDOF process do not exceed 15-bit, and the maximum bit-width of the intermediate parameters in the BDOF process is kept within 32-bit.

In order to derive the gradient values, some prediction samples $I^{(k)}(i,j)$ in list k (k=0,1) outside of the current CU boundaries need to be generated. FIG. 16 illustrates a schematic diagram of extended CU region used in BDOF. As depicted in the diagram 1600 of FIG. 16, the BDOF in VVC uses one extended row/column around the CU's boundaries. In order to control the computational complexity of generating the out-of-boundary prediction samples, prediction samples in the extended area (denoted as 1610 in FIG. 16) are generated by taking the reference samples at the nearby integer positions (using floor( ) operation on the coordinates) directly without interpolation, and the normal 8-tap motion compensation interpolation filter is used to generate prediction samples within the CU (denoted as 1620 in FIG. 16). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1)), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.1.2.6. Symmetric MVD Coding

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1) At slice level, variables BiDirPredFlag, RefIdxSymL0 and RefIdxSymL1 are derived as follows:
   - If mvd_l1_zero_flag is 1, BiDirPredFlag is set equal to 0.
   - Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.
2) At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula:

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}. \tag{2-14}$$

FIG. 17 is an illustration for symmetrical MVD mode. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.2.7. Decoder Side Motion Vector Refinement (DMVR)

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 18 is a schematic diagram illustrating the decoding side motion vector refinement. As illustrated in FIG. 18, the SAD between the blocks 1810 and 1812 based on each MV candidate around the initial MV is calculated, where the block 1810 is in a reference picture 1801 in the list L0 and the block 1812 is in a reference picture 1803 in the List L1 for the current picture 1802. The MV candidate with the lowest SAD becomes the refined MV and used to generate the bi-predicted signal.

In VVC, the DMVR can be applied for the CUs which are coded with following modes and features:

- CU level merge mode with bi-prediction MV;
- One reference picture is in the past and another reference picture is in the future with respect to the current picture;
- The distances (i.e. POC difference) from two reference pictures to the current picture are same;
- Both reference pictures are short-term reference pictures;
- CU has more than 64 luma samples;
- Both CU height and CU width are larger than or equal to 8 luma samples;
- BCW weight index indicates equal weight;
- WP is not enabled for the current block;
- CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.1.2.7.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset} \tag{2-15}$$

$$MV1' = MV1 - \text{MV\_offset} \tag{2-16}$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \tag{2-17}$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \quad (2\text{-}18)$$

$$y_{min} = (E(0, -1) - E(0, 1))/(2((E(0, -1) + E(0, 1) - 2E(0, 0))). \quad (2\text{-}19)$$

The value of $x_{min}$ and $y_{min}$ are automatically constrained to be between −8 and 8 since all cost values are positive and the smallest value is E(0,0). This corresponds to half peal offset with ¹⁄₁₆th-pel MV accuracy in VVC. The computed fractional $(x_{min}, y_{min})$ are added to the integer distance refinement MV to get the sub-pixel accurate refinement delta MV.

2.1.2.7.2. Bilinear-Interpolation and Sample Padding

In VVC, the resolution of the MVs is ¹⁄₁₆ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1.2.7.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.1.2.8. Combined Inter and Intra Prediction (CIIP)

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in a schematic diagram 1900 in FIG. 19) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.

The CIIP prediction is formed as follows:

$$P_{CIIP} = ((4 - wt) * P_{inter} + wt * P_{intra} + 2) \gg 2. \quad (2\text{-}20)$$

2.1.2.9. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m \times 2^n$ with m, n∈{3 . . . 6} excluding 8×64 and 64×8. FIG. 20 shows a schematic diagram 2000 of examples of the GPM splits grouped by identical angles. When this mode is used, a CU is split into two parts by a geometrically located straight line (FIG. 20). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

2.1.2.9.1. Uni-Prediction Candidate List Construction

The uni-prediction candidate list is derived directly from the merge candidate list constructed according to the extended merge prediction process. FIG. 21 is a schematic diagram illustrating the uni-prediction MV selection for geometric partitioning mode. Denote n as the index of the uni-prediction motion in the geometric uni-prediction candidate list 2110. The LX motion vector of the n-th extended merge candidate, with X equal to the parity of n, is used as the n-th uni-prediction motion vector for geometric partitioning mode. These motion vectors are marked with "x" in FIG. 21. In case a corresponding LX motion vector of the n-the extended merge candidate does not exist, the L(1−X) motion vector of the same candidate is used instead as the uni-prediction motion vector for geometric partitioning mode.

2.1.2.9.2. Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \quad (2\text{-}21)$$

$$\rho_j = \rho_{x,j}\cos(\varphi_i) + \rho_{y,j}\sin(\varphi_i) \quad (2\text{-}22)$$

$$\rho_{x,j} = \begin{cases} 0 & i \ \% \ 16 = 8 \text{ or } (i \ \% \ 16 \neq 0 \text{ and } h \geq w) \\ \pm(j \times w) \gg 2 & \text{otherwise} \end{cases} \quad (2\text{-}23)$$

$$\rho_{y,j} = \begin{cases} \pm(j \times h) \gg 2 & i \ \% \ 16 = 8 \text{ or } (i \ \% \ 16 \neq 0 \text{ and } h \geq w) \\ 0 & \text{otherwise} \end{cases} \quad (2\text{-}24)$$

where i,j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx \ ? \ 32 + d(x, y): \ 32 - d(x, y) \quad (2\text{-}25)$$

$$w_0(x, y) = \frac{\text{Clip3}(0, 8, (wIdxL(x, y) + 4) \gg 3)}{8} \quad (2\text{-}26)$$

$$w_1(x, y) = 1 - w_0(x, y). \quad (2\text{-}27)$$

The partIdx depends on the angle index i. One example of weigh $w_0$ is illustrated in the schematic diagram 2200 of FIG. 22.

2.1.2.9.3. Motion Field Storage for Geometric Partitioning Mode

Mv1 from the first part of the geometric partition, Mv2 from the second part of the geometric partition and a combined My of Mv1 and Mv2 are stored in the motion filed of a geometric partitioning mode coded CU.

The stored motion vector type for each individual position in the motion filed are determined as:

$$sType = \quad (2\text{-}43)$$

$$\text{abs}(motionIdx) < 32 \ ? \ 2: \ (motionIdx \leq 0 \ ? \ (1 - partIdx): \ partIdx)$$

where motionIdx is equal to d (4x+2, 4y+2), which is recalculated from equation (2-36).

The partIdx depends on the angle index i.

If sType is equal to 0 or 1, Mv0 or Mv1 are stored in the corresponding motion field, otherwise if sType is equal to 2, a combined My from Mv0 and Mv2 are stored. The combined My are generated using the following process:

1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.1.2.10. Multi-Hypothesis Prediction (MHP)

The multi-hypothesis prediction previously proposed in JVET-M0425 is adopted in this contribution. Up to two additional predictors are signalled on top of inter AMVP mode, regular merge mode, and MMVD mode. The resulting overall prediction signal is accumulated iteratively with each additional prediction signal.

$$p_{n+1} = (1 - \alpha_{n+1})p_n + \alpha_{n+1}h_{n+1}$$

The weighting factor $\alpha$ is specified according to the following table:

| add_hyp_weight_idx | $\alpha$ |
|---|---|
| 0 | $1/4$ |
| 1 | $-1/8$ |

For inter AMVP mode, MHP is only applied if non-equal weight in BCW is selected in bi-prediction mode.

2.1.3. Transform and Quantization 2.1.3.1. Large Block-Size Transforms with High-Frequency Zeroing In VVC, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values. In addition, transform shift is removed in transform skip mode. The VTM also supports configurable max transform size in SPS, such that encoder has the flexibility to choose up to 32-length or 64-length transform size depending on the need of specific implementation.

2.1.3.2. Multiple Transform Selection (MTS) for Core Transform

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 7 shows the basis functions of the selected DST/DCT.

TABLE 7

Transform basis functions of DCT-II/VIII and DSTVII for N-point input

| Transform Type | Basis function Ti(j), i, j = 0, 1, ... , N-1 |
|---|---|
| DCT-II | $$T_i(j) = \omega_0 \cdot \sqrt{\frac{2}{N}} \cdot \cos\left(\frac{\pi \cdot i \cdot (2j + 1)}{2N}\right)$$ $$\text{where, } \omega_0 = \begin{cases} \sqrt{\frac{2}{N}} & i = 0 \\ 1 & i \neq 0 \end{cases}$$ |
| DCT-VIII | $$T_i(j) = \sqrt{\frac{4}{2N + 1}} \cdot \cos\left(\frac{\pi \cdot (2i + 1) \cdot (2j + 1)}{4N + 2}\right)$$ |
| DST-VII | $$T_i(j) = \sqrt{\frac{4}{2N + 1}} \cdot \sin\left(\frac{\pi \cdot (2i + 1) \cdot (j + 1)}{2N + 1}\right)$$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS signaling is skipped when one of the below conditions is applied:

The position of the last significant coefficient for the luma TB is less than 1 (i.e., DC only);

The last significant coefficient of the luma TB is located inside the MTS zero-out region.

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 8. Unified the transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

blocks (i.e., min (width, height)<8) and 8×8 LFNST is applied for larger blocks (i.e., min (width, height)>4).

Application of a non-separable transform, which is being used in LFNST, is described as follows using input as an example. To apply 4×4 LFNST, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad (2\text{-}29)$$

is first represented as a vector $\vec{X}$:

$$\vec{X} = [\, X_{00} \ X_{01} \ X_{02} \ X_{03} \ X_{10} \ X_{11} \ X_{12} \ X_{13} \ X_{20} \ X_{21} \ X_{22} \ X_{23} \ X_{30} \ X_{31} \ X_{32} \ X_{33} \,]^{T}. \qquad (2\text{-}30)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

2.1.3.3.1. Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the

TABLE 8

Transform and signalling mapping table

| MTS_CU_flag | MTS_Hor_flag | MTS_Ver_flag | Intra/inter Horizontal | Intra/inter Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. Note that implicit MTS transform is set to DCT2 when LFNST or MIP is activated for the current CU. Also the implicit MTS can be still enabled when MTS is enabled for inter coded blocks.

2.1.3.3. Low-Frequency Non-Separable Transform (LFNST)

In VVC, LFNST is applied between forward primary transform and quantization (at encoder) and between de-quantization and inverse primary transform (at decoder side) as shown in FIG. 23. In LFNST, 4×4 non-separable transform or 8×8 non-separable transform is applied according to block size. For example, 4×4 LFNST is applied for small transform coefficients. Hence, reduced non-separable transform (or RST) method is used in LFNST. The main idea of the reduced non-separable transform is to map an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix as follows:

$$T_{R \times N} = \begin{bmatrix} t_{11} & t_{12} & t_{13} & \dots & t_{1N} \\ t_{21} & t_{22} & t_{23} & & t_{2N} \\ \vdots & & & \ddots & \vdots \\ t_{R1} & t_{R2} & t_{R3} & \dots & t_{RN} \end{bmatrix} \qquad (2\text{-}31)$$

where the R rows of the transform are R bases of the N dimensional space. The inverse transform matrix for RT is the transpose of its forward transform. For 8×8 LFNST, a reduction factor of 4 is applied, and 64×64 direct matrix, which is conventional 8×8 non-separable transform matrix size, is reduced to 16×48 direct matrix. Hence, the 48×16 inverse RST matrix is used at the decoder side to generate core (primary) transform coefficients in 8×8 top-left regions. When 16×48 matrices are applied instead of 16×64 with the same transform set configuration, each of which takes 48 input data from three 4×4 blocks in a top-left 8×8 block excluding right-bottom 4×4 block. With the help of the reduced dimension, memory usage for storing all LFNST matrices is reduced from 10 KB to 8 KB with reasonable performance drop. In order to reduce complexity LFNST is restricted to be applicable only if all coefficients outside the first coefficient sub-group are non-significant. Hence, all primary-only transform coefficients have to be zero when LFNST is applied. This allows a conditioning of the LFNST index signalling on the last-significant position, and hence avoids the extra coefficient scanning in the current LFNST design, which is needed for checking for significant coefficients at specific positions only. The worst-case handling of LFNST (in terms of multiplications per pixel) restricts the non-separable transforms for 4×4 and 8×8 blocks to 8×16 and 8×48 transforms, respectively. In those cases, the last-significant scan position has to be less than 8 when LFNST is applied, for other sizes less than 16. For blocks with a shape of 4×N and N×4 and N>8, the proposed restriction implies that the LFNST is now applied only once, and that to the top-left 4×4 region only. As all primary-only coefficients are zero when LFNST is applied, the number of operations needed for the primary transforms is reduced in such cases. From encoder perspective, the quantization of coefficients is remarkably simplified when LFNST transforms are tested. A rate-distortion optimized quantization has to be done at maximum for the first 16 coefficients (in scan order), the remaining coefficients are enforced to be zero.

2.1.3.3.2. LFNST Transform Selection

There are totally 4 transform sets and 2 non-separable transform matrices (kernels) per transform set are used in LFNST. The mapping from the intra prediction mode to the transform set is pre-defined as shown in Table 9. If one of three CCLM modes (INTRA_LT_CCLM, INTRA_T_CCLM or INTRA_L_CCLM) is used for the current block (81<=predModeIntra<=83), transform set 0 is selected for the current chroma block. For each transform set, the selected non-separable secondary transform candidate is further specified by the explicitly signalled LFNST index. The index is signalled in a bit-stream once per Intra CU after transform coefficients.

TABLE 9

| Transform selection table | |
| --- | --- |
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

2.1.3.3.3. LFNST Index Signaling and Interaction with Other Tools

Since LFNST is restricted to be applicable only if all coefficients outside the first coefficient sub-group are non-significant, LFNST index coding depends on the position of the last significant coefficient. In addition, the LFNST index is context coded but does not depend on intra prediction mode, and only the first bin is context coded. Furthermore, LFNST is applied for intra CU in both intra and inter slices, and for both Luma and Chroma. If a dual tree is enabled, LFNST indices for Luma and Chroma are signaled separately. For inter slice (the dual tree is disabled), a single LFNST index is signaled and used for both Luma and Chroma.

Considering that a large CU greater than 64×64 is implicitly split (TU tiling) due to the existing maximum transform size restriction (64×64), an LFNST index search could increase data buffering by four times for a certain number of decode pipeline stages. Therefore, the maximum size that LFNST is allowed is restricted to 64×64. Note that LFNST is enabled with DCT2 only. The LFNST index signaling is placed before MTS index signaling.

The use of scaling matrices for perceptual quantization is not evident that the scaling matrices that are specified for the primary matrices may be useful for LFNST coefficients. Hence, the uses of the scaling matrices for LFNST coefficients are not allowed. For single-tree partition mode, chroma LFNST is not applied.

2.1.3.4. Subblock Transform (SBT)

In VTM, subblock transform is introduced for an inter-predicted CU. In this transform mode, only a sub-part of the residual block is coded for the CU. When inter-predicted CU with cu_cbf equal to 1, cu_sbt_flag may be signaled to indicate whether the whole residual block or a sub-part of the residual block is coded. In the former case, inter MTS information is further parsed to determine the transform type of the CU. In the latter case, a part of the residual block is coded with inferred adaptive transform and the other part of the residual block is zeroed out.

When SBT is used for an inter-coded CU, SBT type and SBT position information are signaled in the bitstream. There are two SBT types and two SBT positions, as indicated in FIG. 24. For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

Position-dependent transform core selection is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 24. For example, the horizontal and vertical transforms for SBT-V position 0 is DCT-8 and DST-7, respectively. When one side of the residual TU is greater than 32, the transform for both dimensions is set as DCT-2. Therefore, the subblock transform jointly specifies the TU tiling, cbf, and horizontal and vertical core transform type of a residual block.

The SBT is not applied to the CU coded with combined inter-intra mode.

2.1.3.5. Maximum Transform Size and Zeroing-Out of Transform Coefficients

Both CTU size and maximum transform size (i.e., all MTS transform kernels) are extended to 256, where the maximum intra coded block can have a size of 128×128. The maximum CTU size is set to 256 for UHD sequences and it is set to 128, otherwise. In the primary transformation process, there is no normative zeroing out operation applied on transform coefficients. However, if LFNST is applied, the primary transform coefficients outside the LFNST region are normatively zeroed-out.

2.1.3.6. Enhanced MTS for Intra Coding

In the current VVC design, for MTS, only DST7 and DCT8 transform kernels are utilized which are used for intra and inter coding.

Additional primary transforms including DCT5, DST4, DST1, and identity transform (IDT) are employed. Also MTS set is made dependent on the TU size and intra mode information. 16 different TU sizes are considered, and for each TU size 5 different classes are considered depending on intra-mode information. For each class, 4 different transform pairs are considered, the same as that of VVC. Note, although a total of 80 different classes are considered, some of those different classes often share exactly same transform set. So there are 58 (less than 80) unique entries in the resultant LUT.

For angular modes, a joint symmetry over TU shape and intra prediction is considered. So, a mode i (i>34) with TU shape A×B will be mapped to the same class corresponding to the mode j=(68−i) with TU shape B×A. However, for each transform pair the order of the horizontal and vertical transform kernel is swapped. For example, for a 16×4 block with mode 18 (horizontal prediction) and a 4×16 block with mode 50 (vertical prediction) are mapped to the same class. However, the vertical and horizontal transform kernels are swapped. For the wide-angle modes the nearest conventional angular mode is used for the transform set determination. For example, mode 2 is used for all the modes between −2 and −14. Similarly, mode 66 is used for mode 67 to mode 80.

For predModeIntra<2, lfnstTrSetIdx is equal to 2;

lfnstTrSetIdx=predModeIntra, for predModeIntra in [0,34];

lfnstTrSetIdx=68−predModeIntra, for predModeIntra in [35,66].

Three different kernels, LFNST4, LFNST8, and LFNST16, are defined to indicate LFNST kernel sets, which are applied to 4×N/N×4 (N>4), 8×N/N×8 (N>8), and M×N (M, N≥16), respectively.

The kernel dimensions are specified by:

(LFSNT4, LFNST8*, LFNST16*) (16×16, 32×64, 32×96).

The forward LFNST is applied to top-left low frequency region, which is called Region-Of-Interest (ROI). When LFNST is applied, primary-transformed coefficients that exist in the region other than ROI are zeroed out, which is not changed from the VVC standard.

The ROI for LFNST16 is depicted in FIG. 25. It consists of six 4×4 sub-blocks, which are consecutive in scan order. Since the number of input samples is 96, transform matrix for forward LFNST16 can be Rx96. R is chosen to be 32 in this contribution, 32 coefficients (two 4×4 sub-blocks) are generated from forward LFNST16 accordingly, which are placed following coefficient scan order.

The ROI for LFNST8 is shown in FIG. 26. The forward LFNST8 matrix can be Rx64 and R is chosen to be 32. The generated coefficients are located in the same manner as with LFNST16.

The mapping from intra prediction modes to these sets is shown in Table 10.

TABLE 10

| Mapping of intra prediction modes to LFNST set index | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 2 | 2 | 2 | 2 | 2 | 2 | 2 | 2 | 2 | 2 | 2 | 2 | 2 | 2 | 0 | 1 |
| Intra pred. mode | 2 | 3 | 4 | 5 | 6 | 7 | 8 | 9 | 10 | 11 | 12 | 13 | 14 | 15 | 16 | 17 |
| LFNST set index | 2 | 3 | 4 | 5 | 6 | 7 | 8 | 9 | 10 | 11 | 12 | 13 | 14 | 15 | 16 | 17 |
| Intra pred. mode | 18 | 19 | 20 | 21 | 22 | 23 | 24 | 25 | 26 | 27 | 28 | 29 | 30 | 31 | 32 | 33 |
| LFNST set index | 18 | 19 | 20 | 21 | 22 | 23 | 24 | 25 | 26 | 27 | 28 | 29 | 30 | 31 | 32 | 33 |
| Intra pred. mode | 34 | 35 | 36 | 37 | 38 | 39 | 40 | 41 | 42 | 43 | 44 | 45 | 46 | 47 | 48 | 49 |
| LFNST set index | 34 | 33 | 32 | 31 | 30 | 29 | 28 | 27 | 26 | 25 | 24 | 23 | 22 | 21 | 20 | 19 |
| Intra pred. mode | 50 | 51 | 52 | 53 | 54 | 55 | 56 | 57 | 58 | 59 | 60 | 61 | 62 | 63 | 64 | 65 |
| LFNST set index | 18 | 17 | 16 | 15 | 14 | 13 | 12 | 11 | 10 | 9 | 8 | 7 | 6 | 5 | 4 | 3 |
| Intra pred. mode | 66 | 67 | 68 | 69 | 70 | 71 | 72 | 73 | 74 | 75 | 76 | 77 | 78 | 79 | 80 | |
| LFNST set index | 2 | 2 | 2 | 2 | 2 | 2 | 2 | 2 | 2 | 2 | 2 | 2 | 2 | 2 | 2 | |

MTS index [0,3] is signalled with 2 bit fixed-length coding.

2.1.3.7. Secondary Transformation: LFNST Extension with Large Kernel

The LFNST design in VVC is extended as follows:

The number of LFNST sets (S) and candidates (C) are extended to S=35 and C=3, and the LFNST set (lfnst-TrSetIdx) for a given intra mode (predModeIntra) is derived according to the following formula:

2.1.3.8. Sign Prediction

The basic idea of the coefficient sign prediction method is to calculate reconstructed residual for both negative and positive sign combinations for applicable transform coefficients and select the hypothesis that minimizes a cost function.

To derive the best sign, the cost function is defined as discontinuity measure across block boundary shown on FIG. 27. It is measured for all hypotheses, and the one with the smallest cost is selected as a predictor for coefficient signs.

12,621,490 B2

39

The cost function is defined as a sum of absolute second derivatives in the residual domain for the above row and left column as follows:

$$cost = \sum_{x=0}^{w} |(-R_{x,-1} + 2R_{x,0} - P_{x,1}) - r_{x,1}| + \sum_{y=o}^{h} |(-R_{-1,y} + 2_{0,y} - P_{1,y}) - r_{1,y}|$$

where R is reconstructed neighbors, P is prediction of the current block, and r is the residual hypothesis. The term $(-R_{-1}+2R_0-P_1)$ can be calculated only once per block and only residual hypothesis is subtracted.

3. Problems

There are several issues in the existing video coding techniques, which would be further improved for higher coding gain.

1. Advanced transform kernel in addition to DCT-2 may be applied to inter coded blocks for higher coding efficiency.
2. The motion information of combined inter/intra prediction could be further refined for higher coding efficiency. Furthermore, the signaling syntax of combined inter/intra prediction and its enhancements may or may not share same space value.

4. Embodiments of the Present Disclosure

The detailed embodiments below should be considered as examples to explain general concepts. These embodiments should not be interpreted in a narrow way. Furthermore, these embodiments can be combined in any manner.

The terms 'video unit' or 'coding unit' or 'block' may represent a coding tree block (CTB), a coding tree unit (CTU), a coding block (CB), a CU, a PU, a TU, a PB, a TB.

In the present disclosure, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, GEO, TPM, MMVD, BCW, HMVP, SbTMVP, and etc.).

The term "a transform mode/process" may represent a kind of transform kernel/core or its variance, multiple transform kernel set (e.g., MTS, enhanced MTS) or its variance, and/or subblock based transform (e.g., SBT), and/or non-separable transform or its variance, and/or separable transform or its variance, and/or secondary transform (e.g., LFNST) or its variance, etc.

In the present disclosure, the abbreviation "CIIP-TM" may represent a kind of template matching (TM) based combined inter-intra prediction (CIIP) method. For example, the merge indexed motion vector of the inter part of the CIIP mode may be further refined by a template matching refinement method, and then used for motion compensation.

In the present disclosure, the abbreviation "CIIP-MMVD" may represent a kind of merged based motion vector difference (MMVD) based combined inter-intra prediction (CIIP) method. For example, a motion vector difference may be added up to the merge indexed motion vector of the inter part of the CIIP mode, and then used for motion compensation. Furthermore, the motion vector difference may be signalled in a style of direction information plus distance/step information. Alternatively, the motion vector difference may be signalled in a style of delta horizontal difference and delta vertical difference.

It is noted that the terminologies mentioned below are not limited to the specific ones defined in existing standards. Any variance of the coding tool is also applicable.

CIIP-TM

1. Indication of usage/enable/disable of CIIP enhancement modes (e.g., CIIP-TM mode, or CIIP-MMVD mode, or any other variance of CIIP), and/or related information (e.g., template information, allowed MMVD candidates for CIIP-MMVD mode) may be present in a coded bitstream.

a. In one example, one or multiple syntax elements (e.g., at SPS/PPS/PH/SH/CTU/VPDU/PU/CU/TU/region level) may be signalled indicating the allowance/usage of a CIIP enhancement mode.
  b. For example, a first syntax element at SPS/PPS/PH/SH level may be signalled indicating the CIIP-TM mode is enabled/disabled/allowed/disallowed for a sequence/group of pictures/picture/slice level video unit.
  c. For example, a second syntax element (e.g., at SPS/PPS/PH/SH level) may be signalled indicating the maximum number of merge candidates allowed for CIIP enhancement mode (e.g., CIIP-TM mode).
  d. For example, a third syntax element (e.g., at CTU/VPDU/PU/CU/TU level) may be signalled indicating the usage of CIIP enhancement mode (e.g., CIIP-TM mode) on the specific video unit (such as CTU/VPDU/PU/CU/TU).
  e. For example, the first syntax element may be dependent on another syntax element.
    i. In one example, it may depend on the DMVR (e.g., decoder side motion vector refinement, or template matching enabled flag) enabled/disabled flag.
    ii. For example, the first syntax element may be dependent on the intra period value.
      1. For example, if the value of intra period is less than a threshold (such as 0), the first syntax element may be set to a certain value indicating the CIIP enhancement mode is disabled for the video unit.
  f. For example, the second syntax element may be dependent on the maximum allowable number of merge candidates for regular-Merge mode.
    i. Alternatively, the second syntax element may be dependent on the maximum allowable number of merge candidates for regular-TM mode.
    ii. Alternatively, the second syntax element may be dependent on the maximum allowable number of merge candidates for regular-CIIP mode.
    iii. For example, the relationship of the second syntax element and the dependent number of merge candidates may be "less than", or "no greater than", or "equal to", or "greater than".
    iv. For example, the second syntax element may be based on the minimum value of the two related/dependent syntax parameters.
    v. For example, the second syntax element may be based on the maximum value of the two related/dependent syntax parameters.
  g. For example, if they are related/dependent, the signalling of the syntax element may be conditionally signalled by the dependent syntax flag/parameter (such as DMVR flag, TM flag, maximum allowable number of merge candidates for other modes).

h. In one example, the second/third syntax elements may depend on the first syntax element mentioned above.

2. In one example, M (such as M>1) merge candidates of a certain inter coding method (e.g., CIIP, or CIIP-TM) may be firstly reordered to form a reordered list, then the selected merge candidate in the reordered list (e.g., according to decoded merge index) is further refined by a motion refinement process (e.g., TM, or MMVD, or DMVR).

a. For example, M may be equal to the maximum allowed number of merge candidates for the inter coding method.

b. For example, M may be greater than the maximum allowed number of merge candidates for the inter coding method.

i. For example, M may be equal to the maximum allowed number of merge candidates for another inter coding method (such as regular merge mode).

c. For example, M may be less than the maximum allowed number of merge candidates for the inter coding method.

i. For example, M may be equal to a subgroup size used for the reordering.

d. Alternatively, N (such as N>1) merge candidates of a certain inter coding method (e.g., CIIP, or CIIP-TM) may be firstly refined by a motion refinement process (e.g., TM, or MMVD, or DMVR), then the M merge candidates after refinement are reordered to form a reordered list.

i. For example, firstly, a merge candidate list may be built for the CIIP-TM mode; secondly, the merge candidates may be refined by constructing a template from left and above neighboring samples and finding the closest match between the template in the current picture and a corresponding area in a reference picture; thirdly, the merge candidates may be reordered to form a reordered list; lasty, the optimum merge candidates may be signalled in the bitstream.

ii. For example, the maximum number of CIIP-TM merge candidates may be set to K (such as K=2).

e. In one example, the M candidates may be reordered according to costs derived for the candidates.

i. In one example, the cost for a candidate may be calculated based on template matching.

ii. In one example, the cost for a candidate may be calculated based on bilateral matching.

3. In one example, at least one piece of coding information of regular-CIIP mode, and/or CIIP-TM mode, and/or regular-TM mode may be shared.

a. For example, the CIIP-TM may share the same context modelling (or binarization method) with the contexts of regular-TM for entropy coding.

b. For example, the CIIP-TM may share the same context modelling (or binarization method) with the contexts of regular-CIIP for entropy coding.

c. For example, the number of maximum CIIP-TM candidates may be equal to the number of maximum regular-CIIP candidates.

i. For example, the number of maximum allowed CIIP-TM candidates, and the number of maximum allowed regular-CIIP candidates, may share the same space value.

ii. For example, one SPS/PPS/PH/SH syntax element may be signalled indicating the number of maximum allowed CIIP-TM candidates, and the number of maximum allowed regular-CIIP candidates.

d. For example, the block size restrictions on regular-CIIP mode, and/or CIIP-TM mode, and/or regular-TM mode may be the same/aligned/harmonized.

i. Alternatively, the block size restrictions on regular-CIIP mode, and/or CIIP-TM mode, and/or regular-TM mode may be different.

e. Alternatively, the contexts (or binarization method) of regular-TM, and/or regular-CIIP, and/or CIIP-TM may be independent/decoupled for entropy coding.

f. Alternatively, the number of maximum allowed merge candidates for regular-TM, and/or regular-CIIP, and/or CIIP-TM may be different.

4. In one example, whether to apply regular-prediction-mode or TM-prediction-mode to a video block, may be derived on-the-fly (e.g., being implicitly inherited from a previously coded video block).

a. In one example, a variable (e.g., a flag) may be stored with a video block to indicate the usage of regular-prediction-mode or TM-prediction-mode.

i. Alternatively, furthermore, the variable may be further stored together with the motion information (e.g., in HMVP tables as well).

ii. Alternatively, furthermore, when the current video block's motion information is inherited from a motion candidate derived from a second video block, the stored variable associated with the second video block is also inherited.

iii. Alternatively, furthermore, when pruning is applied, the stored variables of two candidates may be also compared.

b. For example, whether to apply regular-CIIP or CIIP-TM to a video block, may be implicitly inherited from a neighbor coded block.

c. For example, whether to apply regular-merge or TM-merge to a video block, may be implicitly inherited from a neighbor coded block.

d. For example, whether to apply regular-GPM or GPM-TM to a video block, may be implicitly inherited from a neighbor coded block.

e. For example, whether to apply regular-AMVP or AMVP-TM to a video block, may be implicitly inherited from a neighbor coded block.

f. For example, if a motion predictor from adjacent/non-adjacent/historic neighbors is coded with TM and/or a variance of TM mode (such as CIIP-TM and/or GPM-TM), the current video block coded from this motion predictor may be implicitly coded as TM-merge or a variance of TM mode (such as CIIP-TM or GPM-TM) mode.

g. Alternatively, whether to apply regular-prediction-mode or TM-prediction-mode to a video block, may be explicitly signalled in the bitstream.

h. The inheritance may take place in a specific mode such as merge mode.

Inter MTS

5. In one example, a transform mode may be conditionally applied to an inter coded block.

a. For example, the "transform mode" may represent a kind of transform kernel/core or its variance, multiple transform kernel set (e.g., MTS, enhanced MTS) or its variance, and/or subblock based transform (e.g., SBT), and/or non-separable transform or its variance, and/or separable transform or its vari-
ance, and/or secondary transform (e.g., LFNST) or
its variance, etc.

b. For example, whether to apply the transform mode to
inter coded blocks may be dependent on the predic-
tion method applied to the inter block.

i. For example, the transform mode (such as MTS,
LFNST, enhanced LFNST, enhanced MTS) may
be applied to CIIP coded blocks.

ii. For example, the transform mode (such as MTS,
SBT) may NOT be applied to AMVP coded
blocks.

iii. For example, the transform mode (such as MTS,
SBT) may NOT be applied to MERGE coded
blocks.

iv. For example, the transform mode (such as MTS,
SBT) may NOT be applied to a certain type of
MERGE coded blocks (such as Affine, CIIP, GEO,
MHP, MMVD, TM, etc.).

v. For example, the transform mode (such as MTS,
SBT) may NOT be applied to true-bi-prediction
coded blocks, wherein "a true-bi-prediction coded
block" means a block coded with a future/suc-
ceeding reference picture and a previous/preced-
ing reference picture in display order.

vi. For example, the transform mode (such as MTS)
may be applied to uni-directional-prediction
coded blocks.

1. Furthermore, a transform mode (such as MTS)
may NOT be applied to GEO coded blocks.

vii. For example, the transform mode (such as
enhanced MTS, LFNST, enhanced LFNST,
enhanced MTS) may be applied to inter coded
blocks.

viii. For example, the transform mode may not be
applied for a block coded with a specific coding
tool.

1. Alternatively, the transform mode may be
applied for a block coded with a specific mode.

2. The specific coding tool may be BDOF, DMVR,
LIC, BCW, etc.

c. For example, whether to apply a transform mode to
inter coded blocks may be dependent on the residual
information.

i. The residual information may comprise CBF, and/
or the last non-zero position, the number of non-
zero coefficients. etc.

d. For example, whether to apply a transform mode to
inter coded blocks may be dependent on the temporal
layer where the inter block at.

i. For example, the transform mode (such as
enhanced MTS, LFNST, enhanced LFNST,
enhanced MTS, SBT) may be applied for inter
blocks with temporal layer less than T (such as
T=1).

ii. For example, the transform mode (such as
enhanced MTS, LFNST, enhanced LFNST,
enhanced MTS, SBT) may be applied for inter
blocks with temporal layer equal to T (such as
T=0).

e. For example, whether to apply a transform mode to
inter coded blocks may be dependent on the block
width (blkW) and/or block height (blkH) of the inter
block.

i. For example, the transform mode (such as
enhanced MTS, LFNST, enhanced LFNST,
enhanced MTS, SBT) may be applied for inter blocks with "blkW<M and/or blkH<N" or
"blkW<=M and/or blkH<=N".

ii. For example, the transform mode (such as
enhanced MTS, LFNST, enhanced LFNST,
enhanced MTS, SBT) may be applied for inter
blocks with "blkW×blkH<M×N" or "blkW×
blkH<=M×N".

iii. For example, M=64, or 32, or 16, or 8.

iv. For example, N=64, or 32, or 16, or 8.

v. For example, the block size restriction may be
applied to all blocks.

vi. For example, the block size restriction may be
applied to a certain type of blocks (e.g., inter
blocks, or inter blocks of temporal layer greater
than T wherein T is a constant).

f. For example, whether to apply a transform mode to
inter coded blocks may be dependent on the quan-
tization parameter of the inter block.

i. For example, the transform mode (such as
enhanced MTS, LFNST, enhanced LFNST,
enhanced MTS, SBT) may be applied for inter
blocks with quantization parameter less than K
(such as K=32, or 27).

ii. For example, the transform mode (such as
enhanced MTS, LFNST, enhanced LFNST,
enhanced MTS, SBT) may be applied for inter
blocks with quantization parameter greater than K
(such as K=32, or 27).

g. For example, whether to apply the transform mode to
inter coded blocks may depend on coding informa-
tion of at least one block neighbouring to the current
block.

i. For example, whether to apply the transform mode
to inter coded blocks may depend on residual
information of at least one block neighbouring to
the current block.

1. The residual information may comprise CBF,
and/or the last non-zero position, the number of
non-zero coefficients. etc.

h. Alternatively, furthermore, more than one condition/
restriction from bullet 5.b to 5.g and their sub-bullets
may be applied to inter coded blocks.

i. For example, MTS may be applied to all predic-
tion-A coded blocks, and other non-prediction-A
coded inter blocks with temporal layer less than T
(such as T=2).

1. Alternatively, MTS may be applied to those
prediction-A coded blocks with temporal layer
less than T.

ii. For example, MTS may be applied to all predic-
tion-A coded blocks, and other non-prediction-A
coded inter blocks with block dimensions less
than X (such as X=32).

iii. For example, MTS may be applied to all predic-
tion-A coded blocks, and other non-prediction-A
coded inter blocks with temporal layer less than T
(such as T=3) and block dimensions less than X
(such as X=32).

iv. For example, prediction-A may be CIIP.

i. A syntax element related to the transform mode may
be signaled only if the transform mode can be
applied on the current block.

i. For example, the syntax element may be a MTS
flag or a MTS index.

j. Alternatively, the above conditions/restrictions may
be applied to intra coded blocks.

6. Indication of usage/enable/disable of a kind of transform mode, or other related information (e.g., at which level/granularity), may be present in a coded bitstream.

a. For example, the "transform mode" may represent a kind of transform kernel/core or its variance, multiple transform kernel set (e.g., MTS, enhanced MTS) or its variance, and/or subblock based transform (e.g., SBT), and/or non-separable transform or its variance, and/or separable transform or its variance, and/or secondary transform (e.g., LFNST) or its variance, etc.

b. In one example, one or multiple syntax elements (e.g., at SPS/PPS/PH/SH/CTU/VPDU/PU/CU/TU/ region level) may be signalled indicating the allowance/usage of a transform mode.

c. For example, first syntax element at SPS/PPS/PH level may be signalled indicating the transform mode is enabled/disabled/allowed/disallowed for the sequence/group of pictures/picture.

d. For example, a second syntax element at SH level may be signalled indicating the transform mode is enabled/disabled/allowed/disallowed for the specific slice.

i. For example, the second syntax element may be signalled conditioned on the value of the first syntax element.

ii. For example, the second syntax element may be signalled conditioned on the temporal layer.

iii. For example, if the current slice is at temporal layer X (such as X=0, or X<K wherein K is a predefined number), the first syntax element may be set to a certain value indicating the transform mode is enabled for the slice. Otherwise, it is disabled.

e. For example, a second syntax element at CTU/ VPDU/PU/CU/TU level may be signalled indicating the usage of the transform mode on the specific video unit (such as CTU/VPDU/PU/CU/TU).

f. For example, the first syntax element may be dependent on a specific transform enabled flag (e.g., MTS enabled flag, or intra MTS enabled flag, or inter MTS enabled flag, etc.).

g. For example, the first syntax element may be dependent on the intra period value.

i. For example, if the value of intra period is less than a threshold (such as 0), the first syntax element may be set to a certain value indicating the transform mode is disabled for the video unit.

h. For example, if they are related/dependent, the signalling of the syntax element may be conditionally signalled by the dependent syntax flag/parameter.

i. Alternatively, the first syntax element may be independent from another transform enabled flag.

General Claims

7. Whether to and/or how to apply the disclosed methods above may be signalled at sequence level/group of pictures level/picture level/slice level/tile group level, such as in sequence header/picture header/SPS/VPS/ DPS/DCI/PPS/APS/slice header/tile group header.

8. Whether to and/or how to apply the disclosed methods above may be signalled at PB/TB/CB/PU/TU/CU/ VPDU/CTU/CTU    row/slice/tile/sub-picture/other kinds of region contain more than one sample or pixel.

9. Whether to and/or how to apply the disclosed methods above may be dependent on coded information, such as block size, colour format, single/dual tree partitioning, colour component, slice/picture type.

Embodiments of the present disclosure are related to prediction blended from multiple compositions in image/ vide coding.

As used herein, the terms "video unit" or "coding unit" or "block" used herein may refer to one or more of: a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block (PB), a transform block (TB), a block, a sub-block of a block, a sub-region within the block, or a region that comprises more than one sample or pixel.

In this present disclosure, regarding "a block coded with mode N", the term "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, MMVD, BCW, HMVP, SbTMVP, and etc.).

The term "a transform mode/process" used herein may represent a kind of transform kernel/core or its variance, multiple transform kernel set (e.g., MTS, enhanced MTS) or its variance, and/or subblock based transform (e.g., SBT), and/or non-separable transform or its variance, and/or separable transform or its variance, and/or secondary transform (e.g., LFNST) or its variance, etc.

The term "CIIP-TM" used herein may represent a kind of template matching (TM) based combined inter-intra prediction (CIIP) method. For example, the merge indexed motion vector of the inter part of the CIIP mode may be further refined by a template matching refinement method, and then used for motion compensation.

The term "CIIP-MMVD" used herein may represent a kind of merged based motion vector difference (MMVD) based combined inter-intra prediction (CIIP) method. For example, a motion vector difference may be added up to the merge indexed motion vector of the inter part of the CIIP mode, and then used for motion compensation. Furthermore, the motion vector difference may be signalled in a style of direction information plus distance/step information. Alternatively, the motion vector difference may be signalled in a style of delta horizontal difference and delta vertical difference.

It is noted that the terminologies mentioned below are not limited to the specific ones defined in existing standards. Any variance of the coding tool is also applicable.

FIG. 28 illustrates a flowchart of a method 2800 for video processing in accordance with some embodiments of the present disclosure. The method 2800 may be implemented during a conversion between a video unit and a bitstream of the video unit.

As shown in FIG. 28, at block 2810, during a conversion between a video unit of a video and a bitstream of the target block, information related to a combined inter-intra prediction (CIIP) enhancement mode is determine. The video unit is applied with the CIIP enhancement mode.

In some embodiments, the CIIP enhancement mode may comprise at least one of: a combined inter-intra prediction-template matching (CIIP-TM) mode, a combined inter-intra prediction-merged based motion vector difference (CIIP-MMVD) mode, or a variance of CIIP. In some other embodiments, the information related to the CIIP enhancement mode may comprise at least one of: an indication of usage of the CIIP enhancement mode, an indication of enable of the CIIP enhancement mode, an indication of disable of the CIIP enhancement mode, template information, or a set of allowed MMVD candidates for the CIIP enhancement mode.

At block 2820, the conversion is performed based on the information related to the CIIP enhancement mode. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, at least one syntax element in the bitstream may indicate at least one of: an allowance of the CIIP enhancement mode or usage of the CIIP enhancement mode. In this case, in some embodiments, the at least one syntax element may be at one of: a sequence parameter set (SPS) level, a picture parameter set (PPS) level, a picture header (PH) level, a slice header (SH) level, a coding tree unit (CTU) level, a virtual pipeline data unit (VPDU) level, a prediction unit (PU) level, a coding unit (CU) level, a transform unit (TU) level, or a region level.

In some embodiments, the at least one syntax element may comprise a first syntax element. In some embodiments, the first syntax element may indicate that status information of the CIIP enhancement mode is for one of: a sequence level, a group of pictures level, a picture level, or a slice level. In some embodiments, the status information of the CIIP enhancement mode may comprise one of: enable, disable, allowed, or disallowed. In some embodiments, the first syntax element may be at one of: a sequence parameter set (SPS) level, a picture parameter set (PPS) level, a picture header (PH) level, or a slice header (SH) level.

In some embodiments, the first syntax element may be dependent on another syntax element. For example, the first syntax element may depend on at least one of: a decoder side motion vector refinement (DMRV) enabled flag, a DMRV disabled flag, a template matching enabled flag, or a template matching disabled flag. Alternatively, or in addition, the first syntax element may depend on an intra period value. For example, if the intra period value is less than a threshold (such as 0), the first syntax element may be set to a value indicating that the CIIP enhancement mode is disabled for the video unit.

In some embodiments, the at least one syntax element comprises a second syntax element. In this case, in some embodiments, the second syntax element may indicate a maximum number of merge candidates allowed for the CIIP enhancement mode. In some embodiments, the second syntax element may be at one of: a coding tree unit (CTU) level, a virtual pipeline data unit (VPDU) level, a prediction unit (PU) level, a coding unit (CU) level, or a transform unit (TU) level.

In some embodiments, the second syntax element may be dependent on a maximum allowable number of merge candidates for a regular merge mode. In this case, for example, the second syntax element may be less than the maximum allowable number of merge candidates for the regular merge mode. In some embodiments, the second syntax element may be no greater than the maximum allowable number of merge candidates for the regular merge mode. In some embodiments, the second syntax element may be equal to the maximum allowable number of merge candidates for the regular merge mode. In some embodiments, the second syntax element may be greater than the maximum allowable number of merge candidates for the regular merge mode.

Alternatively, the second syntax element may be dependent on a maximum allowable number of merge candidates for a regular-TM mode. In this case, for example, the second syntax element may be less than the maximum allowable number of merge candidates for the regular-TM mode. In some embodiments, the second syntax element may be no greater than the maximum allowable number of merge candidates for the regular-TM mode. In some embodiments, the second syntax element may be equal to the maximum allowable number of merge candidates for the regular-TM mode. In some embodiments, the second syntax element may be greater than the maximum allowable number of merge candidates for the regular-TM mode.

In some embodiments, the second syntax element may be dependent on a maximum allowable number of merge candidates for a regular-CIIP mode. In this case, for example, the second syntax element may be less than the maximum allowable number of merge candidates for the regular-CIIP mode. Alternatively, the second syntax element may be no greater than the maximum allowable number of merge candidates for the regular-CIIP mode. In some embodiments, the second syntax element may be equal to the maximum allowable number of merge candidates for the regular-CIIP mode. In some embodiments, the second syntax element may be greater than the maximum allowable number of merge candidates for the regular-CIIP mode.

In some embodiments, the second syntax may be is based on a minimum value of two related syntax parameters. Alternatively, the second syntax element may be based on a maximum value of two related syntax parameters.

In some embodiments, the at least one syntax element may comprise a third syntax element. The third syntax element may indicate a usage of the CIIP enhancement mode on a specific video unit. In some embodiments, the third syntax element may be at one of: a sequence parameter set (SPS) level, a picture parameter set (PPS) level, a picture header (PH) level, or a slice header (SH) level. In some embodiments, the specific video unit may comprise one of: a CTU, a VPDU, a PU, a CU, or a TU.

In some embodiments, if the at least one syntax element and a syntax parameter are related, the at least one syntax element may be conditionally indicated by the syntax parameter. The syntax parameter may comprise at least one of: a DMVR flag, a TM flag, or a maximum allowable number of merge candidates for another prediction mode. In some embodiments, at least one of: a second syntax element or a third syntax element may be dependent on a first syntax element.

In some embodiments, an indication of whether to and/or how to determine the information related to the CIIP enhancement mode may be indicated at one of the followings: sequence level, group of pictures level, picture level, slice level, or tile group level.

In some embodiments, an indication of whether to and/or how to determine the information related to the CIIP enhancement mode may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine the information related to the CIIP enhancement mode may be included in one of the following:

a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine the information related to the CIIP enhancement mode may be determined based on coded information of the target block. The coded information may include at least one of: a block size, a colour format, a single and/or dual tree partitioning, a colour component, a slice type, or a picture type.

In some embodiments, information related to a combined inter-intra prediction (CIIP) enhancement mode of a video unit of the video may be determined. The video unit is applied with the CIIP enhancement mode. A bitstream of the video unit is generated based on the information related to the CIIP enhancement mode.

In some embodiments, information related to a combined inter-intra prediction (CIIP) enhancement mode of a video unit of the video may be determined. The video unit is applied with the CIIP enhancement mode. A bitstream of the video unit is generated based on the information related to the CIIP enhancement mode. The bitstream is stored in a non-transitory computer-readable recording medium.

FIG. 29 illustrates a flowchart of a method 2900 for video processing in accordance with some embodiments of the present disclosure. The method 2900 may be implemented during a conversion between a video unit and a bitstream of the video unit.

As shown in FIG. 29, at block 2910, during a conversion between a video unit of a video and a bitstream of the target block, during a conversion between a video unit of a video and a bitstream of the target block, a reordering procedure and a refinement procedure is applied to a number of merge candidates for the video unit. The video unit is applied with an inter coding mode.

At block 2920, the conversion is performed based on the reordered and refined merge candidates. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, the merge candidates may be reordered. In this case, a set of merge candidates may be selected from the reordered merge candidates. Moreover, the set of merge candidates may be refined by a motion refinement procedure. In some embodiments, the inter coding mode may comprise at least one of: a CIIP mode or a CIIP-TM mode. In some embodiments, the motion refinement procedure may comprise at least one of: a TM mode, a merge mode with motion vector difference (MMVD) mode, or a DMVR mode. In one example, M (such as M>1) merge candidates of a certain inter coding method (e.g., CIIP, or CIIP-TM) may be firstly reordered to form a reordered list, then the selected merge candidate in the reordered list (e.g., according to decoded merge index) is further refined by a motion refinement process (e.g., TM, or MMVD, or DMVR).

In some embodiments, the number of merge candidates may be equal to a maximum allowed number of merge candidates for the inter coding mode. Alternatively, the number of merge candidates may be greater than a maximum allowed number of merge candidates for the inter coding mode. For example, the number of merge candidates may be equal to a maximum allowed number of merge candidates for another inter coding mode (such as regular merge mode).

In some embodiments, the number of merge candidates may be less than a maximum allowed number of merge candidates for the inter coding mode. In some embodiments, the number of merge candidates may be equal to a subgroup size used for the reordering.

Alternatively, the merge candidates may be refined by a motion refinement procedure. In this case, in some embodiments, the refined merge candidates may be reordered. In some embodiments, the motion refinement procedure may comprise at least one of: a TM mode, a merge mode with motion vector difference (MMVD) mode, or a DMVR mode. In one example, N (such as N>1) merge candidates of a certain inter coding method (e.g., CIIP, or CIIP-TM) may be firstly refined by a motion refinement process (e.g., TM, or MMVD, or DMVR), then the M merge candidates after refinement are reordered to form a reordered list.

In some embodiments, a merge candidate list for the inter coding mode may be constructed. A template may be constructed from left and above neighbor samples. A closest match between the template in a current picture and a corresponding area in a reference picture may be determined. The merge candidates in the merge candidate list may be refined based on the closest match. The refined merge candidates may be reordered. At least one optimum merge candidates may be indicated in the bitstream. For example, firstly, a merge candidate list may be built for the CIIP-TM mode; secondly, the merge candidates may be refined by constructing a template from left and above neighboring samples and finding the closest match between the template in the current picture and a corresponding area in a reference picture; thirdly, the merge candidates may be reordered to form a reordered list; lasty, the optimum merge candidates may be signalled in the bitstream.

In some embodiments, a maximum number of merge candidates may be set to a predetermined number. For example, the predetermined number may be 2.

In some embodiments, the merge candidates may be reordered according to costs derived for the merge candidates. In one example, a cost for one merge candidate may be determined based on a template matching. Alternatively, a cost for one merge candidate may be determined based on a bilateral matching.

In some embodiments, an indication of whether to and/or how to apply the reordering procedure and the refinement procedure may be indicated at one of the followings: sequence level, group of pictures level, picture level, slice level, or tile group level.

In some embodiments, an indication of whether to and/or how to apply the reordering procedure and the refinement procedure may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the reordering procedure and the refinement procedure may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to apply the reordering procedure and the refinement procedure may be determined based on coded information of the target block. The coded information may include at least one of: a block size, a colour format, a single and/or dual tree partitioning, a colour component, a slice type, or a picture type.

In some embodiments, a reordering procedure and a refinement procedure is applied to a number of merge candidates for a video unit of the video, the video unit being applied with an inter coding mode. A bitstream of the video unit is generated based on the reordered and refined merge candidates.

In some embodiments, a reordering procedure and a refinement procedure is applied to a number of merge candidates for a video unit of the video, the video unit being applied with an inter coding mode. A bitstream of the video unit is generated based on the reordered and refined merge candidates. The bitstream is stored in a non-transitory computer-readable recording medium.

FIG. 30 illustrates a flowchart of a method 3000 for video processing in accordance with some embodiments of the present disclosure. The method 3000 may be implemented during a conversion between a video unit and a bitstream of the video unit.

As shown in FIG. 30, at block 3010, during a conversion between a video unit of a video and a bitstream of the target block, first coding information of a first inter coding mode is determined. In some embodiments, the first inter coding mode may comprise at least one of: a regular-CIIP mode, a CIIP-TM mode, or a regular-TM mode.

At block 3020, second coding information of a second inter coding mode is determined. In some embodiments, the second inter coding mode may comprise at least one of: a regular-CIIP mode, a CIIP-TM mode, or a regular-TM mode.

The video unit is applied with the first inter coding mode and the second inter coding mode. The first coding information is associated with the second coding information. In one example, at least one piece of coding information of regular-CIIP mode, and/or CIIP-TM mode, and/or regular-TM mode may be shared.

At block 3030, the conversion is performed based on the first and second coding information. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, the first inter coding mode may be a CIIP-TM mode and the second inter coding mode may be a regular-TM mode. In this case, the CIIP-TM mode may share a same context modelling or a same binarization process with a context of the regular-TM mode for entropy coding.

In some embodiments, the first inter coding mode may be a CIIP-TM mode and the second inter coding mode may be a regular-CIIP mode. In this case, the CIIP-TM mode may share a same context modelling or a same binarization process with a context of the regular-CIIP mode for entropy coding.

In some embodiments, the first inter coding mode may be a CIIP-TM mode and the second inter coding mode may be a regular-CIIP mode. In this case, a number of maximum CIIP-TM candidates may be equal to a number of maximum regular-CIIP candidates. In some embodiments, the number of maximum CIIP-TM candidates and the number of maximum regular-CIIP candidates may share a same space value.

In some embodiments, a syntax element may indicate the number of maximum CIIP-TM candidates and the number of maximum regular-CIIP candidates. In this case, in some embodiments, the syntax element may be at one of: a SPS level, a PPS level, a PH level, or a SH level.

In some embodiments, a first block size restriction on a regular-CIIP mode, a second block size restriction on a CIIP-TM mode, and a third block size restriction on a regular-TM mode may be same or aligned or harmonized. For example, the block size restrictions on regular-CIIP mode, and/or CIIP-TM mode, and/or regular-TM mode may be the same/aligned/harmonized.

In some embodiments, a first block size restriction on a regular-CIIP mode, a second block size restriction on a CIIP-TM mode, and a third block size restriction on a regular-TM mode may be different. For example, the block size restrictions on regular-CIIP mode, and/or CIIP-TM mode, and/or regular-TM mode may be different.

In some embodiments, contexts or binarization processes for at least two of: a regular-CIIP mode, a CIIP-TM mode, or a regular-TM mode may be independent or decoupled for entropy coding. In some embodiments, numbers of maximum allowed merge candidates for at least two of: a regular-CIIP mode, a CIIP-TM mode, or a regular-TM mode may be different.

In some embodiments, an indication of whether to and/or how to associate the first coding information with the second coding information may be indicated at one of the followings: sequence level, group of pictures level, picture level, slice level, or tile group level.

In some embodiments, an indication of whether to and/or how to associate the first coding information with the second coding information may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to associate the first coding information with the second coding information may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to associate the first coding information with the second coding information may be determined based on coded information of the target block. The coded information may include at least one of: a block size, a colour format, a single and/or dual tree partitioning, a colour component, a slice type, or a picture type.

In some embodiments, first coding information of a first inter coding mode for a video unit of the video is determined. Second coding information of a second inter coding mode is determined. The video unit is applied with the first inter coding mode and the second inter coding mode. The first coding information is associated with the second coding information. A bitstream of the video unit is generated based on the first and second coding information.

In some embodiments, first coding information of a first inter coding mode for a video unit of the video is determined. Second coding information of a second inter coding mode is determined. The video unit is applied with the first inter coding mode and the second inter coding mode. The first coding information is associated with the second coding information. A bitstream of the video unit is generated based on the first and second coding information. The bitstream is stored in a non-transitory computer-readable recording medium.

FIG. 31 illustrates a flowchart of a method 3100 for video processing in accordance with some embodiments of the present disclosure. The method 3100 may be implemented during a conversion between a video unit and a bitstream of the video unit.

As shown in FIG. 31, at block 3110, during a conversion between a video unit of a video and a bitstream of the target block, whether to apply a regular prediction mode or a template matching (TM) prediction mode to the video unit is determined dynamically. In one example, whether to apply regular-prediction-mode or TM-prediction-mode to a video block, may be derived on-the-fly (e.g., being implicitly inherited from a previously coded video block). In some embodiments, whether to apply the regular prediction mode or the TM prediction mode may be implicitly inherited from a previously coded video unit.

At block 3120, the conversion is performed based on the determining. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, a variable (for example, flag) may be stored with the video unit to indicate a usage of the regular prediction mode or the TM prediction mode. Furthermore, the variable may be further stored with motion information. For example, the motion information may comprise a history-based motion vector prediction (HMVP) table.

In some embodiments, if motion information of the video unit is inherited from a motion candidate derived from another video unit, a variable associated with the other video unit may be also inherited. For example, when the current video block's motion information is inherited from a motion candidate derived from a second video block, the stored variable associated with the second video block may also be inherited. In some embodiments, if pruning is applied, stored variables of merge candidates may be compared.

In some embodiments, whether to apply a regular-CIIP mode or a CIIP-TM mode to the video unit may be implicitly inherited from a neighbor coded video unit. In some embodiments, whether to apply a regular-merge mode or a TM-merge mode to the video unit may be implicitly inherited from a neighbor coded video unit.

In some embodiments, whether to apply a regular-geo partition mode (GPM) mode or a GPM-TM mode to the video unit may be implicitly inherited from a neighbor coded video unit. In some embodiments, whether to apply a regular-advanced motion vector prediction (AMVP) mode or a AMVP-TM mode to the video unit may be implicitly inherited from a neighbor coded video unit.

In some embodiments, if a motion predictor from a neighbor video unit is coded with at least one of: a TM mode or a variance of TM mode, the video unit coded from the motion predictor may be implicitly coded as TM-merge mode or a variance of TM mode. For example, the neighbor video unit may be one of: an adjacent neighbor video unit of the video unit, a non-adjacent neighbor video unit of the video unit, or a historic neighbor video unit of the video unit. In some embodiments, the variance of TM mode may comprise at least one of: a CIIP-TM mode or a GPM-TM mode.

In some embodiments, whether to apply the regular prediction mode or the TM prediction mode to the video unit may be explicitly indicated in the bitstream. In some embodiments, if the video is applied with a specific mode, whether to apply the regular prediction mode or the TM prediction mode may be inherited. In some embodiments, the inheritance may take place in a specific mode such as merge mode.

In some embodiments, an indication of whether to and/or how to determine whether to apply the regular prediction mode or the TM prediction mode may be indicated at one of the followings: sequence level, group of pictures level, picture level, slice level, or tile group level.

In some embodiments, an indication of whether to and/or how to determine whether to apply the regular prediction mode or the TM prediction mode may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine whether to apply the regular prediction mode or the TM prediction mode may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine whether to apply the regular prediction mode or the TM prediction mode may be determined based on coded information of the target block. The coded information may include at least one of: a block size, a colour format, a single and/or dual tree partitioning, a colour component, a slice type, or a picture type.

In some embodiments, whether to apply a regular prediction mode or a template matching (TM) prediction mode to a video unit of the video is determined dynamically. A bitstream of the video unit is generated based on the determining.

In some embodiments, whether to apply a regular prediction mode or a template matching (TM) prediction mode to a video unit of the video is determined dynamically. A bitstream of the video unit is generated based on the determining. The bitstream is stored in a non-transitory computer-readable recording medium.

FIG. 32 illustrates a flowchart of a method 3200 for video processing in accordance with some embodiments of the present disclosure. The method 3200 may be implemented during a conversion between a video unit and a bitstream of the video unit.

As shown in FIG. 32, at block 3210, during a conversion between a video unit of a video and a bitstream of the target block, whether to apply a transform mode to the video unit is determined. The video unit is applied with an inter coding mode or an intra coding mode. In some embodiments, the transform mode may represent at least one of: a transform kernel or core, a variance of the transform kernel or core, multiple transform kernel set, a variance of the multiple transform kernel set, a subblock based transform, a non-separable transform, a variance of the non-separable transform, a separable transform, a variance of the separable transform, a secondary transform, or a variance of the secondary transform.

At block 3220, the conversion is performed based on the determining. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, whether to apply the transform mode to the video unit may be dependent on a prediction method applied to the video unit. In one example, if the video unit is a CIIP coded block, the transform mode may be applied to the video unit. For example, the transform mode (such as MTS, LFNST, enhanced LFNST, enhanced MTS) may be applied to CIIP coded blocks.

In one example, if the video unit is an AMVP coded block, the transform may not be applied to the video unit. For example, the transform mode (such as MTS, SBT) may NOT be applied to AMVP coded blocks.

In on example, if the video unit is a merge coded block, the transform mode may not be applied to the video unit. For example, the transform mode (such as MTS, SBT) may NOT be applied to MERGE coded blocks.

In on example, if the video unit is coded with a predetermined merge mode, the transform mode may not be applied to the video unit. For example, the transform mode (such as MTS, SBT) may NOT be applied to a certain type of MERGE coded blocks (such as Affine, CIIP, GEO, MHP, MMVD, TM, etc.).

In some embodiments, the predetermined merge mode may comprise at least one of: an Affine mode, a CIIP mode, a GEO mode, a multiple hypothesis prediction (MHP) mode, a MMVD mode, or a TM mode.

In some embodiments, if the video unit is a true-bi-prediction coded block, the transform mode may not be applied to the video unit. The true-bi-prediction coded block may means a block coded with a future/succeeding reference picture and a previous/preceding reference picture in display order. For example, the transform mode (such as MTS, SBT) may NOT be applied to true-bi-prediction coded blocks, where "a true-bi-prediction coded block" means a block coded with a future/succeeding reference picture and a previous/preceding reference picture in display order.

In some embodiments, if the video unit is a uni-directional-prediction coded block, the transform mod may be applied to the video unit. For example, the transform mode (such as MTS) may be applied to uni-directional-prediction coded blocks.

In some embodiments, if the video unit is a GEO coded block, the transform mode may not be applied to the video unit. For example, a transform mode (such as MTS) may NOT be applied to GEO coded blocks.

In some embodiments, if the video unit is an inter coded block or an intra coded block, the transform mode may be applied to the video unit. For example, the transform mode (such as enhanced MTS, LFNST, enhanced LFNST, enhanced MTS) may be applied to inter coded blocks.

In some embodiments, if the video unit is a block coded with a specific coding tool, the transform mode may not be applied to the video unit. For example, the transform mode may not be applied for a block coded with a specific coding tool. In some embodiments, if the if the video unit is a block coded with a specific coding tool, the transform mode may be applied to the video unit. For example, the specific coding tool may be one of: a bi-directional optical flow (BDOF), a decoder-side motion vector refinement (DMVR), a local illumination compensation (LIC), or a bi-prediction with coding unit-level weight (BCW).

In some embodiments, if the video unit is an inter coded block or an intra coded block, whether to apply the transform mode to the video may be is dependent on residual information. For example, the residual information may comprise at least one of: a conventional beamforming (CBF), a last non-zero position, or a number of non-zero coefficients.

In some embodiments, if the video unit is an inter coded block or an intra coded block, whether to apply the transform mode to the video unit may be dependent on a temporal layer where the video unit is. For example, the transform mode may be applied to the video unit with the temporal layer less than a threshold. For example, the transform mode (such as enhanced MTS, LFNST, enhanced LFNST, enhanced MTS, SBT) may be applied for inter blocks with temporal layer less than T (such as T=1). Alternatively, the transform mode may be applied to the video unit with the temporal layer equal to the threshold. For example, the transform mode (such as enhanced MTS, LFNST, enhanced LFNST, enhanced MTS, SBT) may be applied for inter blocks with temporal layer equal to T (such as T=0).

In some embodiments, if the video unit is an inter coded block or an intra coded block, whether to apply the transform mode to the video unit may be dependent on a block size of the video unit. For example, whether to apply a transform mode to inter coded blocks may be dependent on the block width (blkW) and/or block height (blkH) of the inter block.

In one example, the transform mode may be applied for the inter coded block or the intra coded block if one of the followings is satisfied: a block width of the video unit less than a first value, a block height of the video unit less than a second value, the block width less than the first value and the block height less than the second value, the block width not larger than the first value, the block height not larger than the second value, or the block width not larger than the first value and the block height not larger than the second value. For example, the transform mode (such as enhanced MTS, LFNST, enhanced LFNST, enhanced MTS, SBT) may be applied for inter blocks with "blkW<M and/or blkH<N" or "blkW<=M and/or blkH<=N".

In some embodiments, the transform mode may be applied for the inter coded block or the intra coded block if one of the followings is satisfied: a block width of the video unit multiplying a block height of the video unit less than a first value multiplying a second value, or the block width multiplying the block height not larger than a first value multiplying a second value. For example, the transform mode (such as enhanced MTS, LFNST, enhanced LFNST, enhanced MTS, SBT) may be applied for inter blocks with "blkW×blkH<M×N" or "blkW×blkH<=M×N".

In some embodiments, the first value may be one of: 64, 32, 16, or 8. For example, M=64, or 32, or 16, or 8. In some embodiments, the second value may be one of: 64, 32, 16, or 8. For example, N=64, or 32, or 16, or 8.

In some embodiments, a restriction of the block size may be applied to all blocks. In some embodiments, a restriction of the block size may be applied to a certain type of blocks. For example, the certain type of blocks may comprise at least one of: inter blocks, inter blocks of temporal layer greater than a threshold, intra coded blocks, or intra blocks of temporal layer greater than a threshold (for example, greater than T and T is a constant).

In some embodiments, if the video unit is an inter coded block or an intra coded block, whether to apply the transform mode to the video unit may be dependent on a quantization parameter of the video unit. In one example, the transform mode may be applied to the inter coded block with the quantization parameter less than a threshold. For example, the transform mode (such as enhanced MTS, LFNST, enhanced LFNST, enhanced MTS, SBT) may be applied for inter blocks with quantization parameter less than K (such as K=32, or 27).

In one example, the transform mode may be applied to the inter coded block with the quantization parameter greater than the threshold. For example, the transform mode (such as enhanced MTS, LFNST, enhanced LFNST, enhanced MTS, SBT) may be applied for inter blocks with quantization parameter greater than K (such as K=32, or 27).

In one example, the transform mode is applied to the intra coded block with the quantization parameter less than a threshold. Alternatively, the transform mode may be applied to the intra coded block with the quantization parameter greater than the threshold. For example, the threshold may be one of: 32 or 27.

In some embodiments, if the video unit is an inter coded block or an intra coded block, whether to apply the transform mode to the video unit may be dependent on coding information of at least one block neighboring to the video unit. In one example, whether to apply the transform mode to the video unit may depend on residual information of the at least one block neighboring to the video unit. For example, the residual information of the at least one block neighboring to the video unit may comprise at least one of: a conventional beamforming (CBF), a last non-zero position, or a number of non-zero coefficients.

In some embodiments, whether to apply the transform mode to the video unit may be dependent on at least one of: a prediction method applied to the video unit, residual information of the video unit, a temporal layer where the video unit is, a block size of the video unit, quantization parameter of the video unit, or coding information of at least one block neighboring to the video unit.

In some embodiments, MTS may be applied to all blocks coded with a target prediction mode, and other inter coded blocks or other intra coded blocks which are not coded with the target prediction mode and have the temporal layer less than a first threshold. In some embodiments, MTS may be applied to a set of blocks which are coded with a target prediction mode and has the temporal layer less than a first threshold. In some embodiments, the first threshold may be 2.

In some embodiments, MTS may be applied to all blocks coded with a target prediction mode, and other inter coded blocks or other intra coded blocks which are not coded with the target prediction mode and have a block dimension than a second threshold. In some embodiments, MTS may be applied to all blocks coded with a target prediction mode, and other or other intra coded blocks coded blocks which are not coded with the target prediction mode and have a block dimension than a second threshold and the temporal layer less than a third threshold. In some embodiments, the second threshold may be 32, and the third threshold may be 3. In some embodiments, the target prediction mode may comprise a CIIP mode.

In some embodiments, if the transform mode is applied to the video unit, a syntax element related to the transform mode may be indicated. For example, the syntax element may be one of: a MTS flag or a MTS index.

In some embodiments, an indication of whether to and/or how to determine whether to apply the transform mode to the video unit may be indicated at one of the followings: sequence level, group of pictures level, picture level, slice level, or tile group level.

In some embodiments, an indication of whether to and/or how to determine whether to apply the transform mode to the video unit may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine whether to apply the transform mode to the video unit may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine whether to apply the transform mode to the video unit may be determined based on coded information of the target block. The coded information may include at least one of: a block size, a colour format, a single and/or dual tree partitioning, a colour component, a slice type, or a picture type.

In some embodiments, whether to apply a transform mode to a video unit of the video id determined. The video unit is applied with an inter coding mode or an intra coding mode. A bitstream of the video unit is generated based on the determining.

In some embodiments, whether to apply a transform mode to a video unit of the video id determined. The video unit is applied with an inter coding mode or an intra coding mode. A bitstream of the video unit is generated based on the determining. The bitstream is stored in a non-transitory computer-readable recording medium.

FIG. 33 illustrates a flowchart of a method 3300 for video processing in accordance with some embodiments of the present disclosure. The method 3300 may be implemented during a conversion between a video unit and a bitstream of the video unit.

As shown in FIG. 33, at block 3310, during a conversion between a video unit of a video and a bitstream of the target block, information related to a transform mode is determined. The video unit is applied with the transform mode. In some embodiments, the transform mode may represent at least one of: a transform kernel or core, a variance of the transform kernel or core, multiple transform kernel set, a variance of the multiple transform kernel set, a subblock based transform, a non-separable transform, a variance of the non-separable transform, a separable transform, a variance of the separable transform, a secondary transform, or a variance of the secondary transform. In some embodiments, the information related to the transform mode may comprise at least one of: an indication of usage of the transform mode, an indication of enable of the transform mode, an indication of disable of the transform mode, level information of applying the transform mode, or a granularity of applying the transform mode.

At block 3320, the conversion is performed based on the information related to the transform mode. In some embodiments, the conversion may comprise ending the video unit into the bitstream. Alternatively, the conversion may comprise decoding the video unit from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, at least one syntax element in the bitstream may indicate at least one of: an allowance of the transform mode or usage of the transform mode. In some embodiments, the at least one syntax element may be at one of: a sequence parameter set (SPS) level, a picture parameter set (PPS) level, a picture header (PH) level, a slice header (SH) level, a coding tree unit (CTU) level, a virtual pipeline data unit (VPDU) level, a prediction unit (PU) level, a coding unit (CU) level, a transform unit (TU) level, or a region level.

In some embodiments, the at least one syntax element may comprise a first syntax element. In this case, in some embodiments, the first syntax element may indicate that status information of the transform mode is for one of: a sequence level, a group of pictures level, or a picture level. For example, the status information of the transform mode may comprise one of: enable, disable, allowed, or disallowed. In some embodiments, the first syntax element may be at one of: a sequence parameter set (SPS) level, a picture parameter set (PPS) level, a picture header (PH) level, or a slice header (SH) level.

In some embodiments, the first syntax element may be dependent on a specific transform enabled flag. For example, the first syntax element may depend on at least one of: a MTS enabled flag, an intra MTS enabled flag, or an inter MTS enabled flag.

Alternatively, the first syntax element may depend on an intra period value. For example, if the intra period value is less than a threshold (such as, 0), the first syntax element may be set to a value indicating that the transform mode is disabled for the video unit.

In some embodiments, the at least one syntax element may comprise a second syntax element at SH level. In this case, the second syntax element may indicate status information of the transform mode for a slice. For example, the status information of the transform mode may comprise one of: enable, disable, allowed, or disallowed. In some embodiments, the second syntax element may be indicated based on one of: a value of a first syntax element included in the at least one syntax element, or a temporal layer of the video unit. For example, if a current slice is at temporal layer X, the second syntax element may be set to a first value indicating that the transform mode is enabled for the slice. Alternatively, if the current slice is not at temporal layer X, the second syntax element is set to a second value indicating that the transform mode may be disabled for the slice. X may be 0 is less than a predefined number. For example, if the current slice is at temporal layer X (such as X=0, or X<K where K is a predefined number), the first syntax element may be set to a certain value indicating the transform mode is enabled for the slice. Otherwise, it is disabled.

In some embodiments, the at least one syntax element may comprise a third syntax element. In this case, the third syntax element may indicate a usage of the transform mode on a specific video unit. For example, the third syntax element may be at one of: a coding tree unit (CTU) level, a virtual pipeline data unit (VPDU) level, a prediction unit (PU) level, a coding unit (CU) level, or a transform unit (TU) level. In some embodiments, the specific video unit may comprise one of: a CTU, a VPDU, a PU, a CU, or a TU.

In some embodiments, if the at least one syntax element and a syntax parameter are related, the at least one syntax element may be conditionally indicated by the syntax parameter. In some embodiments, the first syntax element may be independent from another transform enabled flag.

In some embodiments, an indication of whether to and/or how to determine the information related to the transform mode may be indicated at one of the followings: sequence level, group of pictures level, picture level, slice level, or tile group level.

In some embodiments, an indication of whether to and/or how to determine the information related to the transform mode may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to determine the information related to the transform mode may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to determine the information related to the transform mode may be determined based on coded information of the target block. The coded information may include at least one of: a block size, a colour format, a single and/or dual tree partitioning, a colour component, a slice type, or a picture type.

In some embodiments, information related to a transform mode for a video unit of the video is determined. The video unit is applied with the transform mode. A bitstream of the video unit is generated based on the information related to the transform mode.

In some embodiments, information related to a transform mode for a video unit of the video is determined. The video unit is applied with the transform mode. A bitstream of the video unit is generated based on the information related to the transform mode. The bitstream is stored in a non-transitory computer-readable recording medium.

Embodiments of the present disclosure can be implemented separately. Alternatively, embodiments of the present disclosure can be implemented in any proper combinations. Implementations of the present disclosure can be described in view of the following clauses, the features of which can be combined in any reasonable manner.

Clause 1. A method of video processing, comprising: determining, during a conversion between a video unit of a video and a bitstream of the target block, information related to a combined inter-intra prediction (CIIP) enhancement mode, the video unit being applied with the CIIP enhancement mode; and performing the conversion based on the information related to the CIIP enhancement mode.

Clause 2. The method of clause 1, wherein the CIIP enhancement mode comprises at least one of: a combined inter-intra prediction-template matching (CIIP-TM) mode, a combined inter-intra prediction-merged based motion vector difference (CIIP-MMVD) mode, or a variance of CIIP.

Clause 3. The method of clause 1, wherein the information related to the CIIP enhancement mode comprises at least one of: an indication of usage of the CIIP enhancement mode, an indication of enable of the CIIP enhancement mode, an indication of disable of the CIIP enhancement mode, template information, or a set of allowed MMVD candidates for the CIIP enhancement mode.

Clause 4. The method of clause 1, wherein at least one syntax element in the bitstream indicates at least one of: an allowance of the CIIP enhancement mode or usage of the CIIP enhancement mode.

Clause 5. The method of clause 4, wherein the at least one syntax element is at one of: a sequence parameter set (SPS) level, a picture parameter set (PPS) level, a picture header (PH) level, a slice header (SH) level, a coding tree unit (CTU) level, a virtual pipeline data unit (VPDU) level, a prediction unit (PU) level, a coding unit (CU) level, a transform unit (TU) level, or a region level.

Clause 6. The method of clause 4, wherein the at least one syntax element comprises a first syntax element, and wherein the first syntax element indicates that status information of the CIIP enhancement mode is for one of: a sequence level, a group of pictures level, a picture level, or a slice level, and wherein the status information of the CIIP enhancement mode comprises one of: enable, disable, allowed, or disallowed.

Clause 7. The method of clause 6, wherein the first syntax element is at one of: a sequence parameter set (SPS) level, a picture parameter set (PPS) level, a picture header (PH) level, or a slice header (SH) level.

Clause 8. The method of clause 6, wherein the first syntax element is dependent on another syntax element.

Clause 9. The method of clause 8, wherein the first syntax element depends on at least one of: a decoder side motion vector refinement (DMRV) enabled flag, a DMRV disabled flag, a template matching enabled flag, or a template matching disabled flag.

Clause 10. The method of clause 8, wherein the first syntax element depends on an intra period value.

Clause 11. The method of clause 10, wherein if the intra period value is less than a threshold, the first syntax element is set to a value indicating that the CIIP enhancement mode is disabled for the video unit.

Clause 12. The method of clause 4, wherein the at least one syntax element comprises a second syntax element, and wherein the second syntax element indicates a maximum number of merge candidates allowed for the CIIP enhancement mode.

Clause 13. The method of clause 12, wherein the second syntax element is at one of: a coding tree unit (CTU) level, a virtual pipeline data unit (VPDU) level, a prediction unit (PU) level, a coding unit (CU) level, or a transform unit (TU) level.

Clause 14. The method of clause 12, wherein the second syntax element is dependent on a maximum allowable number of merge candidates for a regular merge mode.

Clause 15. The method of clause 14, wherein the second syntax element is less than the maximum allowable number of merge candidates for the regular merge mode, or wherein the second syntax element is no greater than the maximum allowable number of merge candidates for the regular merge mode, or wherein the second syntax element is equal to the maximum allowable number of merge candidates for the regular merge mode, or wherein the second syntax element is greater than the maximum allowable number of merge candidates for the regular merge mode.

Clause 16. The method of clause 12, wherein the second syntax element is dependent on a maximum allowable number of merge candidates for a regular-TM mode.

Clause 17. The method of clause 16, wherein the second syntax element is less than the maximum allowable number of merge candidates for the regular-TM mode, or wherein the second syntax element is no greater than the maximum allowable number of merge candidates for the regular-TM mode, or wherein the second syntax element is equal to the maximum allowable number of merge candidates for the regular-TM mode, or wherein the second syntax element is greater than the maximum allowable number of merge candidates for the regular-TM mode.

Clause 18. The method of clause 12, wherein the second syntax element is dependent on a maximum allowable number of merge candidates for a regular-CIIP mode.

Clause 19. The method of clause 18, wherein the second syntax element is less than the maximum allowable number of merge candidates for the regular-CIIP mode, or wherein the second syntax element is no greater than the maximum allowable number of merge candidates for the regular-CIIP mode, or wherein the second syntax element is equal to the maximum allowable number of merge candidates for the regular-CIIP mode, or wherein the second syntax element is greater than the maximum allowable number of merge candidates for the regular-CIIP mode.

Clause 20. The method of clause 12, wherein the second syntax element is based on a minimum value of two related syntax parameters.

Clause 21. The method of clause 12, wherein the second syntax element is based on a maximum value of two related syntax parameters.

Clause 22. The method of clause 4, wherein the at least one syntax element comprises a third syntax element, and wherein the third syntax element indicates a usage of the CIIP enhancement mode on a specific video unit.

Clause 23. The method of clause 22, wherein the third syntax element is at one of: a sequence parameter set (SPS) level, a picture parameter set (PPS) level, a picture header (PH) level, or a slice header (SH) level, and wherein the specific video unit comprises one of: a CTU, a VPDU, a PU, a CU, or a TU.

Clause 24. The method of clause 4, wherein if the at least one syntax element and a syntax parameter are related, the at least one syntax element is conditionally indicated by the syntax parameter, and wherein the syntax parameter comprises at least one of: a DMVR flag, a TM flag, a maximum allowable number of merge candidates for another prediction mode.

Clause 25. The method of clause 4, wherein at least one of: a second syntax element or a third syntax element is dependent on a first syntax element.

Clause 26. The method of any of clauses 1-25, wherein an indication of whether to and/or how to determine the information related to the CIIP enhancement mode is indicated at one of the followings: sequence level, group of pictures level, picture level, slice level, or tile group level.

Clause 27. The method of any of clauses 1-25, wherein an indication of whether to and/or how to determine the information related to the CIIP enhancement mode is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 28. The method of any of clauses 1-25, wherein an indication of whether to and/or how to determine the information related to the CIIP enhancement mode is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 29. The method of any of clauses 1-25, further comprising: determining, based on coded information of the target block, whether to and/or how to determine the information related to the CIIP enhancement mode, the coded information including at least one of: a block size, a colour format, a single and/or dual tree partitioning, a colour component, a slice type, or a picture type.

Clause 30. A method of video processing, comprising: applying, during a conversion between a video unit of a video and a bitstream of the target block, a reordering procedure and a refinement procedure to a number of merge candidates for the video unit, the video unit being applied with an inter coding mode; and performing the conversion based on the reordered and refined merge candidates.

Clause 31. The method of clause 30, wherein applying the reordering procedure and the refinement procedure comprises: reordering the merge candidates; selecting a set of merge candidates from the reordered merge candidates; and refining the set of merge candidates by a motion refinement procedure.

Clause 32. The method of clause 30, wherein the inter coding mode comprises at least one of: a CIIP mode or a CIIP-TM mode.

Clause 33. The method of clause 31, wherein the motion refinement procedure comprises at least one of: a TM mode, a merge mode with motion vector difference (MMVD) mode, or a DMVR mode.

Clause 34. The method of clause 31, wherein the number of merge candidates is equal to a maximum allowed number of merge candidates for the inter coding mode.

Clause 35. The method of clause 31, wherein the number of merge candidates is greater than a maximum allowed number of merge candidates for the inter coding mode.

Clause 36. The method of clause 30, wherein the number of merge candidates is equal to a maximum allowed number of merge candidates for another inter coding mode.

Clause 37. The method of clause 31, wherein the number of merge candidates is less than a maximum allowed number of merge candidates for the inter coding mode.

Clause 38. The method of clause 31, wherein the number of merge candidates is equal to a subgroup size used for the reordering.

Clause 39. The method of clause 30, wherein applying the reordering procedure and the refinement procedure comprises: refining the merge candidates by a motion refinement procedure; and reordering the refined merge candidates.

Clause 40. The method of clause 39, wherein the motion refinement procedure comprises at least one of: a TM mode, a merge mode with motion vector difference (MMVD) mode, or a DMVR mode.

Clause 41. The method of clause 39, wherein applying the reordering procedure and the refinement procedure comprises: constructing a merge candidate list for the inter coding mode; constructing a template from left and above neighbor samples; determining a closest match between the template in a current picture and a corresponding area in a reference picture; refining the merge candidates in the merge candidate list based on the closest match; reordering the refined merge candidates; and indicating at least one optimum merge candidates in the bitstream.

Clause 42. The method of clause 39, wherein a maximum number of merge candidates is set to a predetermined number.

Clause 43. The method of clause 42, wherein the predetermined number is 2.

Clause 44. The method of clause 30, wherein the merge candidates are reordered according to costs derived for the merge candidates.

Clause 45. The method of clause 44, wherein a cost for one merge candidate is determined based on a template matching.

Clause 46. The method of clause 44, wherein a cost for one merge candidate is determined based on a bilateral matching.

Clause 47. The method of any of clauses 30-47, wherein an indication of whether to and/or how to apply the reordering procedure and the refinement procedure is indicated at one of the followings: sequence level, group of pictures level, picture level, slice level, or tile group level.

Clause 48. The method of any of clauses 30-47, wherein an indication of whether to and/or how to apply the reordering procedure and the refinement procedure is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 49. The method of any of clauses 30-47, wherein an indication of whether to and/or how to apply the reordering procedure and the refinement procedure is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 50. The method of any of clauses 30-47, further comprising: determining, based on coded information of the target block, whether to and/or how to apply the reordering procedure and the refinement procedure, the coded information including at least one of: a block size, a colour format, a single and/or dual tree partitioning, a colour component, a slice type, or a picture type.

Clause 51. A method of video processing, comprising: determining, during a conversion between a video unit of a video and a bitstream of the target block, first coding information of a first inter coding mode; determining second coding information of a second inter coding mode, the video unit being applied with the first inter coding mode and the second inter coding mode, the first coding information being associated with the second coding information; and performing the conversion based on the first and second coding information.

Clause 52. The method of clause 51, wherein the first inter coding mode comprises at least one of: a regular-CIIP mode, a CIIP-TM mode, or a regular-TM mode, and wherein the second inter coding mode comprises at least one of: a regular-CIIP mode, a CIIP-TM mode, or a regular-TM mode.

Clause 53. The method of clause 51, wherein the first inter coding mode is a CIIP-TM mode and the second inter coding mode is a regular-TM mode, and wherein the CIIP-TM mode shares a same context modelling or a same binarization process with a context of the regular-TM mode for entropy coding.

Clause 54. The method of clause 51, wherein the first inter coding mode is a CIIP-TM mode and the second inter coding mode is a regular-CIIP mode, and wherein the CIIP-TM mode shares a same context modelling or a same binarization process with a context of the regular-CIIP mode for entropy coding.

Clause 55. The method of clause 51, wherein the first inter coding mode is a CIIP-TM mode and the second inter coding mode is a regular-CIIP mode, and wherein a number of maximum CIIP-TM candidates is equal to a number of maximum regular-CIIP candidates.

Clause 56. The method of clause 55, wherein the number of maximum CIIP-TM candidates and the number of maximum regular-CIIP candidates share a same space value.

Clause 57. The method of clause 55, wherein a syntax element indicates the number of maximum CIIP-TM candidates and the number of maximum regular-CIIP candidates.

Clause 58. The method of clause 57, wherein the syntax element is at one of: a SPS level, a PPS level, a PH level, or a SH level.

Clause 59. The method of clause 51, wherein a first block size restriction on a regular-CIIP mode, a second block size restriction on a CIIP-TM mode, and a third block size restriction on a regular-TM mode are same or aligned or harmonized.

Clause 60. The method of clause 51, wherein a first block size restriction on a regular-CIIP mode, a second block size restriction on a CIIP-TM mode, and a third block size restriction on a regular-TM mode are different.

Clause 61. The method of clause 51, wherein contexts or binarization processes for at least two of: a regular-CIIP mode, a CIIP-TM mode, or a regular-TM mode are independent or decoupled for entropy coding.

Clause 62. The method of clause 51, wherein numbers of maximum allowed merge candidates for at least two of: a regular-CIIP mode, a CIIP-TM mode, or a regular-TM mode are different.

Clause 63. The method of any of clauses 51-62, wherein an indication of whether to and/or how to associate the first coding information with the second coding information is indicated at one of the followings: sequence level, group of pictures level, picture level, slice level, or tile group level.

Clause 64. The method of any of clauses 51-62, wherein an indication of whether to and/or how to associate the first coding information with the second coding information is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 65. The method of any of clauses 51-62, wherein an indication of whether to and/or how to associate the first coding information with the second coding information is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 66. The method of any of clauses 51-62, further comprising: determining, based on coded information of the target block, whether to and/or how to associate the first coding information with the second coding information, the coded information including at least one of: a block size, a colour format, a single and/or dual tree partitioning, a colour component, a slice type, or a picture type.

Clause 67. A method of video processing, comprising: determining, during a conversion between a video unit of a video and a bitstream of the target block, whether to apply a regular prediction mode or a template matching (TM) prediction mode to the video unit dynamically; and performing the conversion based on the determining.

Clause 68. The method of clause 67, wherein whether to apply the regular prediction mode or the TM prediction mode is implicitly inherited from a previously coded video unit.

Clause 69. The method of clause 67, wherein a variable is stored with the video unit to indicate a usage of the regular prediction mode or the TM prediction mode.

Clause 70. The method of clause 69, wherein the variable is further stored with motion information.

Clause 71. The method of clause 70, wherein the motion information comprises a history-based motion vector prediction (HMVP) table.

Clause 72. The method of clause 67, wherein if motion information of the video unit is inherited from a motion candidate derived from another video unit, a variable associated with the other video unit is also inherited.

Clause 73. The method of clause 67, wherein if pruning is applied, stored variables of merge candidates are compared.

Clause 74. The method of clause 67, wherein whether to apply a regular-CIIP mode or a CIIP-TM mode to the video unit is implicitly inherited from a neighbor coded video unit.

Clause 75. The method of clause 67, wherein whether to apply a regular-merge mode or a TM-merge mode to the video unit is implicitly inherited from a neighbor coded video unit.

Clause 76. The method of clause 67, wherein whether to apply a regular-geo partition mode (GPM) mode or a GPM-TM mode to the video unit is implicitly inherited from a neighbor coded video unit.

Clause 77. The method of clause 67, wherein whether to apply a regular-advanced motion vector prediction (AMVP) mode or a AMVP-TM mode to the video unit is implicitly inherited from a neighbor coded video unit.

Clause 78. The method of clause 67, wherein if a motion predictor from a neighbor video unit is coded with at least one of: a TM mode or a variance of TM mode, the video unit coded from the motion predictor is implicitly coded as TM-merge mode or a variance of TM mode.

Clause 79. The method of clause 78, wherein the neighbor video unit is one of: an adjacent neighbor video unit of the video unit, a non-adjacent neighbor video unit of the video unit, or a historic neighbor video unit of the video unit.

Clause 80. The method of clause 78, wherein the variance of TM mode comprises at least one of: a CIIP-TM mode or a GPM-TM mode.

Clause 81. The method of clause 67, wherein whether to apply the regular prediction mode or the TM prediction mode to the video unit is explicitly indicated in the bitstream.

Clause 82. The method of clause 67, wherein if the video is applied with a specific mode, whether to apply the regular prediction mode or the TM prediction mode is inherited.

Clause 83. The method of any of clauses 67-82, wherein an indication of whether to and/or how to determine whether to apply the regular prediction mode or the TM prediction mode is indicated at one of the followings: sequence level, group of pictures level, picture level, slice level, or tile group level.

Clause 84. The method of any of clauses 67-82, wherein an indication of whether to and/or how to determine whether to apply the regular prediction mode or the TM prediction mode is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 85. The method of any of clauses 67-82, wherein an indication of whether to and/or how to determine whether to apply the regular prediction mode or the TM prediction mode is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 86. The method of any of clauses 67-82, further comprising: determining, based on coded information of the target block, whether to and/or how to determine whether to apply the regular prediction mode or the TM prediction mode, the coded information including at least one of: a block size, a colour format, a single and/or dual tree partitioning, a colour component, a slice type, or a picture type.

Clause 87. A method of video processing, comprising: determining, during a conversion between a video unit of a video and a bitstream of the target block, whether to apply a transform mode to the video unit, the video unit being applied with an inter coding mode or an intra coding mode; and performing the conversion based on the determining.

Clause 88. The method of clause 87, wherein the transform mode represents at least one of: a transform kernel or core, a variance of the transform kernel or core, multiple transform kernel set, a variance of the multiple transform kernel set, a subblock based transform, a non-separable transform, a variance of the non-separable transform, a separable transform, a variance of the separable transform, a secondary transform, or a variance of the secondary transform.

Clause 89. The method of clause 87, wherein whether to apply the transform mode to the video unit is dependent on a prediction method applied to the video unit.

Clause 90. The method of clause 89, wherein if the video unit is a CIIP coded block, the transform mode is applied to the video unit.

Clause 91. The method of clause 89, wherein if the video unit is an AMVP coded block, the transform mode is not applied to the video unit.

Clause 92. The method of clause 89, wherein if the video unit is a merge coded block, the transform mode is not applied to the video unit.

Clause 93. The method of clause 89, wherein if the video unit is coded with a predetermined merge mode, the transform mode is not applied to the video unit.

Clause 94. The method of clause 93, wherein the predetermined merge mode comprises at least one of: an Affine mode, a CIIP mode, a GEO mode, a multiple hypothesis prediction (MHP) mode, a MMVD mode, or a TM mode.

Clause 95. The method of clause 89, wherein if the video unit is a true-bi-prediction coded block, the transform mode is not applied to the video unit, wherein the true-bi-prediction coded block means a block coded with a future/succeeding reference picture and a previous/preceding reference picture in display order.

Clause 96. The method of clause 89, wherein if the video unit is a uni-directional-prediction coded block, the transform mod is applied to the video unit.

Clause 97. The method of clause 89, wherein if the video unit is a GEO coded block, the transform mode is not applied to the video unit.

Clause 98. The method of clause 89, wherein if the video unit is an inter coded block or an intra coded block, the transform mode is applied to the video unit.

Clause 99. The method of clause 89, wherein if the video unit is a block coded with a specific coding tool, the transform mode is not applied to the video unit.

Clause 100. The method of clause 89, wherein if the if the video unit is a block coded with a specific coding tool, the transform mode is applied to the video unit.

Clause 101. The method of clause 99 or 100, wherein the specific coding tool is one of: a bi-directional optical flow (BDOF), a decoder-side motion vector refinement (DMVR), a local illumination compensation (LIC), or a bi-prediction with coding unit-level weight (BCW).

Clause 102. The method of clause 87, wherein if the video unit is an inter coded block or an intra coded block, whether to apply the transform mode to the video unit is dependent on residual information.

Clause 103. The method of clause 102, wherein the residual information comprises at least one of: a conventional beamforming (CBF), a last non-zero position, or a number of non-zero coefficients.

Clause 104. The method of clause 87, wherein if the video unit is an inter coded block or an intra coded block, whether to apply the transform mode to the video unit is dependent on a temporal layer where the video unit is.

Clause 105. The method of clause 104, wherein the transform mode is applied to the video unit with the temporal layer less than a threshold, or wherein the transform mode is applied to the video unit with the temporal layer equal to the threshold.

Clause 106. The method of clause 87, wherein if the video unit is an inter coded block or an intra coded block, whether to apply the transform mode to the video unit is dependent on a block size of the video unit.

Clause 107. The method of clause 106, wherein the transform mode is applied for the inter coded block or the intra coded block if one of the followings is satisfied: a block width of the video unit less than a first value, a block height of the video unit less than a second value, the block width less than the first value and the block height less than the second value, the block width not larger than the first value, the block height not larger than the second value, or the block width not larger than the first value and the block height not larger than the second value.

Clause 108. The method of clause 106, wherein the transform mode is applied for the inter coded block or the intra coded block if one of the followings is satisfied: a block width of the video unit multiplying a block height of the video unit less than a first value multiplying a second value, or the block width multiplying the block height not larger than a first value multiplying a second value.

Clause 109. The method of clause 107 or 108, wherein the first value is one of: 64, 32, 16, or 8, and wherein the second value is one of: 64, 32, 16, or 8.

Clause 110. The method of clause 106, wherein a restriction of the block size is applied to all blocks.

Clause 111. The method of clause 106, wherein a restriction of the block size is applied to a certain type of blocks.

Clause 112. The method of clause 111, wherein the certain type of blocks comprises at least one of: inter blocks, inter blocks of temporal layer greater than a threshold, intra coded blocks, or intra blocks of temporal layer greater than a threshold.

Clause 113. The method of clause 87, wherein if the video unit is an inter coded block or an intra coded block, whether to apply the transform mode to the video unit is dependent on a quantization parameter of the video unit.

Clause 114. The method of clause 113, wherein the transform mode is applied to the inter coded block with the quantization parameter less than a threshold, or wherein the transform mode is applied to the inter coded block with the quantization parameter greater than the threshold, or wherein the transform mode is applied to the intra coded block with the quantization parameter less than a threshold, or wherein the transform mode is applied to the intra coded block with the quantization parameter greater than the threshold.

Clause 115. The method of clause 114, wherein the threshold is one of: 32 or 27.

Clause 116. The method of clause 87, wherein if the video unit is an inter coded block or an intra coded block, whether to apply the transform mode to the video unit is dependent on coding information of at least one block neighboring to the video unit.

Clause 117. The method of clause 116, wherein whether to apply the transform mode to the video unit depends on residual information of the at least one block neighboring to the video unit.

Clause 118. The method of clause 117, wherein the residual information of the at least one block neighboring to the video unit comprises at least one of: a conventional beamforming (CBF), a last non-zero position, or a number of non-zero coefficients.

Clause 119. The method of any of clause 87, wherein whether to apply the transform mode to the video unit is dependent on at least one of: a prediction method applied to the video unit, residual information of the video unit, a temporal layer where the video unit is, a block size of the video unit, quantization parameter of the video unit, or coding information of at least one block neighboring to the video unit.

Clause 120. The method of clause 119, wherein MTS is applied to all blocks coded with a target prediction mode, and other inter coded blocks or other intra coded blocks which are not coded with the target prediction mode and have the temporal layer less than a first threshold.

Clause 121. The method of clause 119, wherein MTS is applied to a set of blocks which are coded with a target prediction mode and has the temporal layer less than a first threshold.

Clause 122. The method of clause 120 or 121, wherein the first threshold is 2.

Clause 123. The method of clause 119, wherein MTS is applied to all blocks coded with a target prediction mode, and other inter coded blocks or other intra coded blocks which are not coded with the target prediction mode and have a block dimension than a second threshold.

Clause 124. The method of clause 119, wherein MTS is applied to all blocks coded with a target prediction mode, and other or other intra coded blocks coded blocks which are not coded with the target prediction mode and have a block dimension than a second threshold and the temporal layer less than a third threshold.

Clause 125. The method of clause 123 or 124, wherein the second threshold is 32, and the third threshold is 3.

Clause 126. The method of any of clauses 120-125, wherein the target prediction mode comprises a CIIP mode.

Clause 127. The method of clause 87, wherein if the transform mode is applied to the video unit, a syntax element related to the transform mode is indicated.

Clause 128. The method of clause 127, wherein the syntax element is one of: a MTS flag or a MTS index.

Clause 129. The method of any of clauses 87-128, wherein an indication of whether to and/or how to determine whether to apply the transform mode to the video unit is indicated at one of the followings: sequence level, group of pictures level, picture level, slice level, or tile group level.

Clause 130. The method of any of clauses 87-128, wherein an indication of whether to and/or how to determine whether to apply the transform mode to the video unit is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 131. The method of any of clauses 87-128, wherein an indication of whether to and/or how to determine whether to apply the transform mode to the video unit is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 132. The method of any of clauses 87-128, further comprising: determining, based on coded information of the target block, whether to and/or how to determine whether to apply the transform mode to the video unit, the coded information including at least one of: a block size, a colour format, a single and/or dual tree partitioning, a colour component, a slice type, or a picture type.

Clause 133. A method of video processing, comprising: determining, during a conversion between a video unit of a video and a bitstream of the target block, information related to a transform mode, the video unit being applied with the transform mode; and performing the conversion based on the information related to the transform mode.

Clause 134. The method of clause 133, wherein the transform mode represents at least one of: a transform kernel or core, a variance of the transform kernel or core, multiple transform kernel set, a variance of the multiple transform kernel set, a subblock based transform, a non-separable transform, a variance of the non-separable transform, a separable transform, a variance of the separable transform, a secondary transform, or a variance of the secondary transform.

Clause 135. The method of clause 133, wherein the information related to the transform mode comprises at least one of: an indication of usage of the transform mode, an indication of enable of the transform mode, an indication of disable of the transform mode, level information of applying the transform mode, or a granularity of applying the transform mode.

Clause 136. The method of clause 133, wherein at least one syntax element in the bitstream indicates at least one of: an allowance of the transform mode or usage of the transform mode.

Clause 137. The method of clause 136, wherein the at least one syntax element is at one of: a sequence parameter set (SPS) level, a picture parameter set (PPS) level, a picture header (PH) level, a slice header (SH) level, a coding tree unit (CTU) level, a virtual pipeline data unit (VPDU) level, a prediction unit (PU) level, a coding unit (CU) level, a transform unit (TU) level, or a region level.

Clause 138. The method of clause 136, wherein the at least one syntax element comprises a first syntax element, and wherein the first syntax element indicates that status information of the transform mode is for one of: a sequence level, a group of pictures level, or a picture level, and wherein the status information of the transform mode comprises one of: enable, disable, allowed, or disallowed.

Clause 139. The method of clause 138, wherein the first syntax element is at one of: a sequence parameter set (SPS) level, a picture parameter set (PPS) level, a picture header (PH) level, or a slice header (SH) level.

Clause 140. The method of clause 138, wherein the first syntax element is dependent on a specific transform enabled flag.

Clause 141. The method of clause 140, wherein the first syntax element depends on at least one of: a MTS enabled flag, an intra MTS enabled flag, or an inter MTS enabled flag.

Clause 142. The method of clause 138, wherein the first syntax element depends on an intra period value.

Clause 143. The method of clause 142, wherein if the intra period value is less than a threshold, the first syntax element is set to a value indicating that the transform mode is disabled for the video unit.

Clause 144. The method of clause 136, wherein the at least one syntax element comprises a second syntax element at SH level, and wherein the second syntax element indicates status information of the transform mode for a slice, and wherein the status information of the transform mode comprises one of: enable, disable, allowed, or disallowed.

Clause 145. The method of clause 144, wherein the second syntax element is indicated based on one of: a value of a first syntax element included in the at least one syntax element, or a temporal layer of the video unit.

Clause 146. The method of clause 144, wherein if a current slice is at temporal layer X, the second syntax element is set to a first value indicating that the transform mode is enabled for the slice, or wherein if the current slice is not at temporal layer X, the second syntax element is set to a second value indicating that the transform mode is disabled for the slice, and wherein X is 0 is less than a predefined number.

Clause 147. The method of clause 136, wherein the at least one syntax element comprises a third syntax element, and wherein the third syntax element indicates a usage of the transform mode on a specific video unit.

Clause 148. The method of clause 147, wherein the third syntax element is at one of: a coding tree unit (CTU) level, a virtual pipeline data unit (VPDU) level, a prediction unit (PU) level, a coding unit (CU) level, or a transform unit (TU) level, and wherein the specific video unit comprises one of: a CTU, a VPDU, a PU, a CU, or a TU.

Clause 149. The method of clause 136, wherein if the at least one syntax element and a syntax parameter are related, the at least one syntax element is conditionally indicated by the syntax parameter.

Clause 150. The method of clause 138, wherein the first syntax element is independent from another transform enabled flag.

Clause 151. The method of any of clauses 133-150, wherein an indication of whether to and/or how to determine the information related to the transform mode is indicated at one of the followings: sequence level, group of pictures level, picture level, slice level, or tile group level.

Clause 152. The method of any of clauses 133-150, wherein an indication of whether to and/or how to determine the information related to the transform mode is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 153. The method of any of clauses 133-150, wherein an indication of whether to and/or how to determine the information related to the transform mode is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 154. The method of any of clauses 133-150, further comprising: determining, based on coded information of the target block, whether to and/or how to determine the information related to the transform mode, the coded information including at least one of: a block size, a colour format, a single and/or dual tree partitioning, a colour component, a slice type, or a picture type.

Clause 155. The method of any of clauses 1-154, wherein the conversion includes encoding the video unit into the bitstream.

Clause 156. The method of any of clauses 1-154, wherein the conversion includes decoding the video unit from the bitstream.

Clause 157. An apparatus for processing video data comprising a processor and a non-transitory memory with instructions thereon, wherein the instructions upon execution by the processor, cause the processor to perform a method in accordance with any of clauses 1-156.

Clause 158. A non-transitory computer-readable storage medium storing instructions that cause a processor to perform a method in accordance with any of clauses 1-156.

Clause 159. A non-transitory computer-readable recording medium storing a bitstream of a video which is generated by a method performed by a video processing apparatus, wherein the method comprises: determining information related to a combined inter-intra prediction (CIIP) enhancement mode of a video unit of the video, the video unit being applied with the CIIP enhancement mode; and generating a bitstream of the video unit based on the information related to the CIIP enhancement mode.

Clause 160. A method for storing bitstream of a video, comprising: determining information related to a combined inter-intra prediction (CIIP) enhancement mode of a video unit of the video, the video unit being applied with the CIIP enhancement mode; generating a bitstream of the video unit based on the information related to the CIIP enhancement mode; and storing the bitstream in a non-transitory computer-readable recording medium.

Clause 161. A non-transitory computer-readable recording medium storing a bitstream of a video which is generated by a method performed by a video processing apparatus, wherein the method comprises: applying a reordering procedure and a refinement procedure to a number of merge candidates for a video unit of the video, the video unit being applied with an inter coding mode; and generating a bitstream of the video unit based on the reordered and refined merge candidates.

Clause 162. A method for storing bitstream of a video, comprising: applying a reordering procedure and a refinement procedure to a number of merge candidates for a video unit of the video, the video unit being applied with an inter coding mode; generating a bitstream of the video unit based on the reordered and refined merge candidates; and storing the bitstream in a non-transitory computer-readable recording medium.

Clause 163. A non-transitory computer-readable recording medium storing a bitstream of a video which is generated by a method performed by a video processing apparatus, wherein the method comprises: determining first coding information of a first inter coding mode for a video unit of the video; determining second coding information of a second inter coding mode, the video unit being applied with the first inter coding mode and the second inter coding mode, the first coding information being associated with the second coding information; and generating a bitstream of the video unit based on the first and second coding information.

Clause 164. A method for storing bitstream of a video, comprising: determining first coding information of a first inter coding mode for a video unit of the video; determining second coding information of a second inter coding mode, the video unit being applied with the first inter coding mode and the second inter coding mode, the first coding information being associated with the second coding information; generating a bitstream of the video unit based on the first and second coding information; and storing the bitstream in a non-transitory computer-readable recording medium.

Clause 165. A non-transitory computer-readable recording medium storing a bitstream of a video which is generated by a method performed by a video processing apparatus, wherein the method comprises: determining whether to apply a regular prediction mode or a template matching (TM) prediction mode to a video unit of the video dynamically; and generating a bitstream of the video unit based on the determining.

Clause 166. A method for storing bitstream of a video, comprising: determining whether to apply a regular prediction mode or a template matching (TM) prediction mode to a video unit of the video dynamically; generating a bitstream of the video unit based on the determining; and storing the bitstream in a non-transitory computer-readable recording medium.

Clause 167. A non-transitory computer-readable recording medium storing a bitstream of a video which is generated by a method performed by a video processing apparatus, wherein the method comprises: determining whether to apply a transform mode to a video unit of the video, the video unit being applied with an inter coding mode or an intra coding mode; and generating a bitstream of the video unit based on the determining.

Clause 168. A method for storing bitstream of a video, comprising: determining whether to apply a transform mode to a video unit of the video, the video unit being applied with an inter coding mode or an intra coding mode; generating a bitstream of the video unit based on the determining; and storing the bitstream in a non-transitory computer-readable recording medium.

Clause 169. A non-transitory computer-readable recording medium storing a bitstream of a video which is generated by a method performed by a video processing apparatus, wherein the method comprises: determining information related to a transform mode for a video unit of the video, the video unit being applied with the transform mode; and generating a bitstream of the video unit based on the information related to the transform mode.

Clause 170. A method for storing bitstream of a video, comprising: determining information related to a transform mode for a video unit of the video, the video unit being applied with the transform mode; generating a bitstream of the video unit based on the information related to the transform mode; and storing the bitstream in a non-transitory computer-readable recording medium.

Example Device

FIG. 34 illustrates a block diagram of a computing device 3400 in which various embodiments of the present disclosure can be implemented. The computing device 3400 may be implemented as or included in the source device 110 (or the video encoder 114 or 200) or the destination device 120 (or the video decoder 124 or 300).

It would be appreciated that the computing device 3400 shown in FIG. 34 is merely for purpose of illustration, without suggesting any limitation to the functions and scopes of the embodiments of the present disclosure in any manner.

As shown in FIG. 34, the computing device 3400 includes a general-purpose computing device 3400. The computing device 3400 may at least comprise one or more processors or processing units 3410, a memory 3420, a storage unit 3430, one or more communication units 3440, one or more input devices 3450, and one or more output devices 3460.

In some embodiments, the computing device 3400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3400 can support any type of interface to a user (such as "wearable" circuitry and the like).

The processing unit 3410 may be a physical or virtual processor and can implement various processes based on programs stored in the memory 3420. In a multi-processor system, multiple processing units execute computer executable instructions in parallel so as to improve the parallel processing capability of the computing device 3400. The processing unit 3410 may also be referred to as a central processing unit (CPU), a microprocessor, a controller or a microcontroller.

The computing device 3400 typically includes various computer storage medium. Such medium can be any medium accessible by the computing device 3400, including, but not limited to, volatile and non-volatile medium, or detachable and non-detachable medium. The memory 3420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3430 may be any detachable or non-detachable medium and may include a machine-readable medium such as a memory, flash memory drive, magnetic disk or another other media, which can be used for storing information and/or data and can be accessed in the computing device 3400.

The computing device 3400 may further include additional detachable/non-detachable, volatile/non-volatile memory medium. Although not shown in FIG. 34, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3440 communicates with a further computing device via the communication medium. In addition, the functions of the components in the computing device 3400 can be implemented by a single computing cluster or multiple computing machines that can communicate via communication connections. Therefore, the computing device 3400 can operate in a networked environment using a logical connection with one or more other servers, networked personal computers (PCs) or further general network nodes.

The input device 3450 may be one or more of a variety of input devices, such as a mouse, keyboard, tracking ball, voice-input device, and the like. The output device 3460 may be one or more of a variety of output devices, such as a display, loudspeaker, printer, and the like. By means of the communication unit 3440, the computing device 3400 can further communicate with one or more external devices (not shown) such as the storage devices and display device, with one or more devices enabling the user to interact with the computing device 3400, or any devices (such as a network card, a modem and the like) enabling the computing device 3400 to communicate with one or more other computing devices, if required. Such communication can be performed via input/output (I/O) interfaces (not shown).

In some embodiments, instead of being integrated in a single device, some or all components of the computing device 3400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3400 may be used to implement video encoding/decoding in embodiments of the present disclosure. The memory 3420 may include one or more video coding modules 3425 having one or more program instructions. These modules are accessible and executable by the processing unit 3410 to perform the functionalities of the various embodiments described herein.

In the example embodiments of performing video encoding, the input device 3450 may receive video data as an input 3470 to be encoded. The video data may be processed, for example, by the video coding module 3425, to generate an encoded bitstream. The encoded bitstream may be provided via the output device 3460 as an output 3480.

In the example embodiments of performing video decoding, the input device 3450 may receive an encoded bitstream as the input 3470. The encoded bitstream may be processed, for example, by the video coding module 3425, to generate decoded video data. The decoded video data may be provided via the output device 3460 as the output 3480.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:

determining, during a conversion between a video unit of a video and a bitstream of a target block, whether to apply a transform mode to the video unit, the video unit being applied with an inter coding mode or an intra coding mode; and performing the conversion based on the determining, and wherein whether to apply the transform mode to the video unit is dependent a prediction method applied to the video unit, and wherein if the video unit is a combined inter and intra prediction (CIIP) coded block, the transform mode is applied to the video unit, or if the video unit is an advanced motion vector prediction (AMVP) coded block, the transform mode is not applied to the video unit, or if the video unit is a merge coded block, the transform mode is not applied to the video unit, or if the video unit is coded with a predetermined merge mode, the transform mode is not applied to the video unit, or if the video unit is a true-bi-prediction coded block, the transform mode is not applied to the video unit, wherein the true-bi-prediction coded block means a block coded with a future/succeeding reference picture and a previous/preceding reference picture in display order, or if the video unit is a uni-directional-prediction coded block, the transform mode is applied to the video unit, or if the video unit is a GEO coded block, the transform mode is not applied to the video unit, or if the video unit is an inter coded block or an intra coded block, the transform mode is applied to the video unit, or if the video unit is a block coded with a specific coding tool, the transform mode is not applied to the video unit, or if the video unit is a block coded with a specific coding tool, the transform mode is applied to the video unit, and wherein if the video unit is an inter coded block or an intra coded block, whether to apply the transform mode to the video unit is dependent on a block size of the video unit, wherein the transform mode is applied for the inter coded block or the intra coded block if one of the followings is satisfied: a block width of the video unit less than a first value, a block height of the video unit less than a second value, the block width less than the first value and the block height less than the second value, the block width not larger than the first value, the block height not larger than the second value, or the block width not larger than the first value and the block height not larger than the second value, or if the transform mode is applied for the inter coded block or the intra coded block if one of the followings is satisfied: a block width of the video unit multiplying a block height of the video unit less than a first value multiplying a second value, or the block width multiplying the block height not larger than a first value multiplying a second value, or wherein a restriction of the block size is applied to all blocks, or wherein a restriction of the block size is applied to a certain type of blocks.

2. The method of claim 1, wherein the transform mode represents at least one of:
a transform kernel or core,
a variance of the transform kernel or core,
multiple transform kernel set,
a variance of the multiple transform kernel set,
a subblock based transform,
a non-separable transform,
a variance of the non-separable transform,
a separable transform,
a variance of the separable transform,
a secondary transform, or
a variance of the secondary transform.

3. The method of claim 1, wherein if the video unit is an inter coded block or an intra coded block, whether to apply the transform mode to the video unit is dependent on residual information, or
wherein if the video unit is an inter coded block or an intra coded block, whether to apply the transform mode to the video unit is dependent on a temporal layer where the video unit is.

4. The method of claim 1, wherein if the video unit is an inter coded block or an intra coded block, whether to apply the transform mode to the video unit is dependent on a quantization parameter of the video unit.

5. The method of claim 4, wherein the transform mode is applied to the inter coded block with the quantization parameter less than a threshold, or
wherein the transform mode is applied to the inter coded block with the quantization parameter greater than the threshold, or
wherein the transform mode is applied to the intra coded block with the quantization parameter less than a threshold, or
wherein the transform mode is applied to the intra coded block with the quantization parameter greater than the threshold.

6. The method of claim 1, wherein if the video unit is an inter coded block or an intra coded block, whether to apply the transform mode to the video unit is dependent on coding information of at least one block neighboring to the video unit.

7. The method of claim 6, wherein whether to apply the transform mode to the video unit depends on residual information of the at least one block neighboring to the video unit.

8. The method of claim 1, wherein whether to apply the transform mode to the video unit is dependent on at least one of:
a prediction method applied to the video unit,
residual information of the video unit,
a temporal layer where the video unit is,
a block size of the video unit,
quantization parameter of the video unit, or
coding information of at least one block neighboring to the video unit.

9. The method of claim 8, wherein MTS is applied to all blocks coded with a target prediction mode, and other inter coded blocks or other intra coded blocks which are not coded with the target prediction mode and have the temporal layer less than a first threshold, or
wherein MTS is applied to a set of blocks which are coded with a target prediction mode and has the temporal layer less than a first threshold, or
wherein MTS is applied to all blocks coded with a target prediction mode, and other inter coded blocks or other intra coded blocks which are not coded with the target prediction mode and have a block dimension than a second threshold, or
wherein MTS is applied to all blocks coded with a target prediction mode, and other or other intra coded blocks coded blocks which are not coded with the target prediction mode and have a block dimension than a second threshold and the temporal layer less than a third threshold.

10. The method of claim 1, wherein if the transform mode is applied to the video unit, a syntax element related to the transform mode is indicated, or
wherein an indication of whether to and/or how to determine whether to apply the transform mode to the video unit is indicated at one of the followings:
sequence level,
group of pictures level,
picture level,
slice level, or
tile group level, or
wherein an indication of whether to and/or how to determine whether to apply the transform mode to the video unit is indicated in one of the following:
a sequence header,
a picture header,
a sequence parameter set (SPS),
a video parameter set (VPS),
a dependency parameter set (DPS),
a decoding capability information (DCI),
a picture parameter set (PPS),
an adaptation parameter sets (APS),
a slice header, or
a tile group header, or
wherein an indication of whether to and/or how to determine whether to apply the transform mode to the video unit is included in one of the following:
a prediction block (PB),
a transform block (TB),
a coding block (CB),
a prediction unit (PU),
a transform unit (TU),
a coding unit (CU),
a virtual pipeline data unit (VPDU),
a coding tree unit (CTU),
a CTU row,
a slice,
a tile,
a sub-picture, or
a region containing more than one sample or pixel, or wherein the method further comprises:

determining, based on coded information of the target block, whether to and/or how to determine whether to apply the transform mode to the video unit, the coded information including at least one of:

a block size, a colour format, a single and/or dual tree partitioning, a colour component, a slice type, or a picture type.

11. The method of claim 1, wherein the conversion includes encoding the video unit into the bitstream, or wherein the conversion includes decoding the video unit from the bitstream.

12. An apparatus for processing video data comprising a processor and a non-transitory memory with instructions thereon, wherein the instructions upon execution by the processor, cause the processor to perform acts comprising:

determining, during a conversion between a video unit of a video and a bitstream of a target block, whether to apply a transform mode to the video unit, the video unit being applied with an inter coding mode or an intra coding mode; and performing the conversion based on the determining, and wherein whether to apply the transform mode to the video unit is dependent on a prediction method applied to the video unit, and if the video unit is a combined inter and intra prediction (CIIP) coded block, the transform mode is applied to the video unit, or if the video unit is an advanced motion vector prediction (AMVP) coded block, the transform mode is not applied to the video unit, or if the video unit is a merge coded block, the transform mode is not applied to the video unit, or if the video unit is coded with a predetermined merge mode, the transform mode is not applied to the video unit, or if the video unit is a true-bi-prediction coded block, the transform mode is not applied to the video unit, wherein the true-bi-prediction coded block means a block coded with a future/succeeding reference picture and a previous/preceding reference picture in display order, or if the video unit is a uni-directional-prediction coded block, the transform mode is applied to the video unit, or if the video unit is a GEO coded block, the transform mode is not applied to the video unit, or if the video unit is an inter coded block or an intra coded block, the transform mode is applied to the video unit, or if the video unit is a block coded with a specific coding tool, the transform mode is not applied to the video unit, or if the video unit is a block coded with a specific coding tool, the transform mode is applied to the video unit, and wherein if the video unit is an inter coded block or an intra coded block, whether to apply the transform mode to the video unit is dependent on a block size of the video unit, and wherein the transform mode is applied for the inter coded block or the intra coded block if one of the followings is satisfied: a block width of the video unit less than a first value, a block height of the video unit less than a second value, the block width less than the first value and the block height less than the second value, the block width not larger than the first value, the block height not larger than the second value, or the block width not larger than the first value and the block height not larger than the second value, or wherein the transform mode is applied for the inter coded block or the intra coded block if one of the followings is satisfied: a block width of the video unit multiplying a block height of the video unit less than a first value multiplying a second value, or the block width multiplying the block height not larger than a first value multiplying a second value, or wherein a restriction of the block size is applied to all blocks, or wherein a restriction of the block size is applied to a certain type of blocks.

13. The apparatus of claim 12, wherein the transform mode represents at least one of:

a transform kernel or core, a variance of the transform kernel or core, multiple transform kernel set, a variance of the multiple transform kernel set, a subblock based transform, a non-separable transform, a variance of the non-separable transform, a separable transform, a variance of the separable transform, a secondary transform, or a variance of the secondary transform, or wherein whether to apply the transform mode to the video unit is dependent on a prediction method applied to the video unit, or wherein if the video unit is an inter coded block or an intra coded block, whether to apply the transform mode to the video unit is dependent on residual information, or wherein if the video unit is an inter coded block or an intra coded block, whether to apply the transform mode to the video unit is dependent on a temporal layer where the video unit is, or wherein if the video unit is an inter coded block or an intra coded block, whether to apply the transform mode to the video unit is dependent on a block size of the video unit, or wherein if the video unit is an inter coded block or an intra coded block, whether to apply the transform mode to the video unit is dependent on a quantization parameter of the video unit, or wherein if the video unit is an inter coded block or an intra coded block, whether to apply the transform mode to the video unit is dependent on coding information of at least one block neighboring to the video unit, or wherein whether to apply the transform mode to the video unit is dependent on at least one of:

a prediction method applied to the video unit, residual information of the video unit, a temporal layer where the video unit is, a block size of the video unit, quantization parameter of the video unit, or coding information of at least one block neighboring to the video unit, or wherein if the transform mode is applied to the video unit, a syntax element related to the transform mode is indicated.

14. A non-transitory computer-readable storage medium storing instructions that cause a processor to perform acts comprising:

determining, during a conversion between a video unit of a video and a bitstream of a target block, whether to apply a transform mode to the video unit, the video unit being applied with an inter coding mode or an intra coding mode; and performing the conversion based on the determining, and
wherein whether to apply the transform mode to the video
unit is dependent on a prediction method applied to the
video unit, and if the video unit is a combined inter and
intra prediction (CIIP) coded block, the transform
mode is applied to the video unit, or if the video unit is
an advanced motion vector prediction (AMVP) coded
block, the transform mode is not applied to the video
unit, or if the video unit is a merge coded block, the
transform mode is not applied to the video unit, or if the
video unit is coded with a predetermined merge mode,
the transform mode is not applied to the video unit, or
if the video unit is a true-bi-prediction coded block, the
transform mode is not applied to the video unit,
wherein the true-bi-prediction coded block means a
block coded with a future/succeeding reference picture
and a previous/preceding reference picture in display
order, or if the video unit is a uni-directional-prediction
coded block, the transform mode is applied to the video
unit, or if the video unit is a GEO coded block, the
transform mode is not applied to the video unit, or if the
video unit is an inter coded block or an intra coded
block, the transform mode is applied to the video unit,
or if the video unit is a block coded with a specific
coding tool, the transform mode is not applied to the
video unit, or if the video unit is a block coded with a
specific coding tool, the transform mode is applied to
the video unit, and
wherein if the video unit is an inter coded block or an intra
coded block, whether to apply the transform mode to
the video unit is dependent on a block size of the video
unit, and
wherein the transform mode is applied for the inter coded
block or the intra coded block if one of the followings
is satisfied: a block width of the video unit less than a
first value, a block height of the video unit less than a
second value, the block width less than the first value
and the block height less than the second value, the
block width not larger than the first value, the block
height not larger than the second value, or the block
width not larger than the first value and the block height
not larger than the second value, or
wherein the transform mode is applied for the inter coded
block or the intra coded block if one of the followings
is satisfied: a block width of the video unit multiplying
a block height of the video unit less than a first value
multiplying a second value, or the block width multi-
plying the block height not larger than a first value
multiplying a second value, or wherein a restriction of
the block size is applied to all blocks, or wherein a
restriction of the block size is applied to a certain type
of blocks.

15. The storage medium of claim 14, wherein the trans-
form mode represents at least one of:
a transform kernel or core,
a variance of the transform kernel or core,
multiple transform kernel set,
a variance of the multiple transform kernel set,
a subblock based transform,
a non-separable transform,
a variance of the non-separable transform,
a separable transform,
a variance of the separable transform,
a secondary transform, or
a variance of the secondary transform, or wherein whether to apply the transform mode to the video
unit is dependent on a prediction method applied to the
video unit, or
wherein if the video unit is an inter coded block or an intra
coded block, whether to apply the transform mode to
the video unit is dependent on residual information, or
wherein if the video unit is an inter coded block or an intra
coded block, whether to apply the transform mode to
the video unit is dependent on a temporal layer where
the video unit is, or
wherein if the video unit is an inter coded block or an intra
coded block, whether to apply the transform mode to
the video unit is dependent on a block size of the video
unit, or
wherein if the video unit is an inter coded block or an intra
coded block, whether to apply the transform mode to
the video unit is dependent on a quantization parameter
of the video unit, or
wherein if the video unit is an inter coded block or an intra
coded block, whether to apply the transform mode to
the video unit is dependent on coding information of at
least one block neighboring to the video unit, or
wherein whether to apply the transform mode to the video
unit is dependent on at least one of:
a prediction method applied to the video unit,
residual information of the video unit,
a temporal layer where the video unit is,
a block size of the video unit,
quantization parameter of the video unit, or
coding information of at least one block neighboring to
the video unit, or
wherein if the transform mode is applied to the video unit,
a syntax element related to the transform mode is
indicated.

16. A non-transitory computer-readable recording
medium storing a bitstream of a video, with stored instruc-
tions to implement a method, wherein the method com-
prises: which is generated by a method performed by a video
processing apparatus, wherein the method comprises:
determining whether to apply a transform mode to a video
unit of the video, the video unit being applied with an
inter coding mode or an intra coding mode; and
generating a bitstream of the video unit based on the
determining, and
wherein whether to apply the transform mode to the video
unit is dependent on a prediction method applied to the
video unit, and if the video unit is a combined inter and
intra prediction (CIIP) coded block, the transform
mode is applied to the video unit, or if the video unit is
an advanced motion vector prediction (AMVP) coded
block, the transform mode is not applied to the video
unit, or if the video unit is a merge coded block, the
transform mode is not applied to the video unit, or if the
video unit is coded with a predetermined merge mode,
the transform mode is not applied to the video unit, or
if the video unit is a true-bi-prediction coded block, the
transform mode is not applied to the video unit,
wherein the true-bi-prediction coded block means a
block coded with a future/succeeding reference picture
and a previous/preceding reference picture in display
order, or if the video unit is a uni-directional-prediction
coded block, the transform mode is applied to the video
unit, or if the video unit is a GEO coded block, the
transform mode is not applied to the video unit, or if the
video unit is an inter coded block or an intra coded
block, the transform mode is applied to the video unit,
or if the video unit is a block coded with a specific coding tool, the transform mode is not applied to the video unit, or if the video unit is a block coded with a specific coding tool, the transform mode is applied to the video unit, and wherein if the video unit is an inter coded block or an intra coded block, whether to apply the transform mode to the video unit is dependent on a block size of the video unit, and wherein the transform mode is applied for the inter coded block or the intra coded block if one of the followings is satisfied: a block width of the video unit less than a first value, a block height of the video unit less than a second value, the block width less than the first value and the block height less than the second value, the block width not larger than the first value, the block height not larger than the second value, or the block width not larger than the first value and the block height not larger than the second value, or wherein the transform mode is applied for the inter coded block or the intra coded block if one of the followings is satisfied: a block width of the video unit multiplying a block height of the video unit less than a first value multiplying a second value, or the block width multiplying the block height not larger than a first value multiplying a second value, or wherein a restriction of the block size is applied to all blocks, or wherein a restriction of the block size is applied to a certain type of blocks.

*  *  *  *  *